US009428168B2

(12) United States Patent
Maruo et al.

(10) Patent No.: US 9,428,168 B2
(45) Date of Patent: Aug. 30, 2016

(54) BRAKE DEVICE

(71) Applicant: Hitachi Automotive Systems, Ltd., Hitachinaka-shi, Ibaraki (JP)

(72) Inventors: Ryohei Maruo, Kawasaki (JP); Masayuki Saito, Sagamihara (JP); Chiharu Nakazawa, Kawasaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/384,201

(22) PCT Filed: Mar. 7, 2013

(86) PCT No.: PCT/JP2013/056310
§ 371 (c)(1),
(2) Date: Sep. 10, 2014

(87) PCT Pub. No.: WO2013/137104
PCT Pub. Date: Sep. 19, 2013

(65) Prior Publication Data
US 2015/0061361 A1    Mar. 5, 2015

(30) Foreign Application Priority Data

Mar. 14, 2012   (JP) ................................ 2012-057912

(51) Int. Cl.
*B60T 13/66* (2006.01)
*B60T 11/224* (2006.01)
*B60T 11/18* (2006.01)
(Continued)

(52) U.S. Cl.
CPC .............. *B60T 13/662* (2013.01); *B60T 8/368* (2013.01); *B60T 8/38* (2013.01); *B60T 8/4081* (2013.01); *B60T 11/18* (2013.01); *B60T 11/224* (2013.01);
(Continued)

(58) Field of Classification Search
CPC .... B60T 8/4081; B60T 13/662; B60T 8/368; B60T 8/38; B60T 11/18; B60T 11/224; B60T 13/145; B60T 13/162; B60T 13/686
See application file for complete search history.

(56) References Cited

U.S. PATENT DOCUMENTS 6,283,561 B1 *   9/2001   Shimizu .................... B60T 7/12
                                                    303/155
6,464,307 B1    10/2002   Yoshino
(Continued)

FOREIGN PATENT DOCUMENTS

JP    2001-213294 A    8/2001
JP    2002-19592 A     1/2002
(Continued)

OTHER PUBLICATIONS

International Search Report (PCT/ISA/210) dated Jun. 11, 2013 with English translation (six pages).
(Continued)

*Primary Examiner* — Melanie Torres Williams
(74) *Attorney, Agent, or Firm* — Crowell & Moring LLP

(57) ABSTRACT

Provided is a brake device that can increase energy efficiency. The present invention is provided with: a master cylinder (5) that generates fluid pressure alongside the operation of a brake by a driver; and a booster device that reduces the force of operation of the brake by the driver by means of an energy source (fluid pressure unit 86)). In a predetermined brake operation region, the operation of the booster device is suppressed.

19 Claims, 19 Drawing Sheets

(51) Int. Cl.
*B60T 13/16* (2006.01)
*B60T 8/36* (2006.01)
*B60T 8/38* (2006.01)
*B60T 8/40* (2006.01)
*B60T 13/14* (2006.01)
*B60T 13/68* (2006.01)

(52) U.S. Cl.
CPC ............ *B60T 13/145* (2013.01); *B60T 13/162* (2013.01); *B60T 13/686* (2013.01)

(56) References Cited

U.S. PATENT DOCUMENTS

| | | | |
|---|---|---|---|
| 7,478,887 B2* | 1/2009 | Nakamura | B60T 1/10 303/113.4 |
| 2001/0038243 A1 | 11/2001 | Isono | |
| 2007/0013230 A1 | 1/2007 | Yang | |
| 2007/0159001 A1* | 7/2007 | Miyazaki | B60T 8/4081 303/113.4 |
| 2008/0001473 A1 | 1/2008 | Mizutani et al. | |
| 2011/0040465 A1* | 2/2011 | Suda | B60T 8/4081 701/70 |
| 2011/0266106 A1 | 11/2011 | Suzuki | |

FOREIGN PATENT DOCUMENTS

| | | |
|---|---|---|
| JP | 2005-47386 A | 2/2005 |
| JP | 2007-153311 A | 6/2007 |
| JP | 2007-307982 A | 11/2007 |
| JP | 2008-6893 A | 1/2008 |
| JP | 2010-149798 A | 7/2010 |
| JP | 2010-195396 A | 9/2010 |

OTHER PUBLICATIONS

Japanese-language Written Opinion (PCT/ISA/237) dated Jun. 11, 2013 (four pages).

* cited by examiner

BRAKE DEVICE

TECHNICAL FIELD

This invention relates to a brake device mounted on a vehicle.

BACKGROUND ART

Conventionally, there is known a brake device including a boost device (a booster) arranged to generate an assist force for decreasing a brake operation force of a driver by an energy source which is different from the brake operation force of the driver. For example, a brake device described in a patent document 1 includes a hydraulic pressure booster serving as a booster device. The hydraulic pressure booster is arranged to increase amplify the depression force of the brake pedal by using a pressure energy stored in an accumulator by a pump, and to transmit it to a master cylinder.

PRIOR ART DOCUMENT

Patent Document

Patent Document 1: Japanese Patent Application Publication No. 2008-6893

SUMMARY OF THE INVENTION

Problems which the Invention is Intended to Solve

However, in the conventional art, the boost device is constantly operated in accordance with the brake operation of the driver. Accordingly, the energy efficiency may be decreased. It is, therefore, an object of the present invention to provide a brake device devised to improve the energy efficiency.

Means for Solving the Problem

For attaining the above-described object, a brake device according to the present invention preferably suppresses an operation of a boost device in a predetermined brake operation region.

Benefit of the Invention

Accordingly, it is possible to improve the energy efficiency.

DESCRIPTION OF EMBODIMENTS

Hereinafter, embodiments for attaining a brake device according to the present invention are illustrated based on the drawings.

Figure 1:
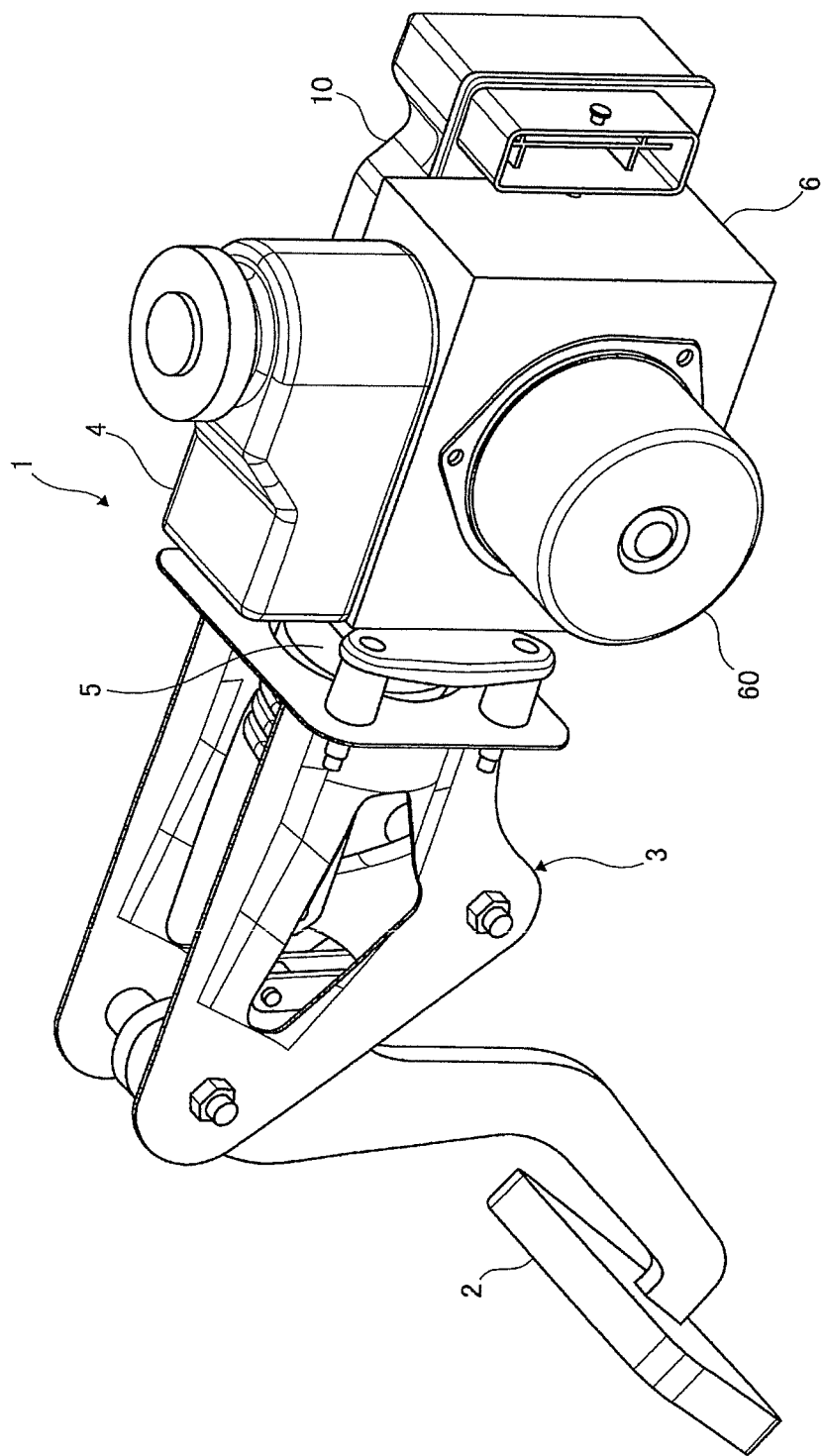
FIG. 1 is an overall perspective view of a brake device according to a first embodiment.

FIG. 1 is an overall perspective view showing a brake device (hereinafter, referred to as device 1) according to a first embodiment. The device 1 is applied to a brake system for an electric vehicle such as a hybrid vehicle including an engine, and an electric motor (generator), as a power source driving wheels, an electric automobile which includes an electric motor (generator) only, as the power source driving wheels, and so on. These electric vehicles can perform a regenerative braking to brake the vehicle by regenerating a kinetic energy (motion energy) of the vehicle to an electric energy by a regenerative brake device including the motor (generator). Besides, the present invention may be applied, for example, to a non-electric vehicle which includes an engine only, as a driving source. The apparatus 1 is a hydraulic brake device configured to provide a brake hydraulic pressure to the wheels of the vehicle, and thereby to generate the braking force. In particular, when the brake fluid (oil) is supplied to wheel cylinders 8 provided to the wheels 8 of the vehicle, pistons within the wheel cylinders 8 are pressed, brake pads serving as frictional members are pressed against brake discs rotating as a unit with the wheels. With this, the hydraulic pressure braking force is provided to the wheels. Besides, a drum brake may be used in place of the disc brake. The apparatus 1 is arranged to perform the regenerative cooperative control to control this hydraulic pressure braking force, to adequately distribute the hydraulic pressure braking force and the regenerative braking force by the regenerative braking device, and thereby to generate a desired braking force, for example, the braking force desired by a driver.

The apparatus 1 includes a brake pedal 2 which is a brake operation member which receives an input of the brake operation of the driver; a link mechanism 3 which is arranged to vary a variation ratio of a depression force (the brake operation force) to the depression amount (the pedal stroke) of the brake pedal 2 by the driver; a reservoir tank (hereinafter, referred to as a reservoir) 4 which is a brake fluid source arranged to store the brake fluid; a master cylinder 5 which is connected to the brake pedal 2 through the link mechanism 3, to which the brake fluid is supplied from the reservoir 4, and which is a first brake pressure generating source arranged to generate the brake hydraulic pressure in accordance with the operation of the brake pedal 2 (the brake operation) by the driver; a stoke sensor 90 (brake operation amount sensing means) arranged to sense a displacement amount of the brake pedal 2 which is the brake operation amount; a hydraulic pressure unit 6 to which the brake fluid is supplied from the reservoir 4 or the master cylinder 5, and which is a second brake hydraulic pressure generating source arranged to generate the brake hydraulic pressure independently of the brake operation by the driver; and an electric control unit (hereinafter, referred to as ECU) 10 configured to control the operation of the hydraulic pressure unit 6. The reservoir 4, the master cylinder 5, the hydraulic pressure unit 6 (the solenoid valve and a pump 7), and the ECU 10 are integrally provided. The device 1 is constituted as one unit. The hydraulic pressure unit 6 is integrally provided with a motor 60 arranged to drive the pump 7.

The apparatus 1 is not provided with a negative pressure booster (hereinafter, referred to as engine negative pressure booster) arranged to boost or amplify the brake operation force (the depression force of the brake pedal) by using the negative pressure generated by the engine of the vehicle. The apparatus 1 is a brake control apparatus arranged to control the hydraulic pressures of the wheel cylinders 8, that is, the hydraulic pressure braking forces, independently of the brake operation of the driver by using the hydraulic pressure unit 6, that is, to control the hydraulic pressure braking forces. The apparatus 1 is arranged to perform a boost function to generate the hydraulic pressure braking force which is insufficient by the brake operation force of the driver, by this brake hydraulic pressure control, and thereby to assist the brake operation. That is, the apparatus 1 is arranged to assist the brake operation force by actuating the hydraulic pressure unit 6, in place of not providing the negative pressure booster. Moreover, the apparatus 1 is configured to perform an automatic brake control (VDC or ESC) for stabilizing a vehicle behavior by preventing a skid and so on of the vehicle, an anti-lock brake control (ABS) to prevent the wheel lock, and so on, in addition to the above-described regenerative cooperative control.

Figure 2:
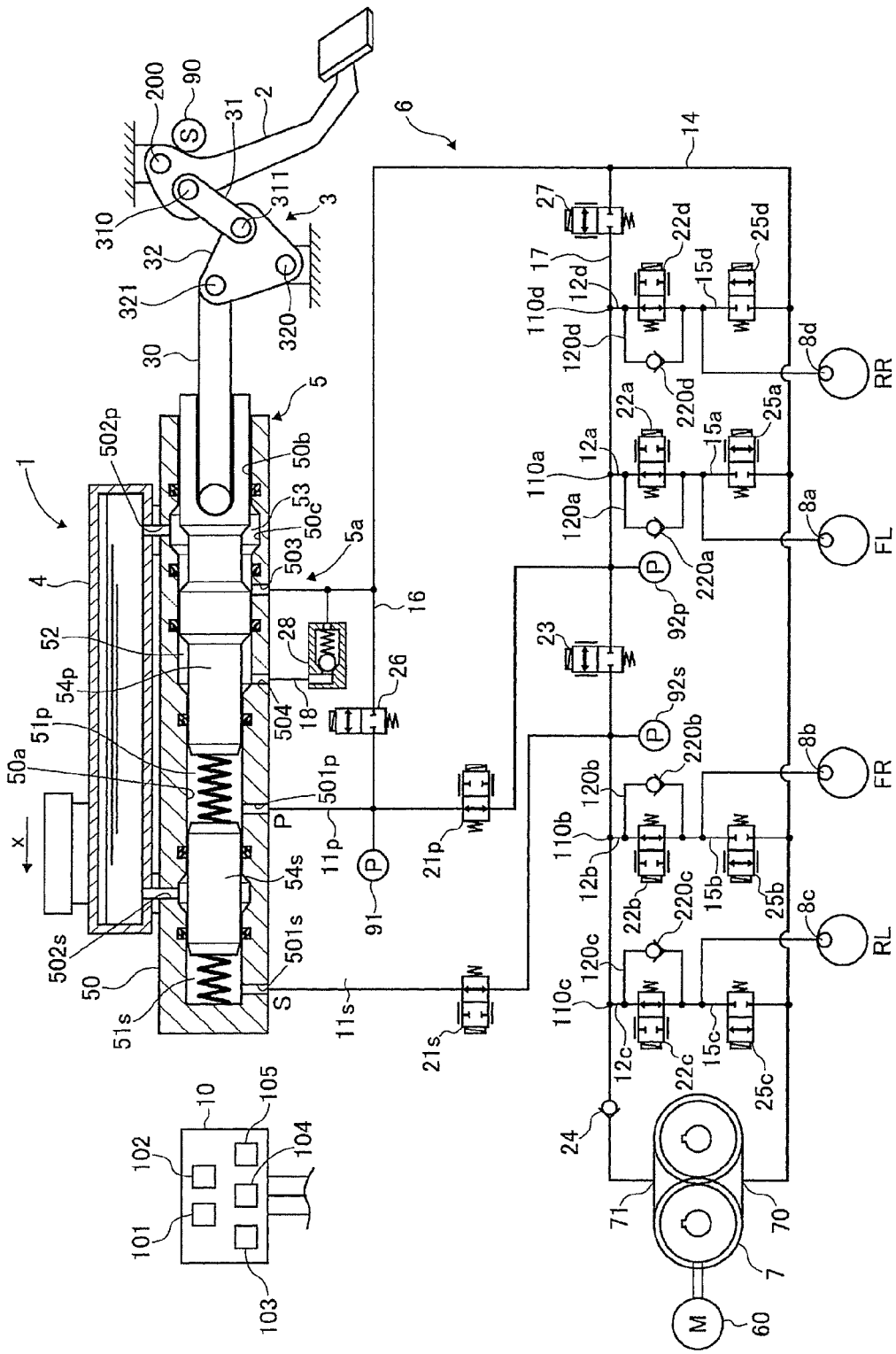
FIG. 2 is a view showing a schematic configuration of the brake device of the first embodiment with a hydraulic pressure circuit of a hydraulic pressure unit.

FIG. 2 is a view showing a schematic configuration of the apparatus 1 with a hydraulic pressure circuit of the hydraulic pressure unit 6. The master cylinder 5 is shown by a partial section which is cut by a plane passing through that axis. Hereinafter, for explanation, an x-axis is provided in a direction in which an axis of a piston 54 extends. A positive direction is a direction (a direction in which the piston 54 is moved in accordance with the depression of the brake pedal 2) which is opposite to the brake pedal 2. The hydraulic pressure brake system includes brake pipes of two systems (a primary P system and a secondary S system). For example, the hydraulic pressure brake system is X-pipe. Besides, the hydraulic pressure brake system may be other pipe systems such as H pipe. A suffix p is added to symbols of members corresponding to the P system. A suffix s is added to symbols of members corresponding to the S system. With this, the members of the P system and the members of the S system are differentiated.

The link mechanism 3 is provided between the brake pedal 2 and the master cylinder 5 to be integrally connected with the master cylinder 5. The link mechanism 3 includes a first link 31 which has a rod shape when it is viewed from a side, and a second link 32 which has a triangular shape when it is viewed from the side. A base end portion of the brake pedal 2 is rotatably supported on the vehicle body side by a shaft 200. A first corner portion of the second link 32 is rotatably supported on the vehicle body side by a shaft 320. One end of the first link 31 is rotatably supported on the based end portion of the brake pedal 2 by a shaft 310. The other end of the first link 31 is rotatably supported on a second corner portion of the second link 32 by a shaft 311. A third corner portion of the second link 32 is rotatably supported on an x-axis negative direction end portion of the push rod 30 which is an input member, by a shaft 321.

Figure 3:
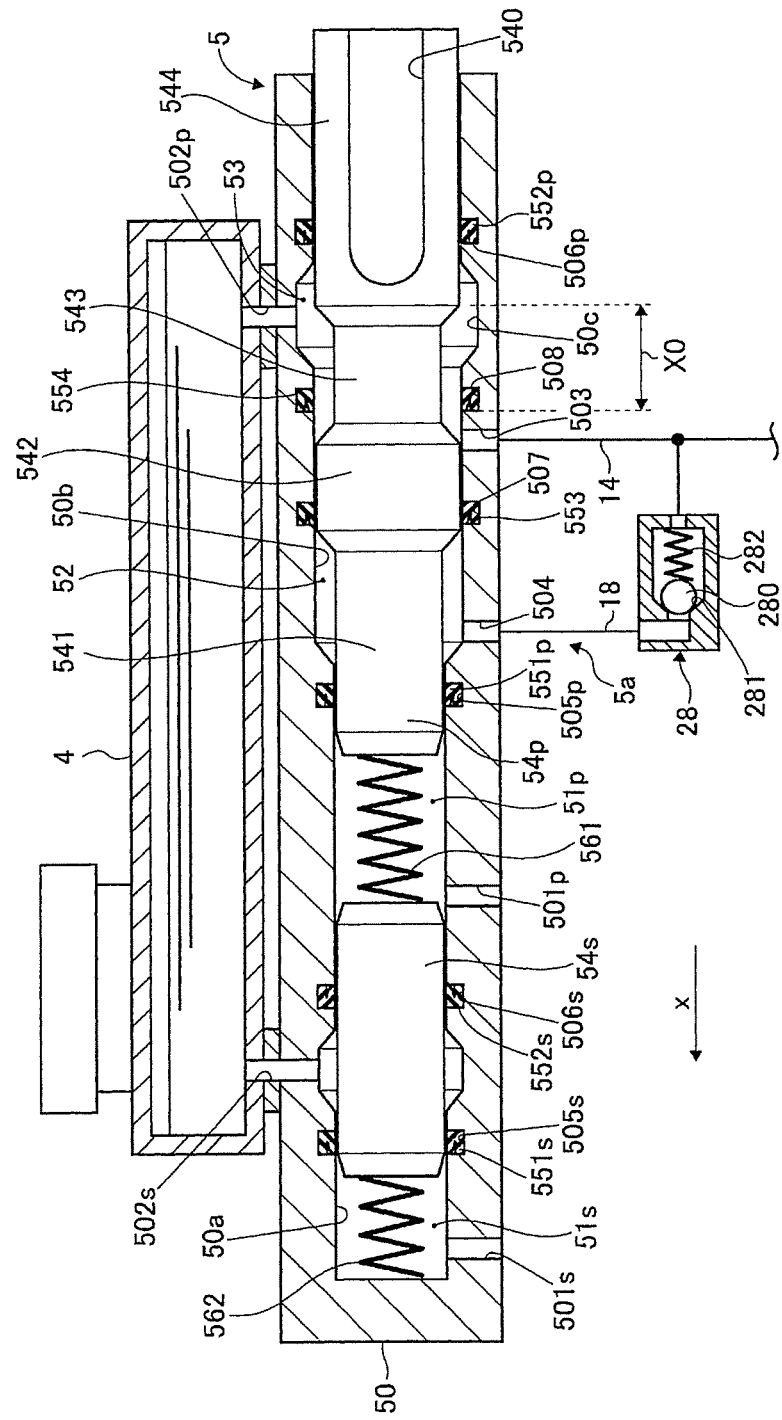
FIG. 3 is a view showing an internal structure of a master cylinder in the first embodiment.

FIG. 3 is a view showing an internal structure of the master cylinder 5. FIG. 3 shows a partial cross section of a cylinder 50 which is obtained by cutting the cylinder 50 in a plane passing through a shaft center (axial center) of the piston 54. The master cylinder 5 is a tandem type master cylinder arranged to generate the brake hydraulic pressure (the master cylinder hydraulic pressure) in accordance with the state of the brake operation of the driver. The master cylinder 5 includes the cylinder 50 which has the cylindrical shape with a bottom, two pistons 54$p$ and 54$s$ inserted within the inner circumference surface of the cylinder 50, and interlocked with the brake pedal 2 (the push rod 30), and piston seals 55 which are a plurality of seal members arranged to seal a portion between the inner circumference surface of the cylinder 50, and outer circumferences of the pistons 54$p$ and 54$s$. The cylinder 50 includes a discharge port (supply port) 501 which is arranged to be connected to the wheel cylinder 8 by being connected to the hydraulic pressure unit 6, and a supply port 502 which is connected and communicated to the reservoir 4. The cylinder 50 includes the discharge ports 501 and the supply ports 502 which are for the P system and the S system. The ports 501 and 502 of the S system are provided on the x-axis positive direction side. In each system, the discharge port 501 is provided on the x-axis positive direction side relative to the supply port 502. Moreover, a suction port 503 is provided at a predetermined x-axis positive direction position between the ports 501$p$ and 502$p$ of the P system. The suction port 503 is arranged to be connected with the hydraulic pressure unit 6 to be communicated with a suction portion 70 of the pump 7. A relief port 504 is provided at a predetermined x-axis direction position between the discharge port 501$p$ and the suction port 503 of the P system. The relief port 504 is arranged to be connected with the hydraulic pressure unit 6 to be communicated with the relief valve 28.

The inner circumference surface of the cylinder 50 is formed into a substantially cylindrical shape. The inner circumference surface of the cylinder 50 is closed in a bag shape at the x-axis positive direction end portion. An inner circumference wall of the cylinder 50 includes a small diameter portion 50a which is provided in a predetermined x-axis direction side region in which the discharge ports 501p and 501s and the supply port 502s of the S system are opened, and which has a relatively small diameter, and a large diameter portion 50b which is provided in a predetermined x-axis negative direction region in which the relief port 504 and the suction port 503 are opened, and which has a relatively large diameter. The large diameter portion 50b is opened on the x-axis negative direction end portion of the cylinder 50. Moreover, the large diameter portion 50b includes a second large diameter portion 50c which is located in a predetermined x-axis direction region in which the supply port 502p of the P system is opened, and which has a diameter larger than the other portions of the large diameter portion 50b. The inner circumference wall of the cylinder 50 includes a plurality of annular grooves which extend in the circumferential direction to surround the shaft center. The first annular grooves 505 are provided at predetermined x-axis direction positions (the small diameter portion 50a) between the discharge port 501 and the supply port 502. The first annular grooves 505 are provided, respectively, in the P and S systems. First piston seals 551 are provided in the first annular grooves 505. Second annular grooves 506 are provided on the x-axis negative direction side relative to the supply ports 502. The second annular grooves 506 are provided, respectively, in the P and S systems. In the P system, the second annular groove 506 is provided in the large diameter portion 50b. In the S system, the second annular groove 506 is provided in the small diameter portion 50a. Second piston seals 552 are provided in the second annular grooves 505. A third annular groove 507 is provided at a predetermined x-axis direction position (the large diameter portion 50b) between the suction port 503 and the relief port 504. A third piston seal 553 is provided in the third annular groove 507. A fourth annular groove 508 is provided at a predetermined x-axis direction position (the large diameter portion 50b) between the suction port 503 and the supply port 502p of the P system. A fourth piston seal 554 is provided in the fourth annular groove 508.

The piston 54 has a substantially cylindrical shape. A piston 54s of the S system is received on the x-axis positive direction side (the small diameter portion 50a) of the cylinder 50. On the other hand, a piston 54p of the P system is received on the x-axis negative direction side (the small diameter portion 50a and the large diameter portion 50b) of the cylinder 50. The piston 54p includes a bottomed hole 540 opened on the x-axis negative direction side. An x-axis positive direction end portion of the push rod 30 is disposed within the bottomed hole 540. A coil spring 561 which is an urging member is disposed in a compressed state between the pistons 54p and 54s. A coil spring 562 is disposed in a compressed state between the piston 54s and the x-axis positive direction end portion of the cylinder 50. The piston 54p is urged by the coil spring 561 in the x-axis negative direction side. Moreover, the piston 54p is urged by the depression of the brake pedal 2 through the push rod 30 in the x-axis positive direction side. The piston 54S is urged by the coil spring 561 in the x-axis positive direction side. Moreover, the piston 54S is urged by the coil spring 562 in the x-axis negative direction side. The coil springs 561 and 562 are return springs of the piston 54.

Moreover, the coil springs 561 and 562 are reaction force providing means arranged to provide an appropriate reaction force to the brake pedal 2.

The piston 54p of the P system includes a first small diameter portion 541 formed on the x-axis positive direction side; a first large diameter portion 542 which is adjacent to an x-axis negative direction side of the first small diameter portion 541, and which has a diameter larger than a diameter of the first small diameter portion 541; a second small diameter portion 543 which is adjacent to an x-axis negative direction side of the first large diameter portion 542, and which has a diameter substantially identical to the diameter of the first small diameter portion 541; and a second large diameter portion 544 which is adjacent to an x-axis negative direction side of the second small diameter portion 543, which has a diameter substantially identical to the diameter of the first large diameter portion 542, and which includes a bottomed hole 540 formed on an inner circumference side of the second large diameter portion 544. The push rod 30 is inserted from an opening portion of the second large diameter portion 544 (the bottomed hole 540) on the x-axis negative direction side. The push rod 30 is disposed so as to be abutted on a bottom portion (of the second large diameter portion 544) on the x-axis positive direction side. The first small diameter portion 541 has a diameter slightly smaller than the diameter of the small diameter portion 50a of the cylinder 50. The first small diameter portion 541 is provided on the x-axis negative direction side of the small diameter portion 50a to be moved in the forward and rearward directions. The first piston seal 551 is slidably abutted on the first small diameter portion 541. The first large diameter portion 542 has a diameter slightly smaller than the diameter of the large diameter portion 50b of the cylinder 50. The first large diameter portion 542 is disposed in the large diameter portion 50b (on the x-axis positive direction side of the second large diameter portion 50c) to be moved in the forward and rearward directions. The third piston seal 553 is slidably abutted on the first large diameter portion 542. The second large diameter portion 544 is disposed in the large diameter portion 50b (mainly on the x-axis negative direction side of the second large diameter portion 50c) of the cylinder 50 to be moved in the forward and rearward directions. The second piston seal 552 is slidably abutted on the second large diameter portion 544. When the piston 54 is moved by a predetermined stroke (movement) X0 or more from an initial position in the x-axis positive direction, the fourth piston seal 554 is slidably abutted on the second large diameter portion 544. The piston 54S of the S system has a diameter substantially identical to the diameter of the first small diameter portion 541 of the piston 54p of the P system. The piston 54S of the S system is disposed on the x-axis positive direction side of the small diameter portion 50a of the cylinder 50 to be moved in the forward and rearward directions. The first piston seal 551s and the second piston seal 552s are slidably abutted on the piston 54s.

In the P system, the first piston seal 551p defines a first fluid chamber 51p on the x-axis positive direction side of the first piston seal 551p. The first fluid chamber 51p is constituted mainly by a space among the x-axis positive direction end surface of the piston 54p (the first small diameter portion 541), the x-axis negative direction end surface of the piston 54s, and the inner circumference surface of the cylinder 50 (the small diameter portion 50a). The discharge port 501p is constantly opened to the first fluid chamber 51p. The third piston seal 553 defines a second fluid chamber 52 on the x-axis positive direction side of the third piston seal 553. The second fluid chamber 52 is constituted mainly by a space among the x-axis positive direction end surface (a taper surface connecting the first small diameter portion 541 and the first large diameter portion 542) of the piston 54p, the outer circumference surface of the first small diameter portion 541, and an inner circumference surface of the cylinder 50 (the large diameter portion 50b). A relief port 504 is constantly opened to the second fluid chamber 52. The second piston seal 552 defines a third fluid chamber 53 with the third piston seal 553. The third fluid chamber 53 is constituted mainly by a space among an x-axis negative direction end surface (a taper surface connecting the first large diameter portion 542 and the second small diameter portion 543) of the first large diameter portion 542 of the piston 54p, outer circumference surfaces of the second small diameter portion 543 and the second large diameter portion 544, and an inner circumference surface of the cylinder 50 (the large diameter portion 50b and the second large diameter portion 50c). The supply port 502 and the suction port 503 are constantly opened to the third fluid chamber 53. In the S system, the first piston seal 551s defines a first fluid chamber 51s on the x-axis positive direction side of the first piston seal 551s. The first fluid chamber 51s is constituted mainly by a space among the x-axis positive direction end surface of the piston 54s and the inner circumference surface of the cylinder 50 (the small diameter portion 50a). The discharge port 501s is constantly opened to the first fluid chamber 51s.

As shown in FIG. 3, in an initial state where the brake pedal 2 is not depressed, a predetermined x-axis direction distance X0 is provided between (the x-axis positive direction end of) the second large diameter portion 544 of the piston 54p, and the inner circumference side end portion (of the lip portion) of the fourth piston seal 554. When the movement amount (hereinafter, referred to as a piston stroke X) of the piston 54p from the initial position toward the x-axis positive direction is smaller than the above-described distance X0 (hereinafter, referred to as a predetermined stroke) ($0 \leq X < X0$), the fourth piston seal 554 is positioned at a position at which the fourth piston seal 554 surrounds the second small diameter portion 543 of the piston 54p. The fourth piston seal 554 is not slidably abutted on the outer circumference of the second large diameter portion 544. On the other hand, when the piston stroke X is equal to or greater than X0 ($X \geq \ldots$), the fourth piston seal 554 is slidably abutted on the second large diameter portion 542. Besides, the predetermined stroke X0 is set, for example, to a maximum value in a region where the piston 54 is moved by the normal brake operation (the operation force or the pedal stroke) of the driver.

Each of the piston seals 55 has a known seal member having a cup-shaped section which includes a lip portion positioned on the radially inner side. In a state in which the lip portion is slidably abutted on the outer circumference surface of the piston 54, each of the piston seals 55 is arranged to allow a flow of the brake fluid in one direction, and to suppress a flow of the brake fluid in the other direction. In the P system, the first piston seal 551 is disposed in a direction to allow only a flow of the brake fluid from the second fluid chamber 52 to the first fluid chamber 51, and to suppress the flow of the brake fluid from the first fluid chamber 51 to the second fluid chamber 52. The second piston seal 552 is disposed in a direction to suppress a flow of the brake fluid from the third fluid chamber 53 to the outside of the cylinder 50. The third piston seal 553 is disposed in a direction to allow only the flow of the brake fluid from the third fluid chamber 53 to the second fluid chamber 52, and to suppress the flow of the brake fluid from the second fluid chamber 52 to the third fluid chamber 53. In a state in which the fourth piston seal 554 is slidably abutted on the second large diameter portion 544 (in a state where the piston 54p is moved by X0 or more), the fourth piston seal 554 is disposed in a direction to allow the only flow of the brake fluid from the supply port 502 to the suction port 503, and to suppress the flow of the brake fluid from the suction port 503 to the supply port 502. In the S system, the first piston seal 551 is disposed in a direction to allow the only flow of the brake fluid from the supply port 502s to the first fluid chamber 51, and to suppress the flow of the brake fluid from the first fluid chamber 51 to the supply port 502s. The second piston seal 552 is disposed in a direction to suppress the flow of the brake fluid from the first fluid chamber 51p of the P system to the supply port 502s.

The relief hydraulic passage 18 is connected to the relief port 504. The relief hydraulic passage 18 is merged in the suction hydraulic passage 14 described later. The relief hydraulic passage 18 is connected through the suction hydraulic passage 14 to the suction port 503. A relief valve 28 is provided in the relief hydraulic passage 18. The relief valve 28 is arranged to prohibit the flow of the brake fluid from the suction port 503 (the suction hydraulic passage 14)'s side to the relief port 504 (the second fluid chamber 52)'s side. The relief valve 28 is arranged to open when the hydraulic pressure of the relief port 504's side (the hydraulic pressure of the second fluid chamber 52) becomes equal to or greater than a predetermined pressure (the relief pressure), and thereby to allow the flow of the brake fluid from the relief port 504 (the second fluid chamber 52)'s side to the suction port 503 (the suction hydraulic passage 14)'s side. In particular, the relief valve 28 includes a ball 280 which is a valve element, a valve seat 281 to which the relief hydraulic passage 18 is opened, and an elastic member (coil spring) 282 which is an urging member. The elastic member 282 is arranged to press the ball 280 against the valve seat 281 and to constantly urge the ball 280 in a direction in which the opening of the relief hydraulic passage 18 is closed. The hydraulic pressure on the relief port 504's side (the hydraulic pressure of the second fluid chamber 52) presses the ball 280 in a direction opposite to the elastic member 282, that is, in a direction to separate from the valve seat 281. The relief pressure at which the ball 280 is separated from the valve seat 281 is adjusted by adjusting the urging force (set load) of the elastic member 281.

As described above, the master cylinder 5 includes the first fluid chamber 51 connected to the discharge port 501, and the second fluid chamber 52 connected to the relief port 504. The first and second fluid chambers 51 and 52 are arranged to receive the supply of the brake fluid from the reservoir 4. The first fluid chamber 51 decreases a volume thereof when the piston 54 is moved in the x-axis positive direction side by the brake operation of the driver, so that the hydraulic pressure is generated. With this, the brake fluid is supplied from the first fluid chamber 51 through the discharge port 501 toward the wheel cylinders 8. Besides, in the P system and the S system, the substantially same hydraulic pressure is generated in the first hydraulic chambers 51p and 51s.

As shown in FIG. 2, the hydraulic pressure unit 6 is provided between the wheel cylinders 8 provided to the respective wheels FL-RR, and the master cylinder 5. The hydraulic pressure unit 6 is arranged to independently supply the master cylinder hydraulic pressure or the control hydraulic pressure to the wheel cylinders 8. The hydraulic pressure unit 6 includes a pump 7 which is a hydraulic pressure generating source and a plurality of control valves (solenoid valves (electromagnetic valves)), that are hydraulic pressure devices (actuators) arranged to generate the control hydraulic pressure supplied to the respective wheel cylinders 8. The pump 7 is rotationally driven by a motor 60 so as to suck the brake fluid within the master cylinder 5 or the reservoir 4, and to discharge (the brake fluid) toward the wheel cylinders 8. The first embodiment employs a gear pump which has a good sound vibration performance, and so on. In particular, an external gear pump is employed. The pump 7 is shared by the both systems. The pump 7 is driven by the same motor 60. The solenoid valves are arranged to open and close in accordance with the control signal, and to control the flow of the brake fluid. Hereinafter, suffixes a-d are added, respectively, to the symbols of members corresponding to the wheels FL-RR.

The hydraulic pressure unit 6 includes a first hydraulic passage 11 connecting the discharge port 501 of the master cylinder 5 and the discharge portion 71 of the pump 7; a normally-open (the valve is opened in the deenergization state) shutoff valve (gate out valve) 21 provided in the first hydraulic passage 11; a second hydraulic passage 12 which is bifurcated from a branch portion 110 of the first hydraulic passage 11 between the discharge portion 71 of the pump 7 and the shutoff valve 21, and which is connected to the wheel cylinders 8; a normally-open pressure increasing valve 22 provided in the second hydraulic passage 12; the suction hydraulic passage 14 connecting the suction port 503 of the master cylinder 5 and the suction portion 70 of the pump 7; a first pressure decreasing hydraulic passage 15 connecting the second hydraulic passage 12 and the suction hydraulic passage 14; a normally-closed (the valve is closed in the deenergization state) first pressure decreasing valve 25 provided in the first pressure decreasing hydraulic passage 15; a second pressure decreasing hydraulic passage 16 which is bifurcated from a portion of the first hydraulic passage 11$p$ between the discharge port 501$p$ of the master cylinder 5 and the shutoff valve 21$p$, and which is connected to the suction hydraulic passage 14; a normally-closed second pressure decreasing valve 26 provided in the second pressure decreasing hydraulic passage 16; a third pressure decreasing hydraulic passage 17 which is bifurcated from a portion (a branch portion 110$d$) of the first hydraulic passage 11 between the discharge port 71 of the pump 7 and the shutoff valve 21; and a normally-closed third pressure decreasing valve 27 which is provided in the third pressure decreasing hydraulic passage 17. Moreover, the first hydraulic passage 11$p$ of the P system and the first hydraulic passage 11$s$ of the S system are merged into each other, and connected to the discharge portion 71 of the pump 7. In one of the first hydraulic passages 11$p$ and 11$s$ (the first hydraulic passage 11$p$ in the first embodiment) before the interflow, a normally-closed connection valve 23 is provided between the discharge portion 71 of the pump 7 and the shutoff valve 21 (between the branch portion 110$a$ of the P system and the branch portion 110$b$ of the S system in the first embodiment). The connection valve 23 is arranged to switch the connection/disconnection between the first hydraulic passages 11$p$ and 11$s$. The second pressure decreasing valve 27, and at least one of the shutoff valve 21, the pressure increasing valve 22, the connection valve 23, and the first pressure decreasing valves 25 in the respective systems (the first pressure decreasing valves 25$a$ and 25$b$ of the front wheels FL and FR in the first embodiment) is a proportional control valve in which an opening degree of the valve is adjusted in proportional to the current supplied to the solenoid. The other valves (the first pressure decreasing valves 25$c$ and 25$d$ of the rear wheels RL and RR, and the second pressure decreasing valve 26) is an ON/OFF valve which is controlled in an ON/OFF manner. Besides, the proportional control valve may be used for the above-described other valves.

A check valve (discharge valve of the pump 7) 24 is provided in the first hydraulic passage 11 between the branch portion 110$c$ and the discharge portion 71 of the pump 7. The check valve 24 is arranged to allow the only flow of the brake fluid from the discharge portion 71's side to the branch portion 110$c$'s side. The check valve 24 is arranged to suppress the actuation of the high pressure from the master cylinder 5 (the first fluid chamber 51)'s side to the discharge portion 71 of the pump 7 by the brake operation of the driver. With this, it is possible to improve the durability of the pump 7. The hydraulic passage 120 is provided to the second hydraulic passage 12 in parallel to the pressure increase valve 22. The check valve 220 is provided in the hydraulic passage 120. The check valve 220 is arranged to allow the only flow of the brake fluid from the wheel cylinder 8's side to the branch portion 110's side, and to prohibit the flow in the opposite direction. The check valve 220 is arranged to open the valve when the brake fluid is returned from the wheel cylinders 8 to the master cylinder 5's side, so as to return the brake fluid through the hydraulic passage 120 (the check valve 220) in addition to the second hydraulic passage 12 (the pressure increasing valve 22). With this, the pressure decreases of the wheel cylinder hydraulic pressures are smoothed. The suction hydraulic passage 14 is arranged to directly connect the low pressure side of the first pressure decreasing valve 25 (the side opposite to the wheel cylinder 8's side) and the low pressure side of the pump 7 (the suction portion 70), without (passing) through an internal reservoir and so on.

In the P system, a hydraulic pressure sensor 91 is provided in the first hydraulic passage 11$p$ between the discharge port 501 of the master cylinder 5 and the shutoff valve 21. The hydraulic pressure sensor 91 is arranged to sense the hydraulic pressure of that portion. The sensed value of the hydraulic pressure sensor 91 is inputted to the ECU 10. In the P system and the S system, the substantially identical pressure is generated in the first fluid chambers 51$p$ and 51$s$. Accordingly, the hydraulic pressure sensed by the hydraulic pressure sensor 91 is the hydraulic pressures (the master cylinder hydraulic pressure) of the first fluid chambers 51$p$ and 51$s$. Moreover, in the P and S systems, hydraulic pressure sensors 92 are provided in the first hydraulic passages 11 between the discharge portion 71 (the branch portion 110) of the pump 7 and the shutoff valve 21. The hydraulic pressure sensors 92 are arranged to sense the hydraulic pressures (the pump discharge pressures) of that portion. The sensed values of the hydraulic pressure sensors 92 are inputted to the ECU 10.

The brake system connecting the first fluid chamber 51 of the master cylinder 5 and the wheel cylinder 8 constitutes a first system arranged to generate the wheel cylinder hydraulic pressure by the master cylinder hydraulic pressure generated by the pedal depression force (hereinafter, referred to as the depression force brake). This brake system attains the normal brake (non-boost control). On the other hand, the brake system including the pump 7, and connecting the third fluid chamber 53 (the reservoir 4) of the master cylinder 5 and the wheel cylinders 8 constitutes a second system arranged to generate the wheel cylinder hydraulic pressure by the hydraulic pressure generated by using the pump 7 (hereinafter, referred to as a pump up (pumping)). This brake system attains the boost control, the regenerative cooperative control, and so on. In this case, a first state represents a state where the piston 54 of the master cylinder 5 is moved by X0 or less, and the supply port 502 and the suction port 503 are connected with each other. A second state represents a state where the piston 54 is moved by X0 or more, and the supply port 502 and the suction port 503 are disconnected (a state where the flow of the brake fluid from the supply port 502 to the suction port 503 is allowed, and the flow in the opposite direction is suppressed). The apparatus 1 is arranged to generate the wheel cylinder hydraulic pressure by the hydraulic pressure of the first fluid chamber 51 (that is, the first system) which is generated by the brake operation of the driver, in the first and second states (that is, irrespective of the amount of the piston stroke X). This hydraulic pressure generating means constitutes a first brake hydraulic pressure generating device. The apparatus 1 is arranged to actuate the pump 7 (that is, by the second system), and to generate the wheel cylinder hydraulic pressure, so as to attain the brake hydraulic pressure desired by the driver, the regenerative braking device and so on. This hydraulic pressure generating means constitutes a second brake hydraulic pressure generating device.

The hydraulic pressure unit 6 and the ECU 10 constitute a hydraulic pressure control section configured to actuate the pump 7 and the solenoid valve (the shutoff valve 21 and so on) based on the various information, and thereby to control the hydraulic pressures of the wheel cylinders 8. The ECU 10 includes a brake operation amount sensing section 101 configured to sense a displacement amount of the brake pedal 2 (hereinafter, referred to as a pedal stroke S) which is a brake operation amount, by receiving the input of the sensed value of the stroke sensor 90, and a target wheel cylinder hydraulic pressure calculating section 102 configured to calculate a target wheel cylinder hydraulic pressure based on the sensed brake operation amount (pedal stroke S). Besides, the stroke sensor 90 is not limited to a sensor arranged to directly sense the displacement amount of the brake pedal 2. The stroke sensor 90 may be a sensor arranged to sense the displacement amount of the push rod 30. Moreover, there may be provided a depression force sensor arranged to sense the depression force of the brake pedal 2, and the brake pedal operation amount may be sensed based on that sensed value. That is, the brake operation amount used in the control is not limited to the pedal stroke S. Other appropriate variables may be used as the brake operation amount.

In particular, the target wheel cylinder hydraulic pressure calculating section 102 is configured to calculate a target wheel cylinder hydraulic pressure attaining a predetermined boost ratio, that is, the ideal relationship characteristics between the pedal stroke S and the desired brake hydraulic pressure of the driver (the vehicle deceleration G desired by the driver). In the first embodiment, the above-described ideal relationship characteristics for calculating the target wheel cylinder hydraulic pressure is set to a predetermined relationship characteristics (cf. FIG. 14) between the wheel cylinder hydraulic pressure P (the brake hydraulic pressure) and the pedal stroke S attained at the operation of the engine negative pressure booster, for example, in a brake apparatus (hereinafter, referred to as a comparative example 1) which includes the engine negative pressure booster of the normal size, and which does not include the link mechanism 3 and a first fill mechanism 5a described later (a structure relating to a stepped piston 54p and the relief valve 28). Moreover, the target wheel cylinder hydraulic pressure calculating section 102 calculates the target wheel cylinder hydraulic pressure by the relationship with the regenerative braking force at the regenerative cooperative control. In particular, the target wheel cylinder hydraulic pressure is calculated so that the sum of the regenerative braking force inputted from the control unit of the regenerative braking device and the hydraulic pressure braking force corresponding to the target wheel cylinder hydraulic pressure satisfies the vehicle deceleration (the desired brake hydraulic pressure) desired by the driver. Besides, at the VDC, the target wheel cylinder hydraulic pressures of the respective wheels are calculated, for example, based on the sensed vehicle motion state amount (the lateral acceleration and so on), so as to attain the desired vehicle driving state.

The ECU 10 is configured to switch the first brake hydraulic pressure generating device and the second brake hydraulic pressure generating device based on the calculated target wheel cylinder hydraulic pressure, and to control the operation of the second brake hydraulic pressure generating device. In particular, when the brake operation amount sensing section 101 senses the start of the brake operation, the ECU 10 is configured to generate the wheel cylinder hydraulic pressure by the first brake hydraulic pressure generating device when the calculated target wheel cylinder hydraulic pressure is equal to or smaller than the predetermined value P1 (for example, the value corresponding to the maximum value of the vehicle deceleration G generated by the normal brake operation which is not the sudden brake). On the other hand, when the calculated target wheel cylinder hydraulic pressure is greater than the predetermined hydraulic pressure P1, the hydraulic pressure unit 6 is brought to the operation state (the ECU 10 brings the hydraulic pressure unit 6 to the operation state). That is, the second brake hydraulic pressure generating device generates the wheel cylinder hydraulic pressure. The ECU 10 includes a pressure increase control section 103 configured to control the actuators (the second brake hydraulic pressure generating device) of the hydraulic pressure unit 6, and thereby to increase the hydraulic pressures of the wheel cylinders 8; a pressure decrease control section 104 configured to decrease that hydraulic pressures; and a (pressure) holding control section 105 configured to hold that hydraulic pressure.

[Operation of Hydraulic Pressure Control Section]

FIG. 4 to FIG. 9 show an outline of flows of the brake fluid at the controls of the hydraulic pressure unit 6 by bold lines.

(Normal Brake: At Depression Force Brake)

Figure 4:
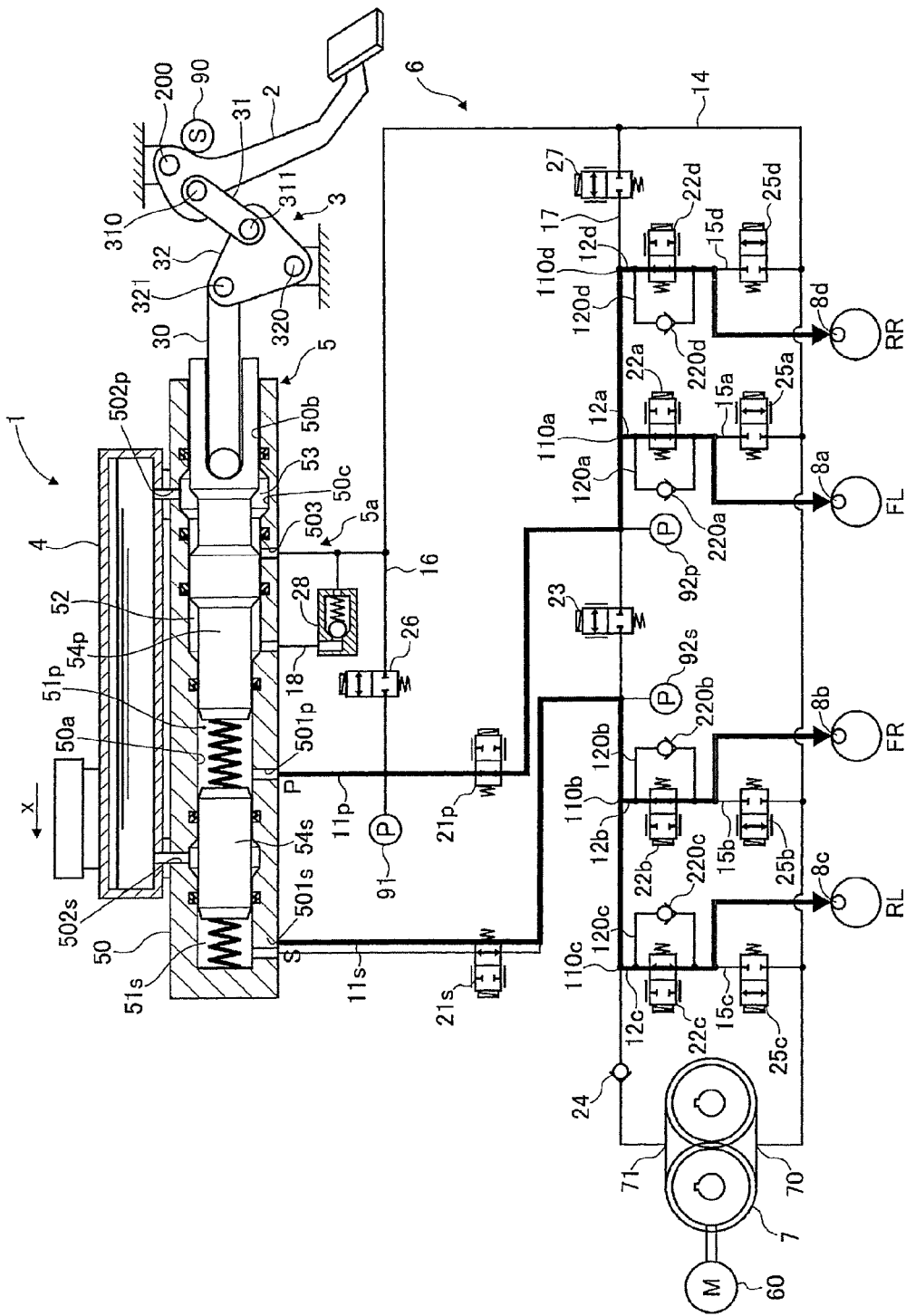
FIG. 4 shows a flow of a brake fluid at a deactivation of the hydraulic pressure unit of the first embodiment.

At the initial stage of the braking, that is, in the predetermined low pressure region (0<P≤P1) after the brake operation is started, the apparatus 1 generates the wheel cylinder pressure P by the first brake hydraulic pressure generating device (the first system). In particular, in a case where the calculated target wheel cylinder hydraulic pressure is equal to or smaller than the predetermined hydraulic pressure P1 when the brake operation amount sensing section 101 senses the start of the brake operation, the ECU 10 brings the hydraulic pressure unit 6 to the deenergization state, and brings the pump 7 and the solenoid valves to the non-actuation state (deenergization state). In a case where the hydraulic pressure P1 is converted to the vehicle deceleration G, the hydraulic pressure P1 corresponds to about 0.1-0.2 G. Accordingly, as shown in FIG. 4, the brake fluid is supplied from the master cylinder 5 (the first fluid chambers 51) toward the wheel cylinders 8 in accordance with the depression operation of the brake pedal 2 (at the pressure increase). Moreover, when (the depression of) the brake pedal 2 is returned, the brake fluid is returned from the wheel cylinders 8 toward the master cylinder 5 (the first fluid chambers 51) (at the pressure decrease). In particular, the brake fluid is supplied to and discharged from the wheel cylinders 8, from the first fluid chambers 51 of the respective systems of the master cylinder 5 through the first hydraulic passage 11 and the second hydraulic passage 12. That is, the hydraulic pressure (the master cylinder hydraulic pressure) of the first fluid chambers 51 generated in accordance with the operation of the brake pedal 2 is supplied to the wheel cylinders 8. Besides, in a case where the brake fluid which has an amount more than that of the first fluid chamber 51s of the secondary side may be supplied from the first fluid chamber 51p on the primary side by the first fill mechanism 5a, the connection valve 23 may be controlled in the valve opening direction for supplying the same pressure to the wheels.

(Normal Brake; at Boost Control)

In the predetermined high pressure region (P1<P) while the brake operation is performed, the apparatus 1 generates the wheel cylinder hydraulic pressure P by the second brake hydraulic pressure generating device (the second system). With this, the apparatus 1 attains the boost function. In particular, when the calculated target wheel cylinder hydraulic pressure is greater than the predetermined hydraulic pressure P1 in a state where the brake operation is performed, the ECU 10 drives the hydraulic pressure unit 6, and thereby generates the wheel cylinder hydraulic pressures. Hereinafter, the operations of the pressure increase, the pressure decrease, and the pressure holding are illustrated.

Figure 5:
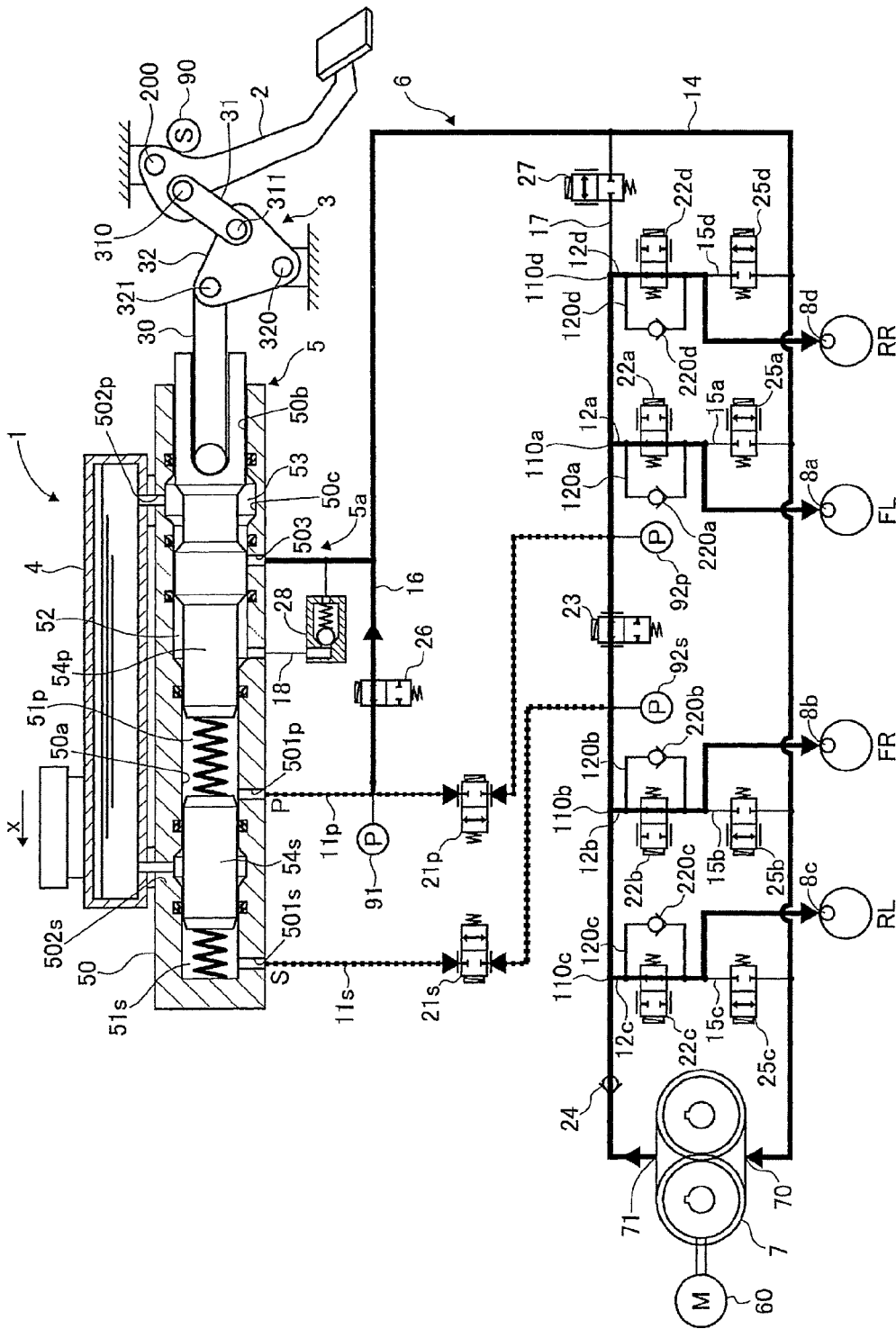
FIG. 5 shows a flow of the brake fluid at a boost control (pressure increase control) of the hydraulic pressure unit in the first embodiment.

As shown in FIG. 5, the pressure increase control section 103 of the ECU 10 drives the pump 7 in a state where the brake operation (depression) is performed. Moreover, the pressure increase control section 103 of the ECU 10 controls the shutoff valve 21 in the valve closing direction, controls the pressure increase valve 22 in the valve opening direction, and controls the connection valve 23 in the valve opening direction. With this, the wheel cylinder hydraulic pressure is increased. It is possible to perform the pressure increase control by the thus easy control. The control is performed so that the wheel cylinder hydraulic pressure becomes the target hydraulic pressure by controlling the rotation speed (the discharge amount) and so on of the pump 7 based on the sensed value of the hydraulic pressure sensor 92. In the first embodiment, the pressure increase valve 22 is the proportional control valve. Accordingly, it is possible to perform the detailed control, and to attain the smooth pressure increase control. The pump 7 sucks the brake fluid within the reservoir 4 through the master cylinder 5 (the supply port 502, the third hydraulic chamber 53, and the suction port 503), and the suction hydraulic passage 14. Moreover, the second pressure decrease valve 26 is controlled in the valve opening direction (the valve opening amount is controlled in case of using the proportional control valve). Accordingly, the pump 7 sucks the brake fluid within the first fluid chamber 51p of the master cylinder 5 through the second pressure decrease hydraulic passage 16 and the suction hydraulic passage 14. The brake fluid discharged from the pump 7 is supplied through the second hydraulic passages 12 to the wheel cylinders 8. The connection valve 23 is controlled in the valve opening direction. Accordingly, the brake fluid discharged from the pump 7 is supplied to the wheel cylinders 8 of the both P and S systems. In this way, the connection valve 23 is provided between the shutoff valve 21 and the pressure increase valve 22, and the P system and the S system are connected with each other. Accordingly, it is possible to increase the pressures of the four wheels by one pump 7 and the one motor 60 (a set of the pump and the motor). Consequently, it is possible to simplify the structure of the hydraulic pressure unit 6, and to decrease the size and the weight of the apparatus 1. Besides, in the hydraulic pressure unit 6, the unit of the pump and the motor, and the unit of the solenoid valves may be different units. In this case, it is possible to decrease the size of the chassis (the housings) which receive the units, relative to a case of the integral member (unit). It is possible to improve the vehicle mountability. Moreover, it is possible to improve the influence of the sound and the vibration by mounting the pump/motor to a position apart from the vehicle interior. Furthermore, the pressure increase control section 103 of the ECU 10 controls the shutoff valves 21 in the valve closing direction, and controls the second pressure decreasing valve 26 in the valve opening direction based on the sensed value of the hydraulic pressure sensor 91 (the valve opening amount is controlled when the proportional control valve is used). With this, the pressure increase control section 103 of the ECU 10 controls so that the master cylinder hydraulic pressure becomes the target hydraulic pressure. The brake fluid discharged from the first fluid chamber 51p of the primary side of the master cylinder 5 passes through the second pressure decrease valve 26, and through the suction hydraulic passage 14 and the third fluid chamber of the master cylinder, and returns to the reservoir 4.

Figure 6:
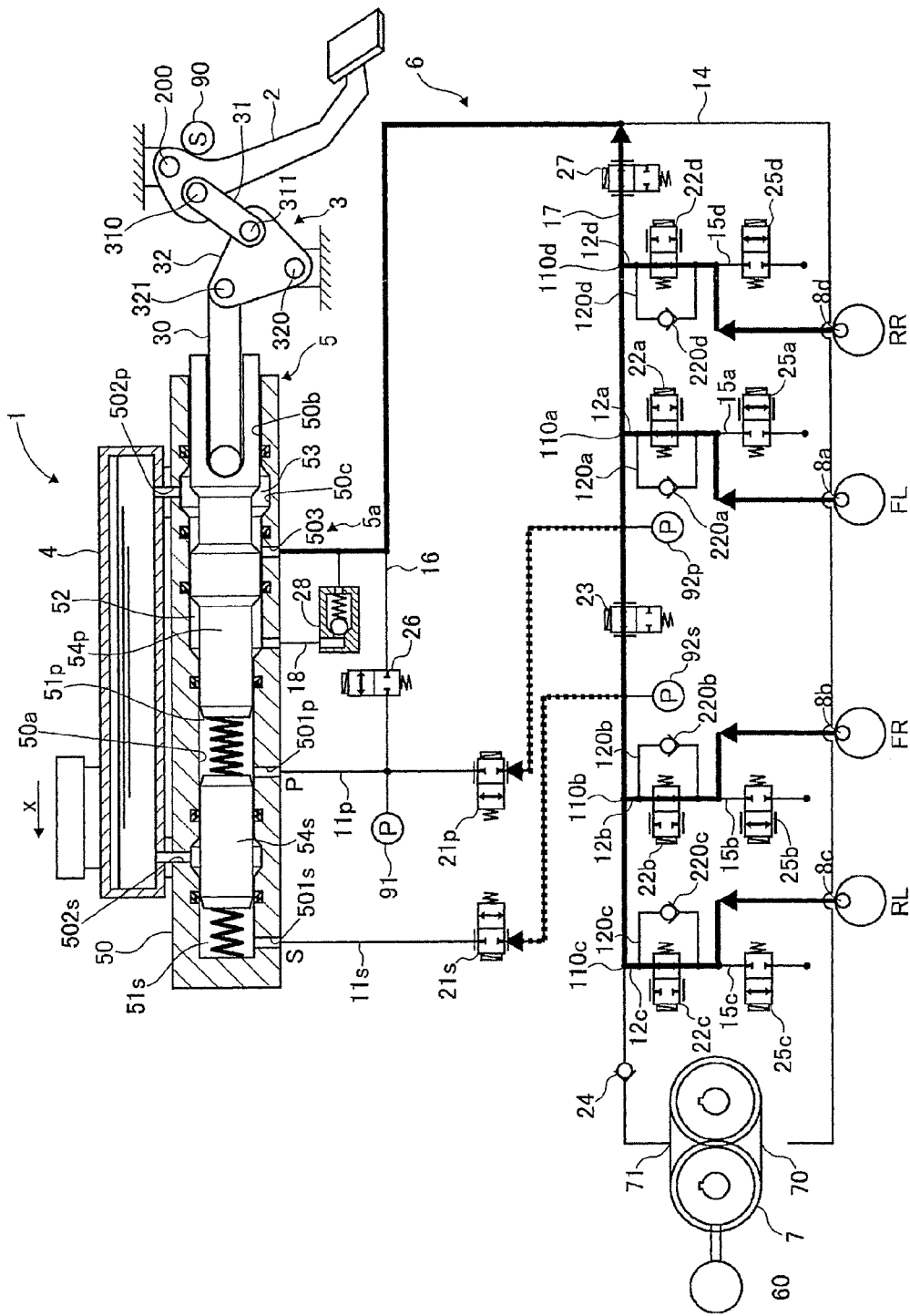
FIG. 6 shows a flow of the brake fluid at a boost control (pressure decrease control) of the hydraulic pressure unit in the first embodiment.

As shown in FIG. 6, in a state where the brake operation (depression return) is performed, the pressure decreasing control section 104 of the ECU 10 controls the shutoff valve 21 in the valve closing direction, controls the pressure increase valve 22 in the valve opening direction, controls the connection valve 23 in the valve opening direction, and controls the third pressure decreasing valve 27 in the valve opening direction. With this, the pressure decreasing control section 104 of the ECU 10 decreases the wheel cylinder hydraulic pressure. It is possible to perform the pressure decrease control by the thus-easy control. The control is performed so that the wheel cylinder hydraulic pressure becomes the target hydraulic pressure by controlling the valve opening amount of the third pressure decreasing valve 27, and so on (the valve opening amount and so on of the third pressure decreasing valve 27), based on the sensed value of the hydraulic pressure sensor 92. In the first embodiment, the third pressure decreasing valve 27 is the proportional control valve. Accordingly, it is possible to perform the detailed control, and to attain the smooth pressure decreasing control. The brake fluid returned from the wheel cylinders 8 through the second hydraulic passage 12, the third pressure decreasing hydraulic passage 17, and the suction hydraulic passage 14 to the third fluid chamber 53 of the master cylinder 5 is returned through the supply port 502 to the reservoir 4 when the amount of the piston stroke X is smaller than X0 (the first state). Accordingly, it is preferable that the amount of the piston stroke X becomes smaller than X0 for the smooth pressure decreasing control of the wheel cylinder 8. Consequently, X0 is set equal to or greater than a maximum value in a region where the piston 54p is moved by the normal brake operation of the driver (the depression force F or the pedal stroke S) in a state where the supply of the brake fluid from the master cylinder 5 (the first fluid chamber 51) to the wheel cylinder 8 is shut off. The brake fluid from the wheel cylinders 8 is returned through the suction hydraulic passage 14 to the third fluid chamber 53 (the reservoir 4) of the master cylinder 5. On the other hand, the first hydraulic passage 11 is shut off by the shutoff valve 21. The return of the brake fluid from the wheel cylinders 8 to the first fluid chamber 51 of the master cylinder 5 is suppressed. Besides, the pressure decrease control section 104 of the ECU 10 may control the shutoff valve 21 in the valve closing direction, and may control the second pressure decreasing valve 26 in the valve opening direction based on the sensed value of the hydraulic pressure sensor 91. With this, the pressure decreasing control section 104 of the ECU 10 may control so that the master cylinder hydraulic pressure becomes the target hydraulic pressure. Moreover, the wheel cylinder hydraulic pressures may be decreased by the first pressure decreasing valve 25 in place of the third pressure decreasing valve 27. In the first embodiment, the pressure is decreased through the third pressure decreasing valve 27. Accordingly, it is possible to simplify the control. That is, the wheel cylinder hydraulic pressures of the wheels need not to be independently controlled. It is possible to simultaneously decrease the wheel cylinder hydraulic pressures of the four wheels by one third pressure decreasing valve 27. Accordingly, it is possible to suppress the electric power consumption.

In a state where the brake operation (the holding) is performed, the pressure holding control section 105 of the ECU 10 controls the shutoff valve 21 in the valve closing direction, controls the connection valve 23 in the valve opening direction, and brings the other actuators to the non-actuation state. It is possible to perform the holding control by the thus-easy control. The first hydraulic passage 11 is shut off by the shutoff valve 11. Accordingly, the brake fluid is not supplied from the first hydraulic chambers 51 of the master cylinder 5 to the wheel cylinders 8. The hydraulic pressure of the wheel cylinders 8 are not escaped from the shutoff valve 21, the first pressure decreasing valve 25, and the third pressure decreasing valve 27. Accordingly, the hydraulic pressure of the wheel cylinders 8 is held.

(Regenerative Cooperative Control)

When the regenerative braking device is operated in a state where the brake operation is performed, the apparatus 1 generates the wheel cylinder hydraulic pressure by the second brake hydraulic pressure generating device (the second system), and thereby performs the regenerative cooperative control. In particular, the ECU 10 calculates the target wheel cylinder hydraulic pressure based on the sensed brake operation amount (the desired braking force by the driver) and the inputted regenerative braking force. The ECU 10 drives the hydraulic pressure unit 6 so as to attain this target wheel cylinder hydraulic pressure. For example, when the wheel cylinder hydraulic pressure is generated by the first or second hydraulic pressure generating device (at the normal brake), the pressure decrease control section 104 decreases the wheel cylinder hydraulic pressure in accordance with the increase of the regenerative braking force by the regenerative braking device, and so on. The concrete operations of the hydraulic pressure unit at the control of the pressure decrease, the pressure increase, and the pressure holding are basically identical to those at the normal braking (at the boost control).

Figure 7:
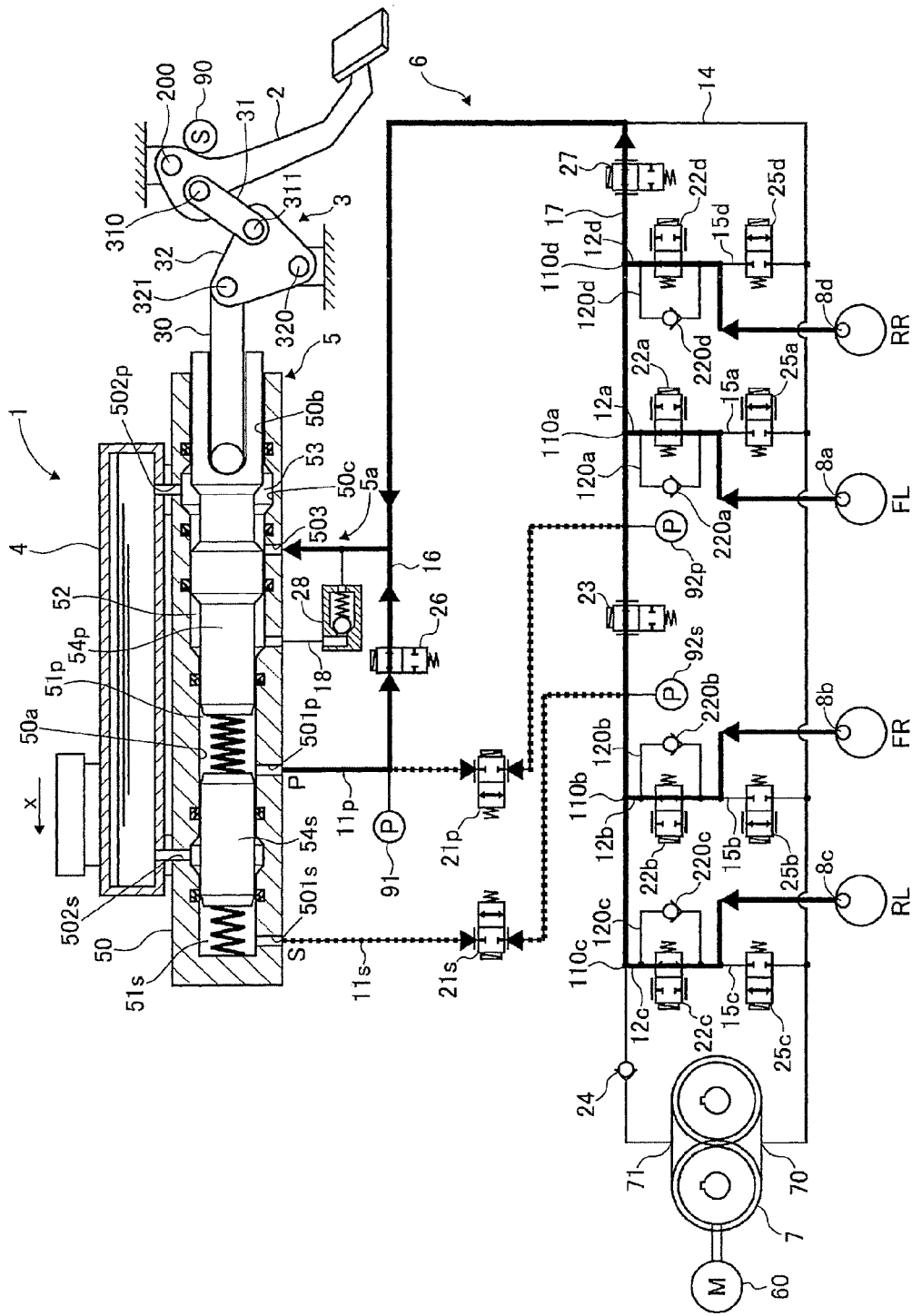
FIG. 7 shows a flow of the brake fluid at a regenerative cooperative control (pressure decrease control) of the hydraulic pressure unit in the first embodiment.

As shown in FIG. 7, in a state where the brake operation (the depression, the depression return, or the holding) is performed, the pressure decrease control section 104 of the ECU 10 controls the shutoff valve 21 in the valve closing direction, controls the pressure increase valve 22 in the valve opening direction, controls the connection valve 23 in the valve opening direction, and controls the third pressure decreasing valve 27 in the valve opening direction, so that the wheel cylinder hydraulic pressure are decreased, similarly to the pressure decrease control at the normal brake (at the boost control). The valve opening amount of the third pressure decrease valve 27 and so on is controlled based on the sensed value of the hydraulic pressure sensor 92. With this, the control is performed so that the wheel cylinder hydraulic pressure becomes the target hydraulic pressure. Moreover, the pressure decrease control section 104 of the ECU 10 controls the shutoff valve 21 in the valve closing direction, and controls the second pressure decreasing valve 26 in the valve opening direction based on the sensed value of the hydraulic pressure sensor 91 (the valve opening amount is controlled in case of using the proportional control valve). With this, the control is performed so that the master cylinder hydraulic pressure becomes the target hydraulic pressure. For example, at the depression of the brake pedal, the brake fluid discharged from the first hydraulic chamber 54 on the primary side of the master cylinder 5 passes through the second pressure decrease valve 26, and is returned through the suction hydraulic passage 14 and the third fluid chamber of the master cylinder to the reservoir 4.

Figure 8:
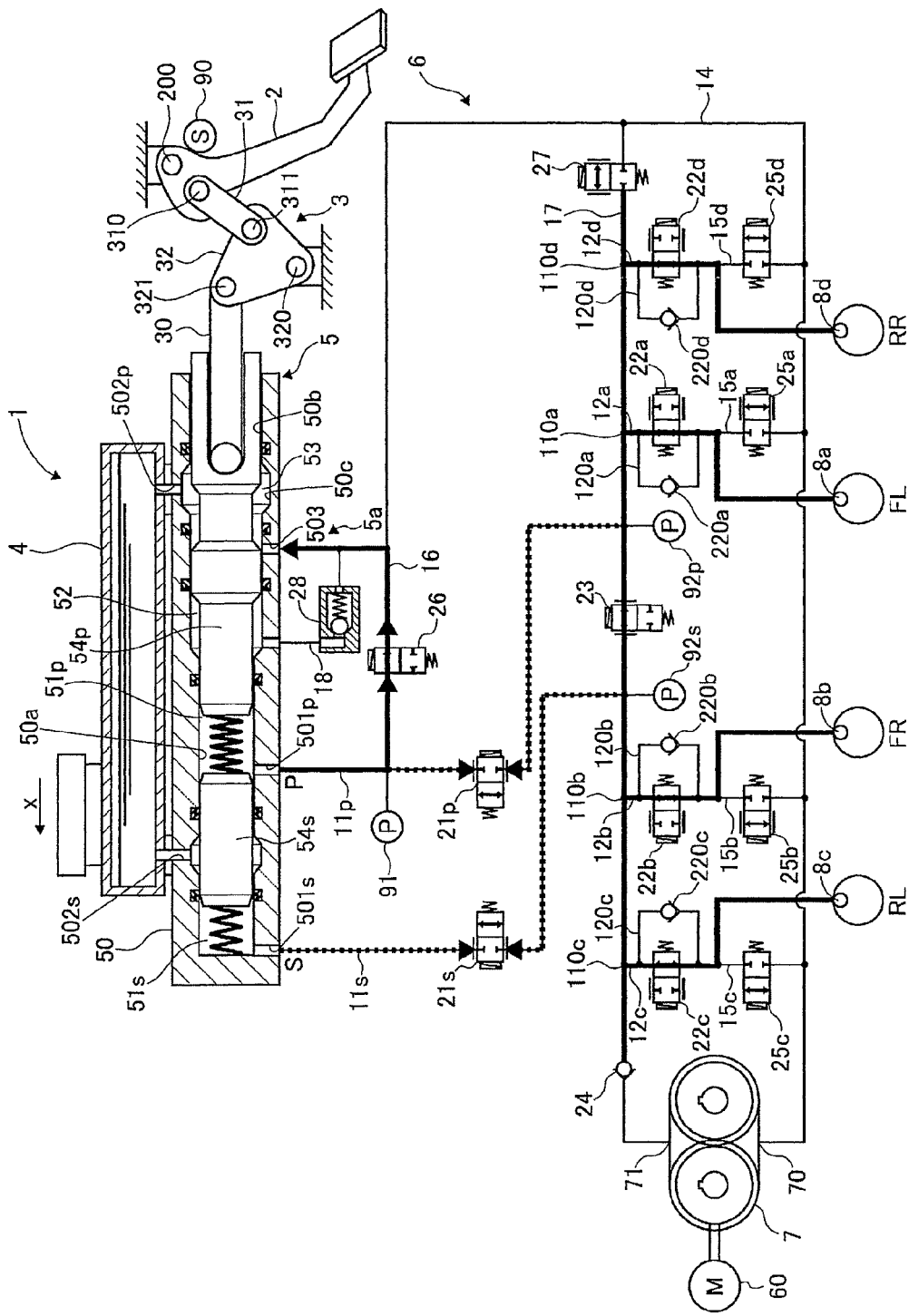
FIG. 8 shows a flow of the brake fluid at the regenerative cooperative control (pressure holding control) of the hydraulic pressure unit in the first embodiment.

As shown in FIG. 8, in a state where the brake operation (the depression, the depression return, or the holding) is performed, the holding control section 105 of the ECU 10 controls the shutoff valve 21 in the valve closing direction, controls the pressure increase valve 22 and the connection valve 23 in the valve opening direction, and controls the first pressure decrease valve 25 and the third pressure decrease valve 27 in the valve closing direction, so that the hydraulic pressures of the wheel cylinders 8 are held, similarly to the holding control at the normal brake (at the boost control). Furthermore, the holding control section 105 of the ECU 10 controls the shutoff valve 21 in the valve closing direction, and controls the second pressure decrease valve 26 in the valve opening direction based on the sensed value of the hydraulic pressure sensor 91 (the valve open amount is controlled in case of using the proportional control valve). With this, the control is performed so that the master cylinder hydraulic pressure becomes the target hydraulic pressure. For example, at the depression of the brake pedal, the brake fluid discharged from the first hydraulic chamber on the primary side of the master cylinder 5 passes through the second pressure decrease valve 26, and is returned through the suction hydraulic passage 14 and the third fluid chamber 53 of the master cylinder 5 to the reservoir 4.

Figure 9:
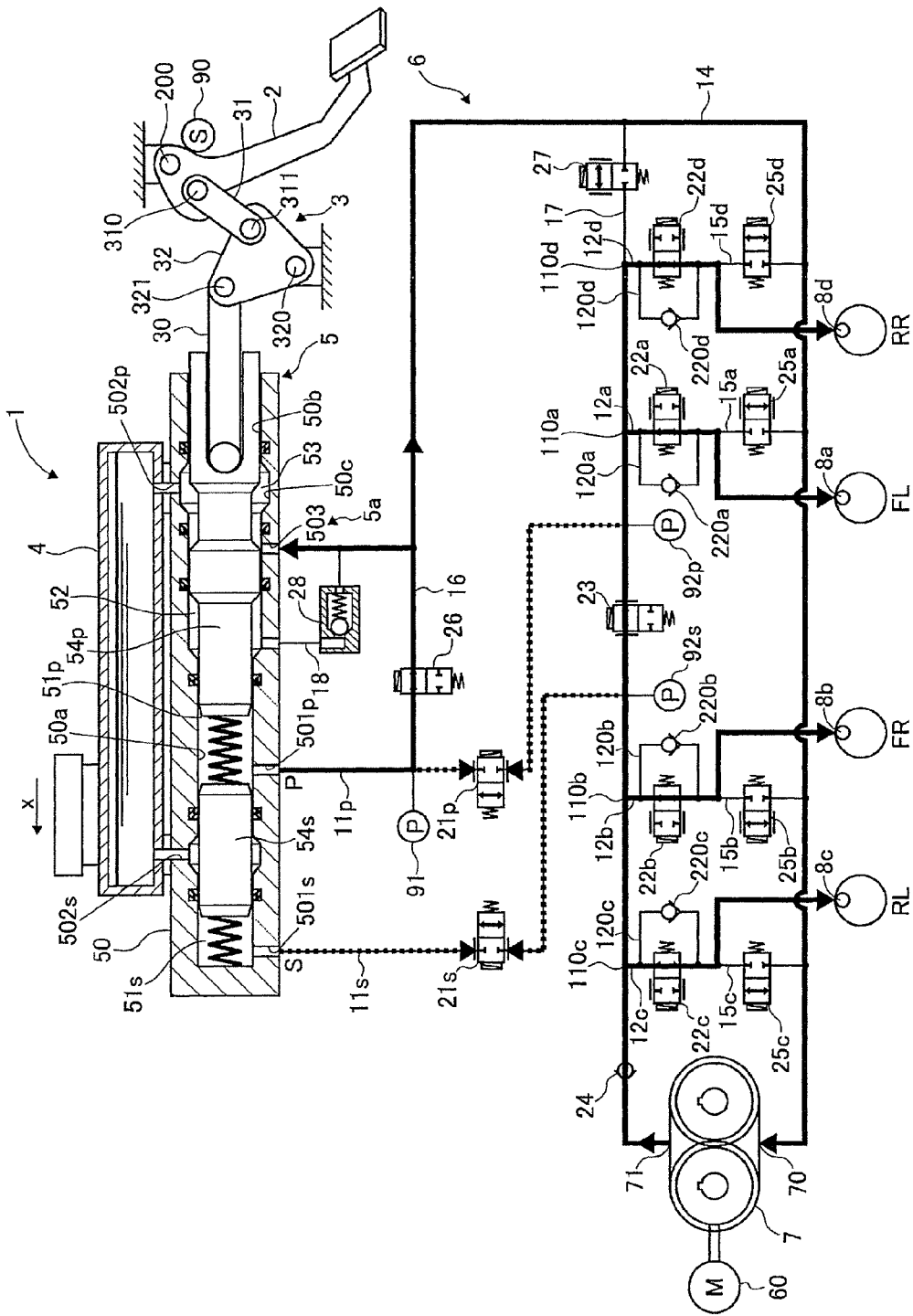
FIG. 9 shows a flow of the brake fluid at the regenerative cooperative control (pressure increase control) of the hydraulic pressure unit in the first embodiment.

As shown in FIG. 9, in a state where the brake operation (the depression, the depression return, or the holding) is performed, similar to the pressure increase control at the normal brake (at the boost control), the pressure increase control section 103 of the ECU 10 drives the pump 7, controls the shutoff valves 21 in the valve closing direction, controls the pressure increase valves 22 in the valve opening direction, and controls the connection valve 23 in the valve opening direction. With this, the wheel cylinder hydraulic pressure is increased. The rotation speed (the discharge amount) of the pump 7 is controlled based on the sensed value of the hydraulic pressure sensors 92. With this, the control is performed so that the wheel cylinder hydraulic pressure becomes the target hydraulic pressure. Moreover, the pressure increase control section 103 of the ECU 10 controls the shutoff valve 21 in the valve closing direction, and controls the second pressure decrease valve 26 in the valve opening direction based on the sensed value of the hydraulic pressure sensor 91. With this, the control is performed so that the master cylinder hydraulic pressure becomes the target hydraulic pressure. For example, at the depression of the brake pedal, the brake fluid discharged from the first fluid chamber 51*p* of the primary side of the master cylinder 5 passes through the second pressure decrease valve 26, and is returned to the suction passage 14.

(VDC/ABS)

In a state where the brake operation is performed or in a state where the brake operation is not performed, the apparatus 1 generates the wheel cylinder hydraulic pressure by the second brake hydraulic pressure generating device (the second system), so that the VDC control is performed.

In particular, the ECU 10 drives the hydraulic pressure unit 6 so as to attain the calculated target wheel cylinder hydraulic pressure. Moreover, when the lock of the wheel is sensed in the state where the brake operation is performed, the apparatus 1 generates the wheel cylinder hydraulic pressure by the second brake hydraulic pressure generating device (the second system). With this, the ABS control is performed. In particular, the ECU 10 repeats the pressure decrease, the holding, and the pressure increase of the wheel cylinder fluid, so as to drive the hydraulic pressure unit 6 so that the slip rate of the wheel falls within a predetermined range. Besides, the ABS control may be performed by setting the target wheel cylinder hydraulic pressure, and then by controlling the wheel cylinder hydraulic pressure so that the wheel cylinder hydraulic pressure becomes the target wheel cylinder hydraulic pressure. The concrete operations of the hydraulic pressure unit 6 at the pressure decrease, the pressure increase, and the holding are identical to those at the regenerative cooperative control. However, in the VDC/ABS, the wheel cylinder hydraulic pressures of the controlled object are independently increased by controlling the opening and the closing of each of the pressure increase valves 22. The wheel cylinder hydraulic pressure of the controlled object is independently decreased by controlling the opening and the closing of each of the first pressure decreasing valves 25, not the third pressure decreasing valve 27. Moreover, the master cylinder hydraulic pressure may be not necessarily controlled by controlling the second pressure decreasing valve 26 in the valve open direction. Moreover, at the holding, and the pressure increase at the ABS, the actuators other than the pressure increase valve 22 may be not controlled (the shutoff valve 21 is brought to the valve opening state), and the only pressure increase valves 22 may be controlled, so that the wheel cylinder hydraulic pressures are held or increased.

[Operation of First Embodiment]

Next, operations of the apparatus 1 is illustrated.

[Operation of Link Mechanism]

When the brake pedal 2 is depressed, a base end portion of the brake pedal 2 is rotated around a shaft 200. This rotational force (the depression force) is converted through the link mechanism 3 to a force in a linear direction to move the push rod 30 in the x-axis positive direction side. In this case, the link mechanism 3 is arranged so that the variation amount $\Delta X$ of the x-axis direction movement amount (the piston stroke X) of the push rod 30 with respect to this variation amount $\Delta S$ of the depression amount S is varied by the desired characteristics. That is, the link mechanism 3 (the position of the fulcrum, and the shape and the length of the link, and so on) is adjusted so that the depression force (hereinafter, referred to as the depression force F) of the brake pedal 2 which is necessary for moving the push rod 30 (the piston 54$p$) by the same amount (distance) is varied by the desired characteristics in accordance with the pedal stroke S. In particular, the ratio k ($=\Delta S/\Delta X$) of the pedal stroke S to the piston stroke X, that is, the ratio k (the lever ratio or the boost ratio) of the thrust force (impellent force) (hereinafter, referred to as a piston thrust Fp) of the piston 54$p$ by the push rod 30 with respect to the depression force F is set to a large value (for example, k=about 5-7) when the pedal stroke is in a relatively small region where the pedal stroke S is from zero to the predetermined value S1, and to a small value (for example, k=about 3-4) when the pedal stroke S is in a relatively large region where the pedal stroke S is larger than the predetermined value S1.

Figure 10:
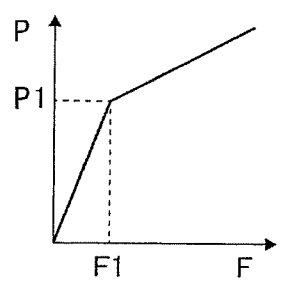
FIG. 10 shows a relationship characteristics between a depression force and a hydraulic pressure in a case where a link mechanism is applied.

FIG. 10 shows a relation characteristics between the depression force F and the hydraulic pressure of the first fluid chamber 51 (corresponding to the hydraulic pressure P of the wheel cylinder 8) in a case where the link mechanism 3 is applied to the normal master cylinder (which is not provided with a first fill mechanism 5$a$ described later). In a relatively small value where the depression force F is from zero to the predetermined value F1 (the magnitude of the depression force F when the pedal stroke S is the predetermined value S1 in the first embodiment), the variation ratio of the piston thrust Fp to the depression force F is larger than the variation ratio in a case where the depression force F is in the relatively greater value where the depression force is greater than the predetermined value F1. That is, in a case where the pedal stroke S is relatively small, the lever ratio is set to the large value by the link mechanism 3. Accordingly, the piston thrust force Fp becomes large with respect to the same depression force F, relative to the case where the pedal stroke S is relatively large. It is possible to obtain the large piston thrust force Fp by the small depression force F. In this case, in the normal master cylinder (which is not provided with the first fill mechanism 5$a$ described later), the hydraulic pressure P is directly proportional to the piston thrust force F. Accordingly, the relation characteristic between the depression force F and the hydraulic pressure P becomes as shown in FIG. 10. The lever ratio k is varied at the predetermined value S1 (F1) which is the boundary, in accordance with the amount of the pedal stroke S (the depression force F). Accordingly, the variation rate of the hydraulic pressure P to the depression force F is varied at the predetermined value S1 (F1) which is the boundary. Besides, the hydraulic pressure P at the predetermined value S1 (F1) is set, for example, to a value P1 identical to the hydraulic pressure which is the base (reference) for switching the depression force brake and the pump up. However, the hydraulic pressure P at the predetermined value S1 (F1) is not limited to this.

In this way, the link mechanism 3 is an operation force varying mechanism (for example, a boost mechanism arranged to decrease the brake operation force of the driver) arranged to vary the lever ratio k in accordance with the brake operation amount (the pedal stroke S or the depression force F) of the driver, and thereby to vary the variation rate of the piston thrust Fp to the brake operation force (the depression force F) of the driver. Moreover, the link mechanism 3 is a hydraulic pressure varying mechanism arranged to vary the variation rate of the hydraulic pressure P (the brake hydraulic pressure supplied from the first fluid chamber 51 toward the wheel cylinder 8) to the depression force F.

[Operation of First Fill Mechanism]

Figure 11:
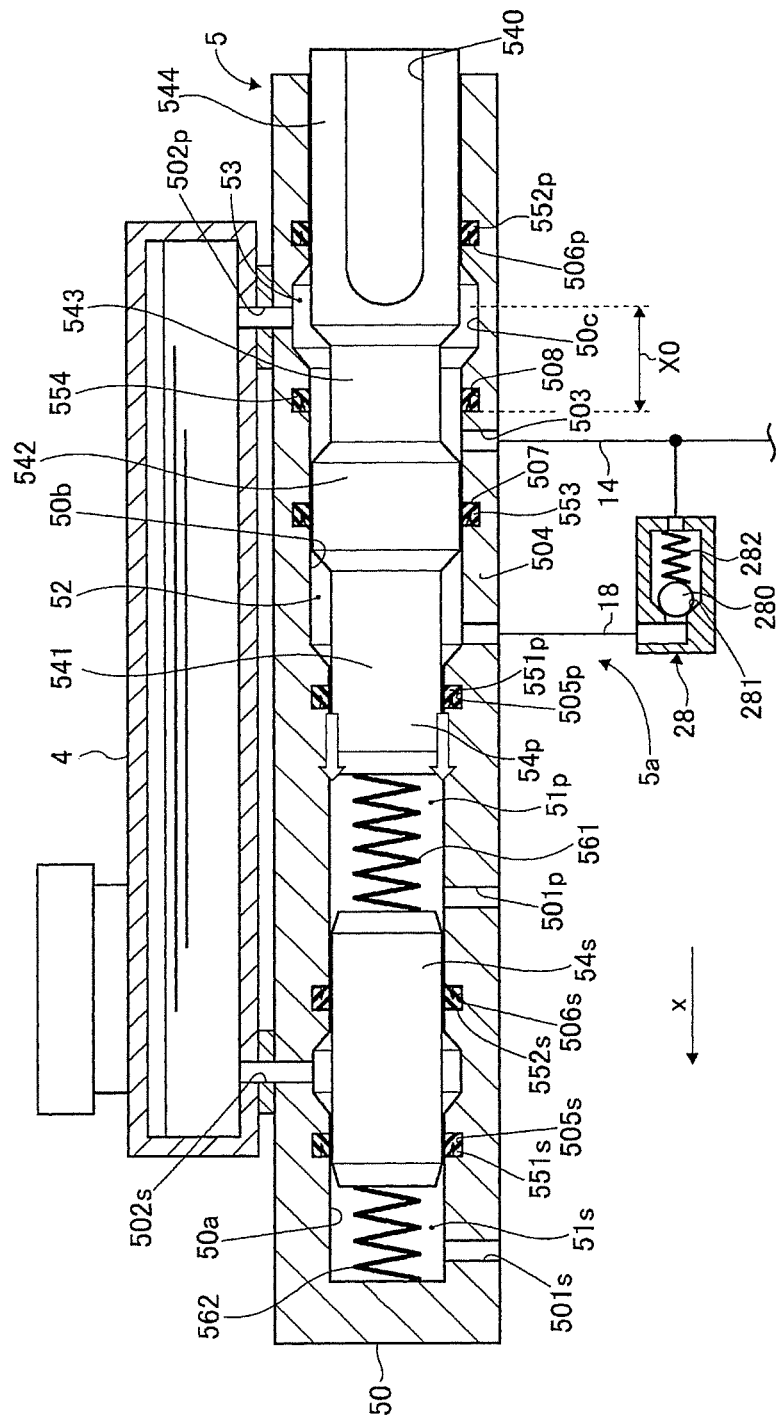
FIG. 11 is a view showing a flow of the brake fluid in a master cylinder in the first embodiment (when a pedal stroke is equal to or smaller than a predetermined value).
Figure 12:
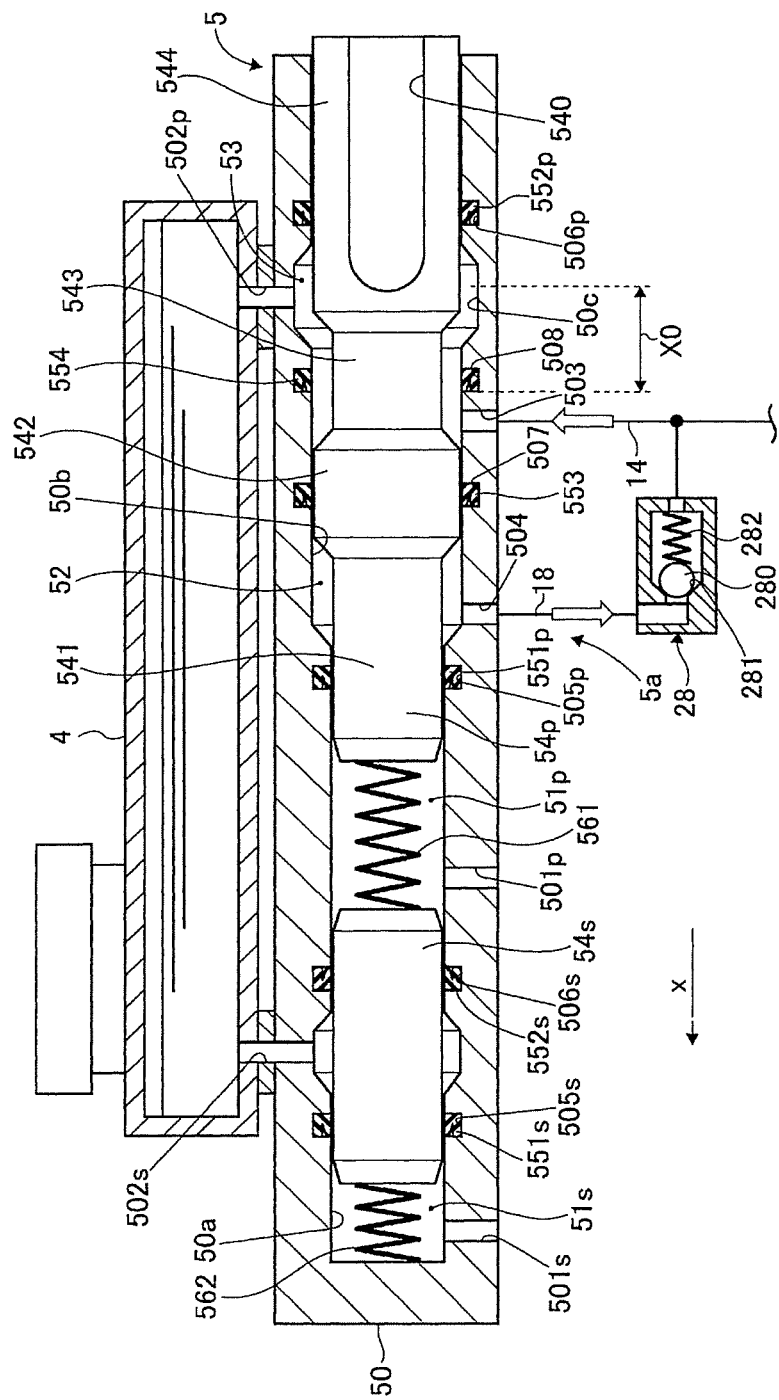
FIG. 12 is a view showing a flow of the brake fluid in the master cylinder in the first embodiment (when the pedal stroke exceeds the predetermined value).

FIG. 11 and FIG. 12 are partial sectional views identical to FIG. 3. FIG. 11 and FIG. 12 show, by arrows, main part of the flow of the brake fluid in the master cylinder 5 when the brake pedal 2 is depressed. FIG. 11 shows an operation when the pedal stroke S is equal to or smaller than the predetermined value S1. FIG. 12 shows an operation when the pedal stroke S exceeds the predetermined value S1. Hereinafter, for ease of explanation, the link mechanism 3 is not provided. Moreover, it is in the normal brake operation (for example, it is not the sudden brake). The pedal stroke speed dS/dt is within the predetermined range. In a case where the link mechanism 3 is not provided, the piston stroke X is proportional to the pedal stroke S. Accordingly, for simplifying this, it is set to S=X. Besides, even in a case where the link mechanism 3 is provided, X is determined by one to one relation with respect to S based on the arrangement of the link mechanism 3. In the master cylinder 5 of the first embodiment, at least one of the piston 54 (the piston 54$p$) has a stepped shape having a part whose a caliber is different (including a first small diameter portion 541 and a first large diameter portion 542). Moreover, irrespective of the piston stroke X, the piston seal 551 allows a flow of the brake fluid from the second fluid chamber 52 to the first fluid chamber 51, and on the other hand, suppresses the flow of the brake fluid in the opposite direction. The third piston seal 553 allows the flow of the brake fluid from the third fluid chamber 53 (the reservoir 4 side) to the second fluid chamber 52, and on the other hand, suppresses the flow of the brake fluid in the opposite direction. Moreover, the master cylinder 5 is provided with a relief valve 28 connected to the second fluid chamber 52.

With this, the brake fluid is supplied from the second fluid chamber 52 to the first fluid chamber 51$p$ (defined by the first small diameter portion 541) in accordance with the piston stroke X (the pedal stroke S) until the hydraulic pressure of the second fluid chamber 52 (defined by the first large diameter portion 542) becomes equal to or greater than the predetermined value (the relief pressure). When the hydraulic pressure of the second fluid chamber 52 becomes equal to or greater than the predetermined value (the relief pressure), the supply of the brake fluid from the second fluid chamber 52 to the first fluid chamber 51 is suppressed. In particular, when the piston stroke X (the pedal stroke S) is relatively small (the piston stroke X is smaller than the predetermined stroke S1 at which the hydraulic pressure of the second fluid chamber 52 becomes the relief pressure), the hydraulic pressure of the second fluid chamber 52 is smaller than the relief pressure. Accordingly, the relief valve 28 is closed. On the other hand, the first fluid chamber 51 is connected to the wheel cylinders 8. Consequently, the increase rate (the hydraulic pressure rigidity) of the hydraulic pressure to the volume decrease according to the increase of the piston stroke X in the second fluid chamber 52 becomes larger than that of the first fluid chamber 51. That is, at a timing immediately after the depression of the brake, the pressure of the second hydraulic chamber 52 is greater than that of the first fluid chamber 51. Accordingly, as shown in FIG. 11, the brake fluid of the second fluid chamber 52 passes through the third piston seal 553, and flows toward the first fluid chamber 51. The brake fluid more than that of the normal master cylinder (for example, the piston includes the only first small diameter portion 541, and does not include the first large diameter portion 542) is supplied toward the wheel cylinder 8. That is, the piston 54p serves as the large diameter piston until the pedal stroke S reaches S1 (the hydraulic pressure of the second fluid chamber 52 reaches the relief pressure). In particular, the brake fluid amount corresponding to a product (the decrease of the volume of the second hydraulic chamber 52) of the pressure receiving area of the first large diameter portion 542 and the piston stoke X is supplied to the first fluid chamber 51. The sum of this brake fluid amount, and the brake fluid amount corresponding to the product (the decrease of the volume of the first fluid chamber 51) of the pressure receiving area of the first small diameter portion 541 and the piston stroke X is supplied from the first fluid chamber 51 toward the wheel cylinder 8.

On the other hand, when the piston stroke X (the pedal stroke S) is relatively large (equal to or greater than S1), the hydraulic pressure of the second fluid chamber 52 becomes equal to or greater than the relief pressure. Accordingly, the relief valve 28 is opened. Consequently, as shown in FIG. 12, the brake fluid of the second fluid chamber 52 passes through the relief valve 28, and flows toward the reservoir 4. Except when the pressure of the first fluid chamber 51 is lower than the pressure of the second fluid chamber 52 (the relief pressure), the brake fluid of the second fluid chamber 52 passes through the relief valve 28, and is discharged toward the reservoir 4. Accordingly, the brake fluid of the second fluid chamber 52 pass through the first piston seal 551, and is not supplied to the first fluid chamber 51. That is, after the pedal stroke S becomes equal to or greater than S1 (the hydraulic pressure of the second fluid chamber 52 is equal to or greater than the relief pressure), the piston 54p serves as the small diameter piston. In particular, the only brake fluid amount corresponding to a product (the decrease of the volume of the first fluid chamber 51) of the pressure receiving area of the first small diameter portion 541, and the piston stroke X is supplied from the first fluid chamber 51 toward the wheel cylinder 8. Besides, when the hydraulic pressure (the relief pressure) of the second fluid chamber 52 is greater than the hydraulic pressure of the first fluid chamber 51, the brake fluid passes through the first piston seal 551 similarly to the above described case, and is supplied to the first fluid chamber 51. Accordingly, the amount of the brake fluid (hereinafter, referred to as the fluid amount Q) supplied from the first fluid chamber 51 toward the hydraulic pressure unit 6 (the wheel cylinders 8) is varied in accordance with the pedal stroke S.

Figure 13:
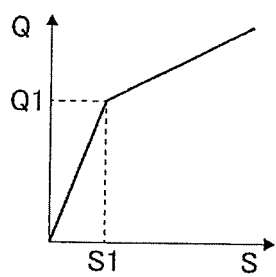
FIG. 13 shows a relationship characteristics between a flow rate and the pedal stroke in a case where a first fill mechanism is applied.

FIG. 13 shows a relationship characteristics of the fluid amount Q and the pedal stroke S. As shown in FIG. 13, when the pedal stroke S is a relatively small value in a region from zero to the predetermined value S1, the variation rate (the variation gradient) of the fluid amount Q to the pedal stroke S is larger than that in a case where the pedal stroke S is a relatively large value in a region larger than the predetermined value S1. Besides, in the first embodiment, the predetermined value S1 is a value identical to a value at which the lever ratio k of the link mechanism 3 is varied. However, the predetermined value S1 is not limited to this. In this way, the stepped shape of the piston 54p and the above-described structure relating to the relief valve 28 constitutes the first fill mechanism 5a arranged to vary the variation rate of the fluid amount Q to the pedal stroke S as described above in accordance with the amount of the pedal stroke S, and has a function to increase the total fluid amount supplied from the master cylinder 5 to the wheel cylinders 8 immediately after the depression of the brake pedal. By providing the first fill mechanism 5a, it is possible to supply the sufficient fluid amount to the wheel cylinders 8 immediately after the depression of the brake. Accordingly, even when the energy loss and so on by the dragging by the brake pad and the brake disc is suppressed by increasing the distance between the brake pad and the brake disc in the wheel cylinder 8 (that is, in a case where the fluid amount necessary for filling the gap of the piston within the wheel cylinder 8 is increased), it is possible to rapidly fill the gap, and to increase the wheel cylinder hydraulic pressure. With this, it is possible to improve the energy efficiency. Besides, the first fill mechanism 5a may be any one as long as the first fill mechanism 5a can vary the variation rate of the fluid amount Q. The first fill mechanism 5a is not limited to the structure of the first embodiment (the stepped piston 54p and the relief valve 28).

In the relationship between the pedal stroke S and the depression force F, the hydraulic pressure of the first fluid chamber 51 acted to the first small diameter portion 541 (corresponding to the hydraulic pressure P of the wheel cylinder 8) is increased at a relatively small gradient in accordance with the hydraulic pressure rigidity of the wheel cylinder 8 until a certain brake fluid amount is supplied to the wheel cylinder 8. On the other hand, after the sufficient brake fluid amount is supplied to the wheel cylinders 8, the hydraulic pressure of the first fluid chamber 51 acted to the first small diameter portion 541 is increased at a relatively large gradient in accordance with the pedal stroke S. On the other hand, the hydraulic pressure of the second fluid chamber 52 acted to the first large diameter portion 542 is increased at the relatively large gradient (larger than that of the hydraulic pressure of the first fluid chamber 51) in accordance with the pedal stroke S until reaching the relief pressure. After reaching the relief pressure, the hydraulic pressure of the second fluid chamber 52 acted to the first large diameter portion 542 is not further varied. Accordingly, in the hydraulic pressure which is received by the entire of the piston 51 (the first small diameter portion 541 and the first large diameter portion 542), that is, the pedal reaction force (the depression force F) by the hydraulic pressure, the variation rate to the pedal stroke S is varied in accordance with the amount of the pedal stroke S (for example, whether or not the pedal stroke S exceeds the predetermined value S1 at which the hydraulic pressure of the second fluid chamber 52 becomes the relief pressure). That is, until the pedal stroke S reaches the predetermined value S1, the piston 54p serves as the large diameter piston (having the large pressure receiving area). With this, the depression force F is varied at the relatively large gradient with respect to the pedal stroke S (the relatively large depression force F is needed). When the pedal stroke S exceeds S1, the piston 54p serves as the small diameter piston (having the small pressure receiving area). With this, the depression force F is varied at the relatively small gradient with respect to the pedal stroke S (it is sufficient by the relatively small depression force F). In this way, it is possible to arbitrarily set the brake characteristics.

In this way, the first fill mechanism 5a is a fluid amount varying mechanism arranged to vary the variation rate of the fluid amount Q with respect to the brake stroke S in accordance with the brake operation amount of the driver (the pedal stroke S or the relief pressure), and an operation force varying mechanism arranged to vary the variation rate of the brake operation force (the depression force F) with respect to the pedal stroke S.

[Operation of Fail Safe]

In a case where the master cylinder 5 according to the first embodiment is employed, it is possible to improve the fail-safe performance at the failure of the hydraulic pressure control section (the solenoid valve). That is, in the third fluid chamber 53 of the master cylinder 5, when the stroke X of the piston 54p is smaller than X0, the connection between the supply port 502p and the suction port 503 is not shut off by the fourth piston seal 554, and allowed as shown in FIG. 11 and FIG. 12. Accordingly, the pressure of the third fluid chamber 53 is the low pressure (the atmospheric pressure) substantially identical to that of the reservoir 4. When the piston 54p is moved in the x-axis positive direction by X0 or more by the brake operation of the driver, the fourth piston seal 554 shuts off the connection between the supply port 502p and the suction port 503. In particular, in the third fluid chamber 53, the flow of the brake fluid from the suction port 503 to the supply port 502p is suppressed (the only flow of the brake fluid from the supply port 502p to the suction port 503 is allowed). In this way, when the piston 54p is moved by the certain value or more, the connection between the suction hydraulic passage 14 and the reservoir is shut off. Accordingly, even when the normally-closed valve (the first to third pressure decrease valves 25-27) is brought to the open failure state, it is possible to suppress the flow of the brake fluid from the wheel cylinders 8 to the reservoir 4, and to ensure the brake hydraulic pressure within the hydraulic pressure unit 6.

For example, when the first pressure decreasing valve 25a of the front left wheel FL is brought to the open failure state, and not closed, the brake fluid within the P system including the wheel cylinder 8a of this wheel FL flows through the first pressure decreasing hydraulic passage 15a to the suction hydraulic passage 14 which is the low pressure. Accordingly, it is difficult to increase the hydraulic pressure of the wheel cylinders 8 in this P system. In this case, in the above-described failure, the pressure within the hydraulic passage from the first fluid chamber 51 of the master cylinder 5 to the wheel cylinders 8 is temporarily decreased. Accordingly, the piston 54p of the master cylinder 5 is moved by X0 or more in the x-axis positive direction side. Consequently, it is brought to the second state. The flow of the brake fluid in the first fluid chamber 53 from the suction port 503 (the suction hydraulic passage 14p's side) to the supply port 502 (the reservoir 4's side) is suppressed. Therefore, the flow of the brake fluid within the wheel cylinders 8 of the P system from the suction hydraulic passage 14 to the reservoir 4 is suppressed. On the other hand, the master cylinder hydraulic pressure according to the operation of the brake pedal 2 is supplied from the first fluid chamber 51 of the master cylinder 5 to the wheel cylinders 8. Accordingly, the hydraulic pressure of the wheel cylinders 8 in the P system which includes the wheel cylinder 8a is generated. In this way, even when the first pressure decreasing valve 25a is fixed in the open state, if the piston stroke X is equal to or greater than X0, it becomes the state identical to the state where the first pressure decrease valve 25a is opened, that is, the state where the suction hydraulic pressure 14 and the reservoir 4 (the atmospheric pressure) are not connected with each other. Accordingly, the P-system is not in the failure state. Consequently, it is possible to hold the depression force brake. In a case where the other normally-closed valves (the second and third pressure decrease valves 26 and 27) are brought to the open failure, it is possible to maintain the depression brake by the similar mechanism.

As described above, the above-described structure relating to the fourth piston seal 554 and the stepped shape (the second small diameter portion 543 and the second large diameter portion 544) of the piston 54p constitutes a fail-safe mechanism. Besides, at the failure, when the amount of the piston stroke X is equal to or greater than X0 (the second state), the hydraulic pressure of the third fluid chamber 53 on the x-axis positive direction side (the suction port 503's side) of the fourth piston seal 554 does not exceed at least the hydraulic pressure of the first fluid chamber 51 (the master cylinder hydraulic pressure). Accordingly, the pressure equal to or greater than that of the discharge portion 71 is not acted to the suction portion 70 of the pump 7. Consequently, it is possible to maintain the durability of (the seal member and so on of) the pump 7. Furthermore, in the non-failure state, the controls (the boost, the regenerative cooperation, VDC, and ABS) by the second system (the pump 7) is performed in a region of the normal brake operation amount of the driver. Therefore, the piston stroke X becomes smaller than X0 (the first state), the supply port 502 and the suction port 503 of the master cylinder 5 are connected with each other. Accordingly, the pressure of the third fluid chamber 53 becomes substantially identical to the low pressure (the atmospheric pressure) of the reservoir 4. The high pressure is not acted to the suction portion 70 of the pump 7. Consequently, it is possible to maintain and improve the durability of the pump 7.

[Improvement of Energy Efficiency]

The apparatus 1 operates the hydraulic pressure unit 6 (the second brake hydraulic pressure generating device) based on the sensed pedal stroke S to attain the desired brake characteristics. That is, the wheel cylinder hydraulic pressure is generated by the other energy source which is different from the brake operation force of the driver. With this, the boost function to decrease the brake operation force of the driver is attained. Conventionally, there is known a brake deice provided with a boost device arranged to generate the assist force to decrease the brake operation force of the driver by the other energy source (the engine negative pressure booster and so on) which is different from the brake operation force of the driver. However, the conventional brake device is a structure arranged to constantly operate the boost device in accordance with the brake operation of the driver. The improvement of the energy efficiency is limited. On the other hand, in the predetermined brake operation region after the start of the brake operation, the apparatus 1 suppresses the operation (the pump up) of the hydraulic pressure unit 6 (the second brake hydraulic pressure generating device). Accordingly, it is possible to improve the energy efficiency while attaining the boost function.

Moreover, the apparatus 1 is not provided with the engine negative pressure booster. The apparatus 1 compensates for the deficiency of the brake operation force by the other energy source (the hydraulic pressure unit 6) which is different from this (the engine negative pressure booster). Accordingly, the apparatus 1 is easy to be applied to the electric vehicle. Furthermore, in a case where the apparatus 1 is applied to the vehicle provided with the engine, it is possible to improve the fuel economy. Moreover, the hydraulic unit for the ABS and/or the VDC is already provided to the many brake apparatuses. The apparatus 1 is not provided with the engine negative pressure booster (serving as the energy source compensating for the deficiency of the brake operation force). The apparatus 1 uses the above-described hydraulic pressure unit as the energy source compensating for the deficiency of the brake operation force. Accordingly, it is possible to decrease the number of the components, and to decrease the cost. Moreover, it is possible to simplify the structure of the device, and to improve the mountability to the vehicle. Furthermore, it is possible to decrease the size and the weight of the vehicle, and thereby to improve the energy efficiency of the vehicle. Hereinafter, this is concretely illustrated by using a comparative example.

Figure 14:
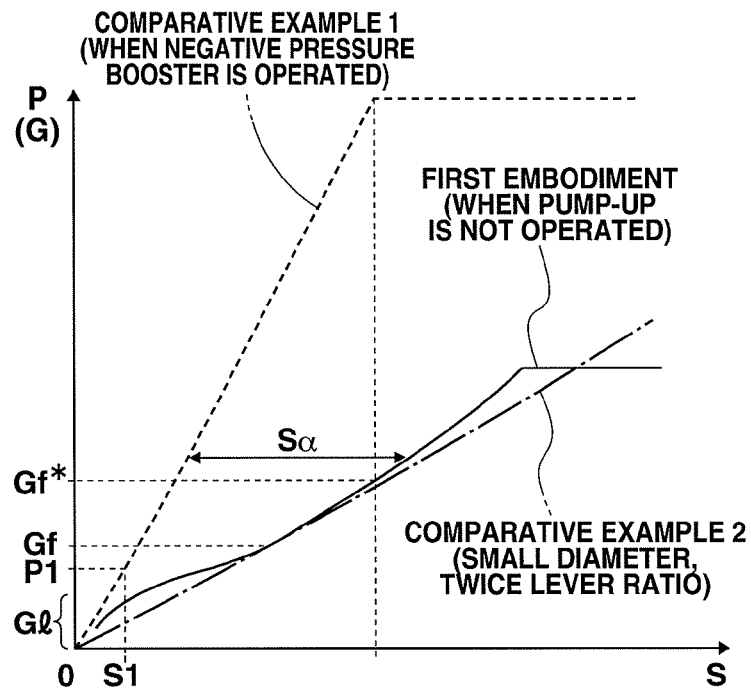
FIG. 14 is a view showing a relationship characteristics between the pedal stroke and a hydraulic pressure (deceleration) in the brake device according to the first embodiment.
Figure 15:
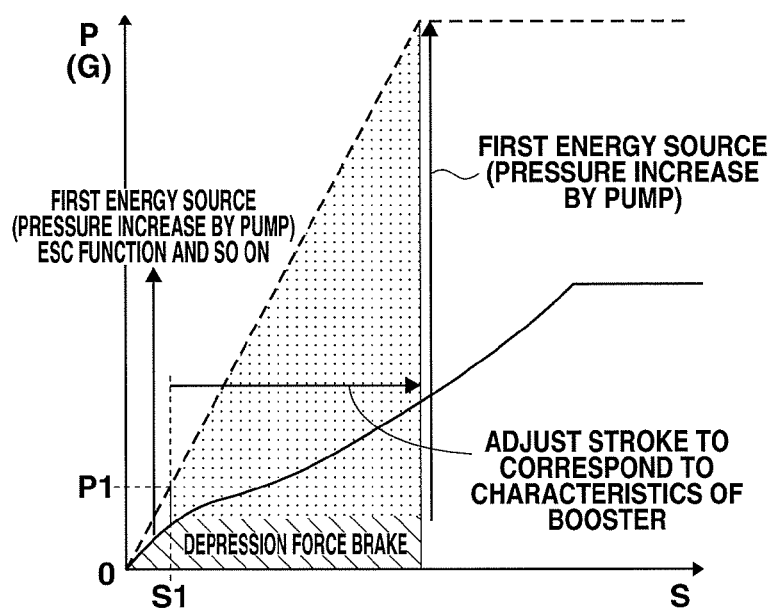
FIG. 15 is a view showing a relationship characteristics between the pedal stroke and the hydraulic pressure (deceleration) in the brake device according to the first embodiment.
Figure 16:
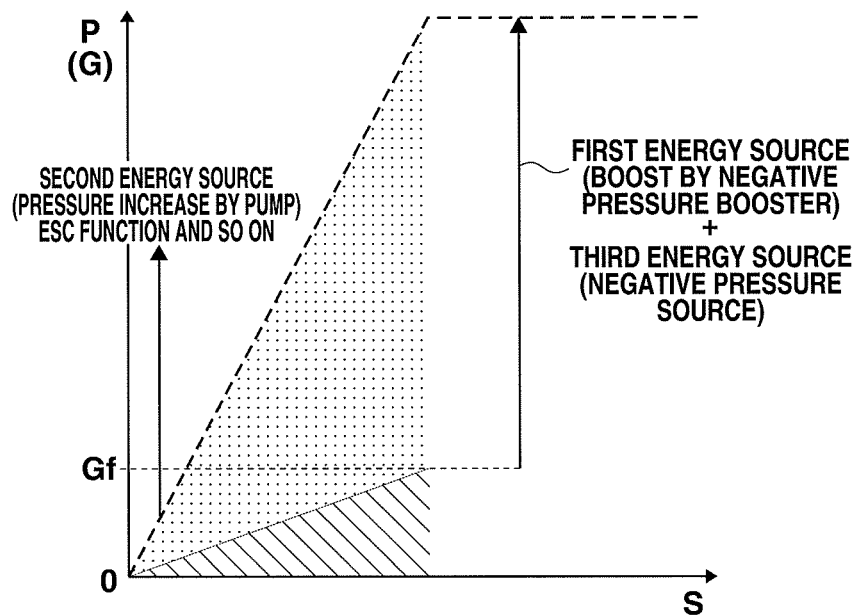
FIG. 16 is a view showing a relationship characteristics between the pedal stroke and the hydraulic pressure (deceleration) in a brake device in a comparative example 2.
Figure 17:
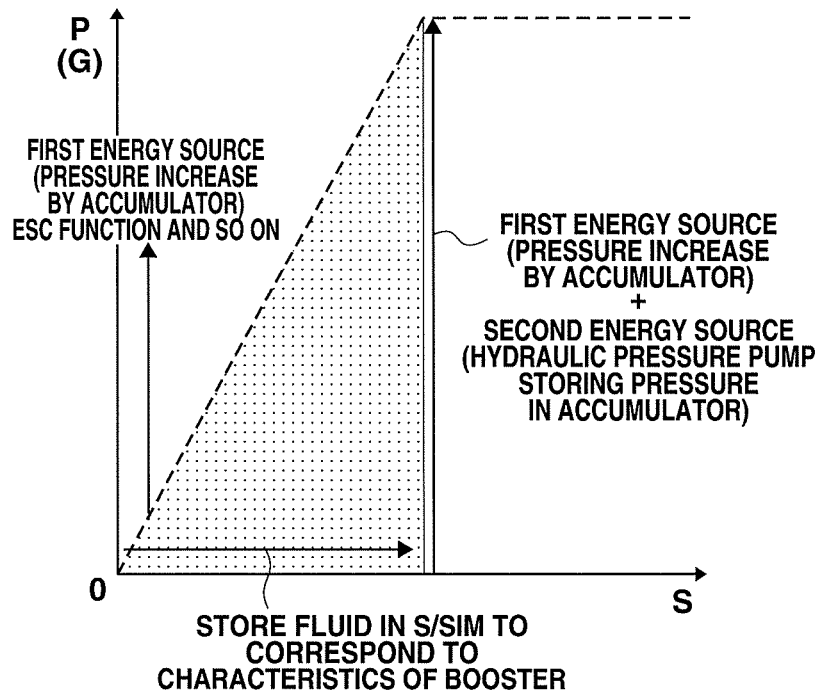
FIG. 17 is a view showing a relationship characteristics between the pedal stroke and the hydraulic pressure (deceleration) in a brake device in a comparative example 3.

First, the effects of the apparatus 1 according to the first embodiment are illustrated by contrast with a case (comparative examples 2 and 3) of using another means which is different from the hydraulic pressure unit as the energy source compensating for the deficiency of the brake operation force in place of the engine negative pressure booster. In the first embodiment, the hydraulic pressure unit (the first energy source) including the pump is provided between the master cylinder and the wheel cylinders. The wheel cylinder hydraulic pressure is generated by the brake fluid supply from this hydraulic pressure unit. With this, the brake operation force of the driver is decreased, and the ESC and so on can be attained. That S-P(G) characteristics are shown in FIG. 14 and FIG. 15. In the comparative example 2, the negative pressure booster arranged to be operated by using the negative pressure generated by the negative pressure pump (the third energy source) is provided between the brake pedal and the master cylinder. The brake operation force is boosted by this negative pressure booster (the first energy source), and transmitted to the master cylinder. Moreover, the hydraulic pressure unit (the second energy source) including the (a) pump is provided between the master cylinder and the wheel cylinders so as to attain an anti-skid brake control ESC (Electric Stability Control) and so on. That S-P (G) characteristics is shown in FIG. 16. In the comparative example 3, there is provided an accumulator arranged to store the high pressure (the pressure energy) by the operation of the hydraulic pressure pump (the second energy source). Moreover, there is provided the hydraulic pressure booster which is positioned between the brake pedal and the master cylinder, and which is arranged to be actuated by using the high pressure of the accumulator (the first energy source). The brake operation force is boosted by this hydraulic pressure booster, and transmitted to the master cylinder. Moreover, the wheel cylinder hydraulic pressure is generated through the hydraulic pressure unit by the supply of the brake fluid from the accumulator (the first energy source) so as to attain the ESC and so on. That S-P (G) characteristics is shown in FIG. 17.

In the comparative examples 2 and 3, in the entire brake operation region including the predetermined brake operation region after the brake depression, the booster device is operated in accordance with the brake operation of the driver. That is, the desired brake hydraulic pressure is constantly generated during the brake operation by the energy source (the negative pressure pump and the negative pressure booster in the comparative example 2. the hydraulic pressure pump and the accumulator in the comparative example 3.) Accordingly, the improvement of the energy efficiency is limited. On the other hand, the apparatus 1 according to the first embodiment suppresses the operation of the booster device in the predetermined brake operation region after the start of the brake operation. That is, the energy source (the hydraulic pressure unit 6) is not possibly used by generating the brake hydraulic pressure by the brake operation force of the driver in the above-described operation region. When the relatively high deceleration G is needed, the wheel cylinder hydraulic pressure is ensured by using the energy source (the hydraulic pressure unit 6). In this way, it is possible to improve the energy efficiency by suppressing constantly using the energy source in the brake operation region which is relatively frequently used.

Moreover, in the comparative examples 2 and 3, there are provided the negative pressure pump and the negative pressure booster (the comparative example 2), or the hydraulic pressure pump and the accumulator (the comparative example 3), as the energy source for compensating for the deficiency of the brake operation force, in addition to the hydraulic pressure unit. Accordingly, the cost may be increased by the increase of the number of the components. Moreover, the size of the brake device may be increased, and the brake device may be complicated. Consequently, the mountability to the vehicle may be deteriorated. Moreover, the energy efficiency of the vehicle may be deteriorated due to the increase of the weight of the vehicle and the increase of the size of the vehicle. On the other hand, the apparatus 1 according to the first embodiment uses the hydraulic pressure unit for the ABS and the VDC which are already provided to the many brake devices, as the energy source for compensating for the deficiency of the brake operation force. Accordingly, the special energy source is not needed unlike the comparative examples 1 and 2. Consequently, it is possible to decrease the cost by decreasing the number of the components, and to improve the mountability to the vehicle by simplifying the structure of the apparatus. Furthermore, it is possible to decrease the size of the vehicle, and to decrease the weight of the vehicle. With this, it is possible to improve the energy efficiency of the vehicle.

[Suppression of Operation of Hydraulic Pressure Unit]

Next, the effects of the apparatus 1 according to the first embodiment are illustrated by a comparison with (by contrast with) a case (comparative example 4) in which the hydraulic pressure unit is provided as the energy source for compensating the deficiency of the brake operation force, in place of the engine negative pressure booster. The comparative example 4 attains the desired brake hydraulic pressure by operating the hydraulic pressure unit even in the predetermined brake operation region after the depression of the brake, similarly to the comparative examples 2 and 3. Consequently, the improvement of the energy efficiency for operating the brake device is limited. Moreover, the pump up is frequently performed. The frequency of the operation of the pump becomes high. Accordingly, the durability of the pump may be decreased. Furthermore, the silence (the sound and vibration performance) of the brake device may be decreased. On the other hand, the apparatus 1 according to the first embodiment uses the depression force brake in the predetermined brake operation region after the start of the depression of the brake. With this, it is possible to suppress the pump up, and to improve the energy efficiency of the apparatus 1. Moreover, it is possible to suppress the operation of the pump 7, and thereby to improve the durability of the pump 7 and the silence of the apparatus 1. In particular, the apparatus 1 uses the depression force brake in the brake operation region in which the wheel cylinder hydraulic pressure is in the predetermined low pressure region ($0<P\leq P1$), or is the low deceleration region. The apparatus 1 attains the desired brake hydraulic pressure of the driver by the pump up when the wheel cylinder hydraulic pressure is in the predetermined high pressure region (P1<P), or in the brake operation region which is the high deceleration region. In this way, the pump up is suppressed in the brake operation region which is relatively frequently generated, and in which the wheel cylinder hydraulic pressure becomes the predetermined low pressure region (the vehicle deceleration is in the predetermined low deceleration region). With this, it is possible to largely suppress the frequency of the operation of the pump 7.

The applicant verified the followings by the simulation. In a case where the depression force brake is performed in the predetermined brake operation region as described above, it is verified that the frequency of the operation (except for the pump operation by the ABS and the VDC) of the pump 7 is decreased as follows, relative to a case where the pump up is performed in the entire region of the brake operation. That is, in a case where the depression brake is performed by 0.2 G (the pump up is suppressed), the frequency of the operation of the pump is decreased by a little less than 80%. In a case where the depression brake is performed by 0.15 G, the frequency of the operation of the pump is decreased by a little less than 70%. In a case where the depression brake is performed by 0.1 G, the frequency of the operation of the pump is decreased by a slightly more than 50%. The frequency of the operation of the pump can be decreased by the above-described percentages. Besides, even in the brake operation region in which the wheel cylinder hydraulic pressure becomes the predetermined low pressure region (0<P≤P1), the pump up may be performed by performing the regenerative cooperative control. However, in the regenerative cooperative control, the pump up is performed only in the pressure increase control. Moreover, normally, this pressure increase control is temporarily performed at the end of the regenerative cooperative control. The pump up is not performed at the pressure decrease control and the holding control. Consequently, the effect of the suppression of the increase of the frequency of the operation of the pump 7 is not deteriorated by the regenerative cooperative control.

Besides, in the first embodiment, the brake operation region in which the wheel cylinder hydraulic pressure becomes the predetermined low pressure region is a case in which the target wheel cylinder hydraulic pressure calculated based on the sensed pedal stroke S is equal to or smaller than the predetermined hydraulic pressure P1. However, the brake operation region in which the wheel cylinder hydraulic pressure becomes the predetermined low pressure region may be a case in which the master cylinder hydraulic pressure sensed by the hydraulic pressure sensor 91 or the wheel cylinder hydraulic pressure sensed by the hydraulic pressure sensor 92 is equal to or smaller than the predetermined value, a case in which the sensed pedal stroke S is equal to or smaller than the predetermined value S1, a case in which the vehicle deceleration G sensed by the accelerator sensor and so on provided to the vehicle is equal to or smaller than the predetermined deceleration, a case where there is provided a depression force sensor arranged to sense the depression force F of the brake pedal 2, and that sensed value is equal to or smaller than the predetermined value, or so on. The brake operation region in which the wheel cylinder hydraulic pressure becomes the predetermined low pressure region is not specifically limited.

In this case, the difference from the brake assist control device, that is, a device arranged to assist the brake operation of the driver by performing the pump up when the predetermined assist condition such as when the brake operation speed becomes equal to or greater than the predetermined value indicative of the emergency brake is illustrated. The apparatus 1 according to the first embodiment uses the depression force brake in the brake operation region in which the wheel cylinder hydraulic pressure becomes the predetermined low pressure region (0<P≤P1), or in which the vehicle deceleration G becomes the predetermined low deceleration region, irrespective of the brake operation speed (that is, even when the brake operation speed is smaller than the above-described predetermined value to satisfy the assist condition). On the other hand, in the brake operation region in which the wheel cylinder hydraulic pressure becomes the predetermined high pressure region (P1<P), or in which the vehicle deceleration G becomes the predetermined high deceleration region, the desired brake hydraulic pressure of the driver is attained by the pump up. Accordingly, in the apparatus 1, the condition to perform the pump up (or the object and the operation and the effect) is different from those of the above-described brake assist control device.

Figure 18:
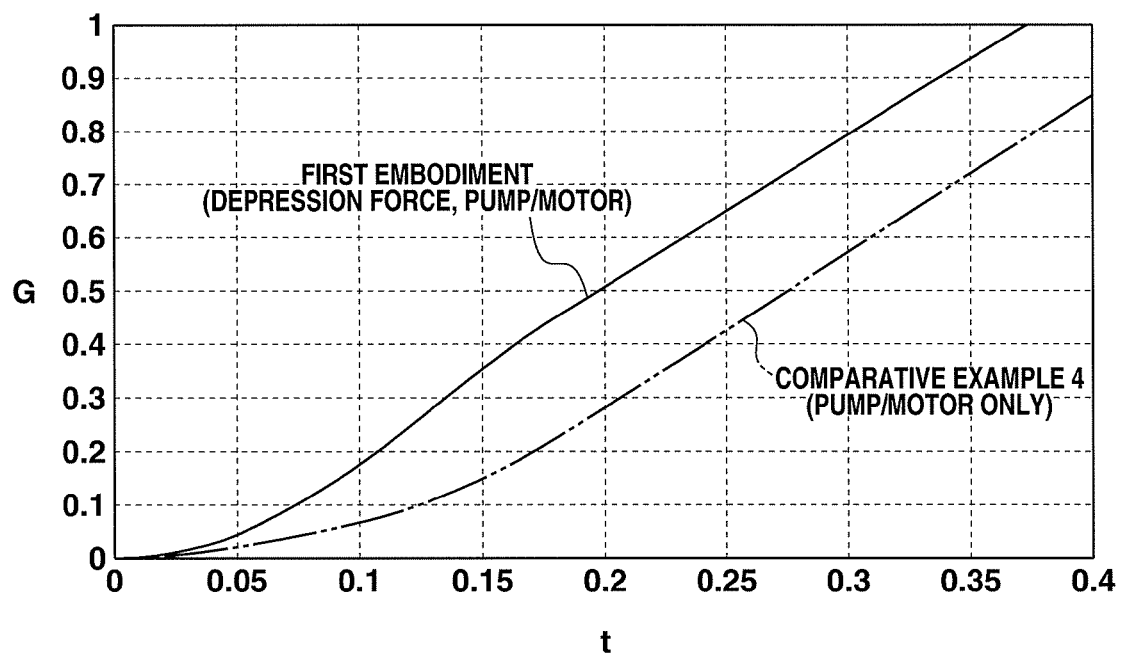
FIG. 18 is a view showing time variations of decelerations in the first embodiment and in a comparative example 4.

Besides, in the apparatus 1, even in the predetermined low deceleration, the pump up may be also used while the depression brake is used, so that the wheel cylinder hydraulic pressure P may be increased. In this case, it is not necessary that the pump 7 is operated for attaining the desired brake hydraulic pressure by the amount of the depression brake. Consequently, it is possible to obtain the above-described effects and operations to suppress the operation of the pump, and to suppress the decrease of the durability and the silence. In this case, the apparatus 1 according to the first embodiment can improve the response of the vehicle deceleration G, as shown in the time chart of FIG. 18. That is, at the low deceleration (for example, time t is 0-0.15 sec), there is the delay time until the motor rotation speed is increased. Accordingly, in the comparative example 4 in which the wheel cylinder hydraulic pressure is increased only by the pump (motor), the gradient of the pressure increase of the wheel cylinder hydraulic pressure P (the increase rate with respect to the time) is relatively gentle. On the other hand, even at the low deceleration, the apparatus 1 can increase the gradient of the increase of the wheel cylinder hydraulic pressure P (the increase rate with respect to the time) by the increase of the wheel cylinder hydraulic pressure by the depression force brake. Accordingly, it is possible to improve the response of the vehicle deceleration G, for example, even at the sudden brake. For example, the rotation speed of the pump 7 (motor 60) can be set in accordance with the speed of the depression force F or the speed of the pedal stroke S. In this way, it is possible to deal with by the thus-easy control. On the other hand, in a case where the pump up (except for a case of the VDC, the ABS and so on) is prohibited and the only depression force brake is performed at the above-described predetermined low deceleration, it is possible to more surely suppress the operation of the pump 7, and to improve the above-described operations and effects by the suppression of the operation.

[Fail-Safe Operation]

The apparatus 1 uses the hydraulic pressure unit 6 as the boost device. Accordingly, the apparatus 1 includes a fail-safe mechanism arranged to attain the minimum required deceleration of the vehicle by the brake operation force of the driver, for a case where the hydraulic pressure control section, that is, the hydraulic pressure unit 6 and the power supply system (ECU 10) is malfunctioned. In particular, the link mechanism 3 or the first fill mechanism 5a function as the above-described fail-safe mechanism. The above-described minimum required deceleration of the vehicle is a deceleration (hereinafter, referred to as a failure ideal deceleration Gf*) generated when the maximum value of the depression force F is Fmax (for example, 200N). The above-described minimum required deceleration of the vehicle is set to a value (for example, 0.4 G) greater than the vehicle deceleration Gf which can be generated at the maximum depression force Fmax at the failure of the engine negative pressure booster in the comparative example 1 (in which the engine negative pressure booster is provided).

The link mechanism 3 is an operation force varying mechanism arranged to vary the rate of the variation of the piston thrust Fp to the depression force F. In the first embodiment, in a relatively large region in which the pedal stroke S is in a region larger than the predetermined value S1, the lever ratio k is set larger than that of the comparative example 1 in which the link mechanism 3 is not provided (in particular, k=about 3-4). Accordingly, when the pedal stroke S exceeds the predetermined value S1, the brake operation of the driver is boosted even at the failure of the hydraulic pressure control section (the hydraulic pressure unit 6 and so on). With this, it is possible to attain the failure ideal deceleration Gf*. The first fill mechanism 5a is an operation force varying mechanism arranged to vary the rate of the variation of the depression force F to the pedal stroke S. When the pedal stroke S exceeds S1, the piston 54p functions as the small diameter portion. With this, it is possible to set to increase the pedal stroke S by the relatively small depression force F. Accordingly, even at the failure of the hydraulic pressure unit 6 and so on, when the pedal stroke S exceeds S1, the brake operation force of the driver is boosted. With this, it is possible to attain the failure ideal deceleration Gf*.

Accordingly, as shown in the S-G (P) characteristics of FIG. 14, the apparatus 1 can attain the Gf* at the maximum depression force Fmax even when the pump up is not operated due to the failure of the hydraulic pressure unit 6 and so on. For example, the above-described comparative examples 2 and 3 do not include the fail-safe mechanism arranged to generate the minimum required deceleration of the vehicle at the failure of the energy source (the negative pressure pump and the negative pressure booster in the comparative example 2. the pump and the accumulator in the comparative example 3) for compensating for the deficiency of the brake operation force. Accordingly, in the comparative examples 2 and 3, the countermeasure for the failure is insufficient. On the other hand, the apparatus 1 according to the first embodiment can generate the minimum required deceleration Gf* of the vehicle even at the failure of the energy source (the hydraulic pressure unit 6) for compensating for the deficiency of the brake operation force. Besides, in the first embodiment, both the link mechanism 3 and the first fill mechanism 5a function as the fail-safe mechanism. However, one of those may function as the fail-safe mechanism (cf. the second embodiment and the third embodiment). In the first embodiment, there are provided both the first fill mechanism 5a and the link mechanism 3. Accordingly, it is possible to readily attain the failure ideal deceleration Gf*.

[Improvement of Feeling of Brake Operation]

Only for attaining the failure ideal deceleration Gf* at the failure of the hydraulic pressure unit 6 and so on, it is sufficient that, for example, the pressure receiving area of the piston (the pedal reaction force) in the entire region of the brake operation is set smaller than that of the comparative example 1 by setting the piston of the master cylinder to the shape (the simple shape, not the stepped shape) having the small diameter. Moreover, it is sufficient that the lever ratio is set to the fixed value so that the lever ratio becomes the large constant value (for example, twice) relative to that of the comparative example 1 in the entire region of the brake operation. A comparative example 5 is a case in which the above-described countermeasure is performed in the brake device which is not provided with the engine negative pressure booster. However, in the comparative example 5, when the depression brake force is attained by suppressing the pump up in the predetermined brake operation region after the start of the brake operation like the first embodiment, the brake characteristics (the characteristics of F-S-C) is different from the comparative example 1 in which the engine negative pressure booster is provided. With this, the unnatural feeling of the brake operation feeling may be provided to the driver. For example, the following problems are generated.

Figure 19:
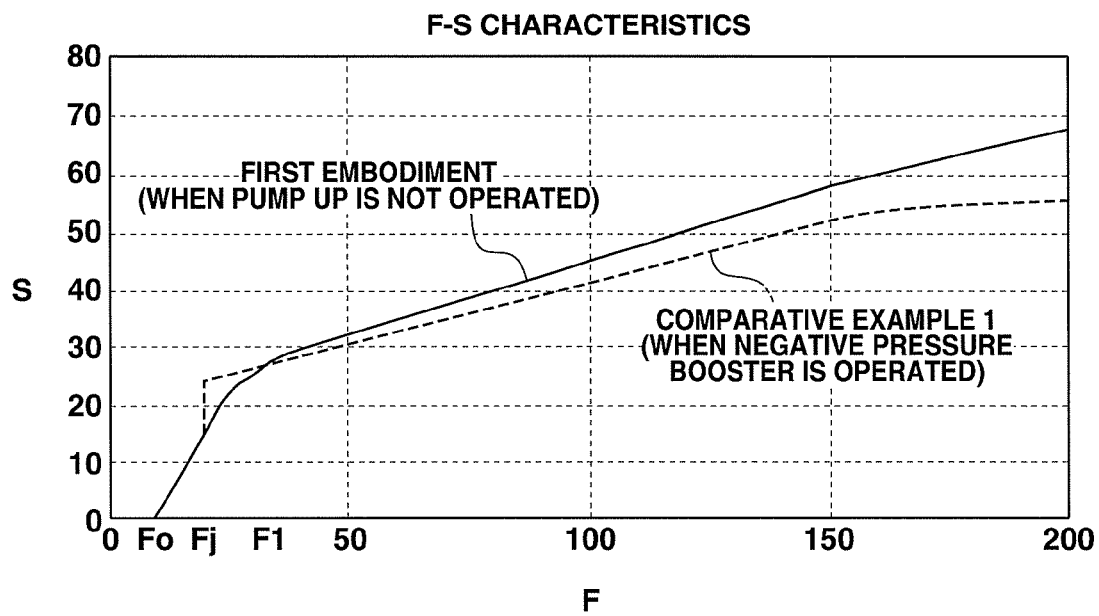
FIG. 19 is a view showing relationship characteristics between the depression force and the pedal stroke in the brake devices of the first embodiment and a comparative example 1.
Figure 20:
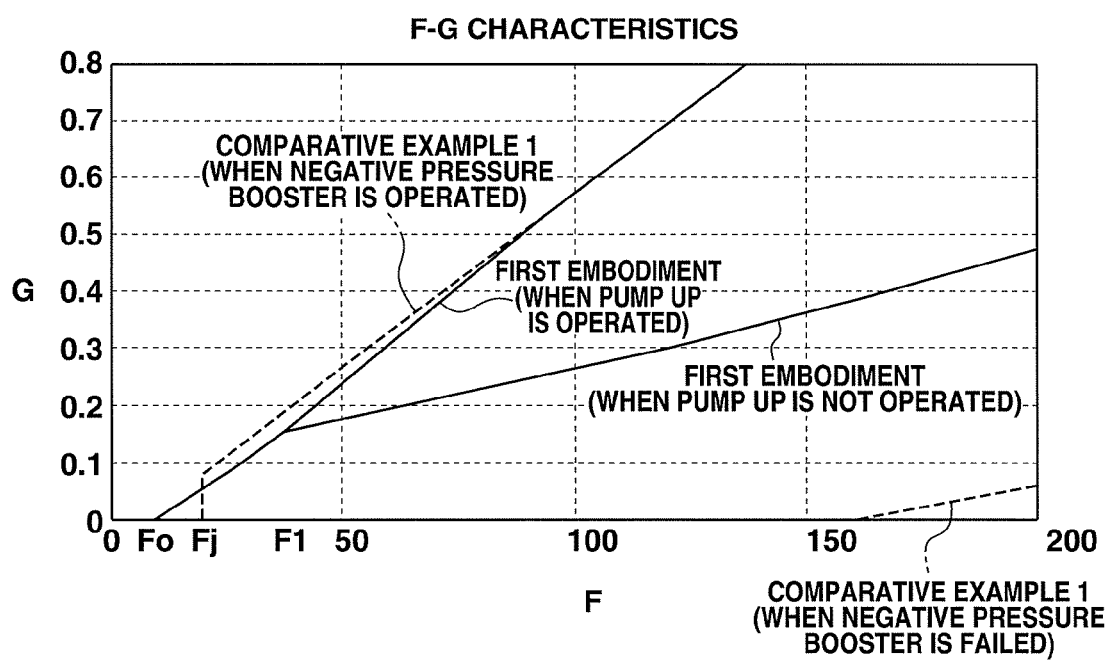
FIG. 20 is a view showing a relationship characteristics between the depression force and the deceleration in the brake devices of the first embodiment and the comparative example 1.

First, as to the S-G characteristics, in a case where the piston of the master cylinder merely has the small diameter like the comparative example 5, the brake fluid amount Q supplied to the wheel cylinders with respect to the same pedal stroke S becomes small relative to a case (the comparative example 1) in which the piston having the normal diameter is used. Accordingly, as shown in Sα of FIG. 14, the pedal stroke S necessary for attaining the same wheel cylinder hydraulic pressure P (the vehicle deceleration G) becomes greater than that of the comparative example 1. In this way, the S-G characteristics are different from that of the comparative example 1. Accordingly, the unnatural feeling of the brake operation feeling may be provided to the driver from a timing immediately after the brake depression. Moreover, as to the F-G characteristics, in the comparative example 5, it is possible to attain the failure ideal deceleration Gf* at the maximum depression force Fmax. However, it is difficult to attain the F-G characteristics identical to that of the comparative example 1. In particular, the depression force F necessary for attaining the same wheel cylinder hydraulic pressure P (the vehicle deceleration G) is greater than that of the comparative example 1, from the timing immediately after the depression of the brake. For example, in a case where the magnification ratio of the engine negative pressure booster of the comparative example 1 is fivefold, 1.7 times the depression force F of the comparative example 1 is needed even when the lever ratio is set to twice that (fixed) lever ratio and the pressure receiving area ratio of the piston is 1/1.5 times in the comparative example 5, 1.67 times the depression force F of the comparative example is needed. Accordingly, the unnatural feeling of the brake operation may be provided to the driver from the timing immediately after the depression of the brake. Moreover, as to the F-G characteristics and the F-S characteristics, as shown in FIG. 19 and FIG. 20, in the comparative example 1 in which the engine negative pressure booster is provided, the pedal stroke S and the deceleration G are not generated at the timing immediately after the depression of the brake, in a region in which the depression force F is from zero to a predetermined value Fj. On the other hand, when the depression force F becomes the predetermined value Fj, the pedal stroke S and the deceleration G are generated, and immediately increased to the predetermined amount. This characteristics is a jump-in characteristics. On the other hand, in the comparative example 5, the engine negative pressure booster is not provided. The comparative example 5 has a characteristics by which the pedal stroke S and the deceleration G are gently increased in accordance with the increase of the depression force F, from when the depression force F is substantially zero. Accordingly, it is not possible to imitate the above-described jump-in characteristics. That is, it is not possible to attain the characteristics of the comparative example 1 by which the pedal stroke S and the deceleration G are immediately increased from the substantially zero near the depression force Fj, and then the pedal stroke S and the deceleration G are gently increased in accordance with the depression force F. With this, the unnatural feeling of the brake operation feeling may be provided to the driver.

For decreasing these unnatural feeing of the brake operation feeing, for example, when the pump up is performed by operating the hydraulic pressure unit from a timing immediately after the brake depression, the frequency of the operation of the pump becomes high as described above. That is, in the comparative example 5, while the failure ideal deceleration Gf* is attained, an operation that the frequency of the operation of the pump is decreased, and an operation that the unnatural feeling of the brake operation feeling is decreased are a relationship of the trade-off. On the other hand, the apparatus 1 according to the first embodiment includes the link mechanism 3 and the first fill mechanism 5a which serve as the hydraulic pressure varying mechanism, the fluid amount varying mechanism, or the operation force varying mechanism. Accordingly, it is possible to arbitrarily vary the brake characteristics in the predetermined brake operation region after the depression of the brake, and in the other brake operation region. Consequently, it is possible to decrease the unnatural feeling of the brake operation feeling in the predetermined brake operation region in which the depression force brake is performed while the failure ideal deceleration Gf* is attained, and thereby to dissolve the above-described trade-off.

In particular, as to the problems about the above-described S-G characteristics, the apparatus 1 according to the first embodiment includes the first fill mechanism 5a having the piston 54p having the stepped shape. That is, in the predetermined brake operation region after the start of the brake operation, the piston 54p functions as the large diameter piston having the large pressure receiving area. Accordingly, when the pedal stroke S is relatively small (the wheel cylinder hydraulic pressure P is smaller than P1) as shown in FIG. 13, the gradient of the increase of the fluid amount Q with respect to the pedal stroke S becomes large. In this case, the wheel cylinder hydraulic pressure P is increased in accordance with the fluid amount Q. Accordingly, in the S-G characteristics, the pedal stroke S necessary for attaining the same wheel cylinder hydraulic pressure P (the vehicle deceleration G) can be closer to that of the comparative example 1, in the predetermined brake operation region after the start of the brake operation. That is, Sα becomes small in a region where the pedal stroke S is from 0 to S1, as shown in FIG. 14. Accordingly, the pedal stroke S necessary for attaining the same wheel cylinder hydraulic pressure P (the vehicle deceleration G) becomes closer to that of the comparative example 1. Consequently, it is possible to suppress the unnatural feeling of the brake operation feeling, in the predetermined brake operation region after the start of the brake operation.

Moreover, as to the above-described problem of the F-G characteristics, the lever ratio k of the link mechanism 3 is variable, in the apparatus 1 according to the first embodiment 1. Accordingly, it is possible to decrease the unnatural feeling of the brake operation feeling. That is, in the predetermined brake operation region after the start of the brake operation, the lever ratio k is set greater than that in the other operation region. Consequently, as shown in FIG. 10, when the pedal stroke S is relatively small (the hydraulic pressure P is smaller than P1), the gradient of the increase of the hydraulic pressure P with respect to the depression force F becomes large. Accordingly, in the F-G characteristics, the depression force F necessary for attaining the same wheel cylinder hydraulic pressure P (the vehicle deceleration G) can be closer to that of the comparative example 1, in the predetermined brake operation region after the start of the brake operation. Moreover, the piston 54p functions as the large diameter piston having the large pressure receiving area, by the first fill mechanism 5a, in the predetermined brake operation region after the start of the brake operation. Accordingly, when the piston stroke X is relatively small, the gradient of the increase of the fluid amount Q with respect to the piston stroke X becomes large. Consequently, in a case where the variation rate of the piston stroke X with respect to the depression force F is the same irrespective of the pedal stroke S, the gradient of the increase of the fluid amount Q with respect to the depression force F becomes large. Consequently, in the F-G characteristics, the depression force F necessary for attaining the same wheel cylinder hydraulic pressure P (the vehicle deceleration G) can be closer to that of the comparative example 1. Besides, in a case where the pressure receiving area of the piston 54p is large when the pedal stroke S is relatively small, the gradient of the increase of the piston stroke X with respect to the depression force F may be suppressed. However, in the first embodiment, the link mechanism 3 is provided in addition to the first fill mechanism 5a. Accordingly, in a case in which the pressure receiving area of the piston 54p is large when the pedal stroke S is relatively small, the piston thrust Fp with respect to the depression force F is increased by setting the lever ratio k of the link mechanism 3. With this, it is possible to maintain the gradient of the increase of the piston stroke X with respect to the depression force F. Consequently, the F-G characteristics can be more effectively close to that of the comparative example 1. More specifically, in the first embodiment, the pressure receiving area of the piston 54p or the lever ratio k of the link mechanism 3 are adjusted, so that the variation ratio (gradient) of the deceleration G with respect to the depression force F in the region where the depression force is from Fj to F1 is closer to that of the comparative example 1, as shown in FIG. 20. In addition, the magnitude of the deceleration G actually generated with respect to the depression force F is closer to that of the comparative example 1, by adjusting the invalid depression force Fo of the master cylinder 5 (the magnitude of the depression force at which the pedal stroke S or the deceleration G is actually generated beyond zero).

Besides, when the brake operation amount (the pedal stroke S and so on) is relatively large, the wheel cylinder hydraulic pressure P is generated by the pump up. Accordingly, the above-described problem relating to the operation feeling at the depression force brake is not generated. Consequently, it is possible to arbitrarily set the lever ratio k as long as it is possible to attain the failure ideal deceleration Gf* at the maximum depression force Fmax. Accordingly, the link mechanism 3 is set so that the lever ratio k when the brake operation amount is relatively large becomes smaller than the lever ratio k when the brake operation amount is small. With this, it is possible to suppress the excessive increase of the pedal stroke S. In the first embodiment, as shown in FIG. 19, the value of the pedal stroke S at which the failure ideal deceleration Gf* is attained at the maximum depression force Fmax 200N is set within a 70 mm.

Moreover, as to the problem relating to the above-described F-S characteristics, in the apparatus 1 according to the first embodiment, the lever ratio k of the link mechanism 3 is variable. Accordingly, it is possible to decrease the above-described unnatural feeling of the brake operation feeling. That is, in the predetermined brake operation region after the start of the brake operation, the lever ratio k is set larger than that of the other operation region. Consequently, as shown in FIG. 19, when the pedal stroke S is relatively small, the gradient of the increase of the pedal stroke S with respect to the depression force F becomes large. Therefore, it is possible to imitate the jump-in characteristics of the comparative example 1. Moreover, by the setting of the relief pressure of the first fill mechanism 5a and so on, the inflection point (F1) at which the ratio of the variation (the gradient) of the pedal stroke S with respect to the depression force F is varied is adjusted. With this, the F-S characteristics can be closer to the characteristics of the comparative example 1 after the jump-in. Moreover, by adjusting the magnitude of the invalid depression force Fo of the master cylinder 5, the F-S characteristics in the predetermined brake operation region after the start of the brake operation can be entirely effectively closer to that of the comparative example 1.

By the above-described configuration, in the first embodiment, the relation characteristics of F-S-G is imitated to be closer to the comparative example 1 which is provided with the engine negative pressure booster, in the region in which the deceleration G is relatively small (about 0.1-0.2 G), that is, in the predetermined brake operation region after the start of the brake operation, while the failure ideal deceleration Gf* (0.4 G at Fmax=200N) is attained preferably by the short stroke (the pedal stroke S is within 70 mm). Even when the model of the vehicle to which the apparatus 1 is mounted is different, it is possible to adjust in accordance with the difference of the models of the vehicle as follows. For example, there is provided the first fill mechanism 5a having the small diameter (the pressure receiving area of the first small diameter portion 541 is smaller than that of the normal master cylinder piston) so as to correspond to the light weight vehicle, the middle weight vehicle, and the heavy weight vehicle. Then, the lever ratio k of the link mechanism 3, the relief pressure of the first fill mechanism 5a, and the invalid depression force of the master cylinder 5 are adjusted based on the specification of the vehicle, and the depression force brake target. With this, it is possible to imitate the brake characteristics (in a case in which the engine negative booster is provided) in accordance with the model of the mounted vehicle. For example, when it is possible to deal with the difference of the models by varying the design of the only link mechanism 3 (the lever ratio), it is possible to improve the mountability of the apparatus 1.

Besides, the concrete means to adjust the brake characteristics of the F-S-G is not limited to the structure of the first embodiment as long as it can attain the failure ideal deceleration Gf*, and even a part of the brake characteristics can be closer to that of the comparative example 1 so as to decrease the unnatural feeling of the brake operation feeling. For example, the concrete methods of setting the lever ratio k, the pressure receiving area of the piston 54, the relief pressure, and the invalid depression force Fo are not limited to those of the embodiment. Moreover, the brake characteristics may be adjusted only by the first fill mechanism 5a, or only by the link mechanism 3 (cf. the second and third embodiments). In the first embodiment, both the first fill mechanism 5a and the link mechanism 3 are provided. Accordingly, it is possible to more readily adjust the brake characteristics.

[Operation by Hydraulic Pressure Unit]

The apparatus 1 generates the desired brake hydraulic pressure by the hydraulic pressure control section even in the brake operation region in which the pedal stroke S exceeds S1, so that it is possible to attain the brake characteristics identical to that of the comparative example 1. In this case, the configuration of the hydraulic pressure control section is not limited to that of the first embodiment. In a case where the hydraulic pressure control section according to the first embodiment is employed, the following effects and operations can be further attained. Hereinafter, a hydraulic passage A is a hydraulic passage arranged to supply the brake fluid from the pressure chamber R of the master cylinder M/C to the wheel cylinders W/C in accordance with the brake operation, and thereby to increase the pressures of the wheel cylinders W/C. A hydraulic passage B is a hydraulic passage arranged to supply the brake fluid from the reservoir RES which serves as the brake fluid source, to the pump P which serves as the hydraulic pressure generating source. A hydraulic passage C is a hydraulic passage arranged to return the brake fluid from the wheel cylinders W/C to the reservoir RES, and thereby to decrease the pressures of the wheel cylinders W/C. The brake system (the hydraulic passage A) which has the master cylinder M/C as the hydraulic pressure source constitutes the first system. The brake system (the hydraulic passage B) which has the pump P as the hydraulic pressure source constitutes the second system.

In the hydraulic pressure unit 6 according to the first embodiment, the hydraulic passages B and C (the hydraulic passages 14 and 15) are connected to the reservoir 4 without passing through the pressure chamber R (the first fluid chamber 51). Accordingly, it is possible to suppress the deterioration of the brake operation feeling while the arbitrary wheel cylinder hydraulic pressures are obtained by controlling the pump 7 and the valves. That is, the systems (the hydraulic passage A and the hydraulic passages B and C) are separated, respectively, to first and second brake hydraulic pressure generating devices. With this, it is possible to improve the controllability. For example, when the regenerative braking device is operated, the wheel cylinder hydraulic pressure is generated by the second system (the second brake hydraulic pressure generating device) in accordance with the regenerative braking force. With this, it is possible to perform the brake control by the second system in the brake by wire (BBW) manner. Accordingly, it is possible to attain the regenerative brake control at the high efficiency. At this time, the brake fluid is not entered into and discharged from the same pressure chamber R (the first hydraulic chamber 51) of the master cylinder 5 at the increase and the decrease of the wheel cylinder hydraulic pressure. Accordingly, it is possible to suppress the deterioration of the pedal feeling at the operation of the hydraulic pressure unit 6.

In particular, the hydraulic pressure unit 6 includes the suction hydraulic passage 14 directly connecting the suction port 503 (or the reservoir 4) of the master cylinder 5, and the low pressure sides (for example, the pump suction portion 70) of the pump 7 and the first to third pressure decreasing valves 25-27. In this way, the suction portion 503 and the low pressure sides are directly connected without passing through the internal reservoir and so on (the brake fluid storing chambers or the volume chamber within the hydraulic pressure unit). Accordingly, it is possible to omit the internal reservoir and so on, to suppress the increase of the size of the apparatus 1 (the hydraulic pressure unit 6), and to improve the layout property of the components. Moreover, it is possible to attain the decrease of the suction resistance of the pump 7. The master cylinder 5 includes the third fluid chamber 53 which is a hydraulic passage connecting the reservoir 4 and the pump suction portion 70. The third fluid chamber 53 is separated from the first fluid chambers 51 on the primary side and on the secondary side. Accordingly, it is possible to suppress the deterioration of the pedal feeling.

The hydraulic pressure unit 6 includes the pump 7; the first hydraulic pressure passage 11 connecting the discharge portion 71 of the pump 7 and the discharge port 501 of the master cylinder 5; the shutoff valve 21 provided in the first hydraulic passage 11; the second hydraulic passage 12 which is bifurcated from a portion of the first hydraulic passage 11 between the pump discharge portion 71 and the shutoff valve 21, and which is connected to the wheel cylinders 8; the pressure increase valve 22 provided in the second hydraulic passage 12; the first pressure decrease hydraulic passage 15 connecting the second hydraulic passage 12 and the suction hydraulic passage 14; and the first pressure decreasing valve 25 provided in the first pressure decreasing hydraulic passage 15. In this way, it is possible to constitute the hydraulic pressure unit 6 by slightly varying the existing system for the ABS and the VDC.

The shutoff valve 21 is provided between the discharge port 501 of the master cylinder 5 and the pressure increase valve 22. Accordingly, it is possible to shut off the first fluid chamber 51 of the master cylinder 5 from the discharge side of the pump 7. Consequently, it is possible to suppress the deterioration of the pedal feeling at the operation of the hydraulic pressure unit 6. That is, when the shutoff valve 21 shuts off the first hydraulic passage 11 at the operation of the hydraulic pressure unit 6, the supply of the brake fluid from the first fluid chamber 51 to the wheel cylinders 8 is suppressed. With this, it is easy to ensure the reaction force of the brake pedal 2. Moreover, the transmission of the discharge pressure of the pump to the first fluid chamber 51 of the master cylinder 5 is suppressed. Accordingly, it is possible to suppress the unnatural feeling to the driver due to the generation of the vibration in the brake pedal 2.

Furthermore, the hydraulic pressure unit 6 includes the third pressure decrease hydraulic passage 17 which is bifurcated from a portion of the first hydraulic passage 11 between the pump discharge portion 71 and the shutoff valve 21, and which is connected to the suction hydraulic passage 14; and the third pressure decrease valve 27 which is provided in the third pressure decrease hydraulic passage 17. That is, the third pressure decrease hydraulic passage 17 and the third pressure decrease valve 27 are provided between the shutoff valve 21 and the pressure increase valve 22. The third pressure decrease hydraulic passage 17 is connected through the suction hydraulic passage 14 to the suction port 503 of the master cylinder 5. With this, the systems (the hydraulic passage A and the hydraulic passages B and C) are divided, respectively, to the first and second brake hydraulic pressure generating devices. For example, the hydraulic pressure control section includes a regenerative cooperative function to decrease the wheel cylinder hydraulic pressure in accordance with the increase of the braking force by the regenerative braking device when the master cylinder 5 or the hydraulic pressure control section generates the wheel cylinder hydraulic pressure. This regenerative cooperative function controls the shutoff valve 2 in the valve closing direction, controls the pressure increase valve 22 in the valve opening direction, controls the third pressure decrease valve 27 in the valve opening direction, and stops the pump 7. In this way, the master cylinder 5 and the hydraulic pressure control section (the hydraulic pressure unit 6) are separated. With this, it is possible to improve the controllability and the pedal feeling. In this case, the third pressure decrease valve 27 is a proportional control valve. By using the proportional control valve in this way, it is possible to enlarge the control region.

Besides, the third pressure decrease hydraulic passage 17 or the suction hydraulic passage 14 may be directly connected to the reservoir 4 without connecting to the suction port 503. In the first embodiment, the third pressure decrease hydraulic passage 17 and the suction hydraulic passage 14 are connected to the suction port 503. Accordingly, it is simplify the brake piping. Moreover, at the failure (the open failure) of the normally-closed valve (the third pressure decrease valve 27 and so on), it is possible to maintain the depression force brake, by the fail-safe mechanism relating to the stepped shape (including the second small diameter portion 543 and the second large diameter portion 544) of the piston 54p, as described above. Besides, the third pressure decrease hydraulic passage 17 and the third pressure decrease valve 27 may be also provided in the S system, in addition to the P system. In the first embodiment, the connection valve 23 is provided. Moreover, the third pressure decrease hydraulic passage 17 and the third pressure decrease valve 27 of the S system are omitted. Accordingly, it is possible to simplify the configuration of the hydraulic pressure unit 6, and to decrease the size and the weight of the apparatus 1.

The hydraulic pressure unit 6 is arranged to shut off the connection between the master cylinder 5 and the wheel cylinders 8 by closing the shutoff valves 21, and to independently control the master cylinder hydraulic pressure and the wheel cylinder hydraulic pressure. Accordingly, it is possible to readily arbitrarily set the brake characteristics even at the pump up. For example, the hydraulic pressure unit 6 includes the second pressure decrease hydraulic passage 16 which is bifurcated from a portion of the first hydraulic passage 11 between the discharge port 501 and the shutoff valve 21, and which is connected with the suction hydraulic passage 14; and the second pressure decrease valve 26 provided in the second pressure decrease hydraulic passage 16. That is, there are provided the first hydraulic passage 11 disposed between the discharge port 501 of the master cylinder 5 and the shutoff valve 21; and the second pressure decrease hydraulic passage 16 connected to the reservoir 4's side (the suction hydraulic passage 14). There is provided the second pressure decrease valve 26 which is disposed on this second pressure decrease hydraulic passage 16, and which serves as the stroke simulator valve. It is possible to separate the hydraulic pressure generated by the master cylinder 5, and the hydraulic pressure generated by the hydraulic pressure control section (the hydraulic pressure unit 6) by controlling the shutoff valve 21 in the valve closing direction, and by controlling the second pressure decrease valve 26 in the valve opening direction. Accordingly, even when the master cylinder 5 and the hydraulic pressure control section (the hydraulic pressure unit 6) are concurrently operated respectively, these are not interfered with each other. Moreover, the driver can operate the brake pedal 2 without the unnatural feeling. Furthermore, during the regenerative cooperative control, it is possible to control the wheel cylinder hydraulic pressure on the downstream side, irrespective of the brake operation of the driver.

In particular, even when the shutoff valve 21 is controlled in the valve closing direction, the brake fluid within the first fluid chamber 51p of the master cylinder 5 can flows through the second pressure decrease hydraulic passage 16 to the suction hydraulic passage 14 (the suction side of the pump 7, the third fluid chamber 53 of the master cylinder 5, or the reservoir 4), by controlling the second pressure decrease valve 26 in the valve open direction (the valve open amount is controlled in case of using the proportional control valve). Accordingly, it is possible to suppress the plate depression feeling (stiff depression feeling) of the brake pedal 2 by controlling the shutoff valve 21 in the valve closing direction. It is possible to adjust the above-described outflow (that is, the hydraulic pressure of the first fluid chamber 51p) by adjusting the valve opening amount of the second pressure decrease valve 26. Moreover, it is possible to generate the reaction force according to the pedal stroke S by the coil springs 561 and 562 of the master cylinder 5. That is, the stroke simulator is constituted by the coil springs 561 and 562, the second pressure decrease hydraulic passage 16, and the second pressure decrease valve 27. With this, it is possible to arbitrarily produce the pedal feeling at the operation of the hydraulic pressure unit 6. When the pedal stroke S exceeds S1, the apparatus 1 controls the second pressure decrease valve 26 and so on based on the sensed pedal stroke S in a state where the shutoff valve 21 is closed to disconnect the master cylinder 5 and the wheel cylinder 8. With this, the master cylinder hydraulic pressure is controlled. Accordingly, it is possible to adjust the F-S characteristics. In particular, the F-S characteristics is adjusted so that the brake characteristics is closer to that of the comparative example 1.

Besides, the second pressure decrease hydraulic passage 16 may be directly connected to the reservoir 4 without connecting to the suction port 503, similarly to the third pressure decrease hydraulic passage 17. Moreover, the second pressure decrease hydraulic passage 16 and the second pressure decrease valve 26 may be also provided in the S system, in addition to the P system. Furthermore, in place of providing the second pressure decrease valve 26 and the second pressure decrease hydraulic passage 16, or in addition to providing these, the opening and the closing (the energization amount) of the shutoff valve 21 may be controlled so that the difference between the hydraulic pressure of the master cylinder 5's side (the sensed value of the hydraulic pressure sensor 91) and the hydraulic pressure on the pump discharge side (the sensed value of the hydraulic pressure sensor 92) becomes the desired value when the second brake hydraulic pressure generating device (the second system) generates the wheel cylinder hydraulic pressures. In this case, it is possible to improve the operation feeling of the brake pedal 2, by adjusting the stroke and the reaction force of the piston 54 by controlling the hydraulic pressure of the master cylinder 5's side.

Effects of First Embodiment

Hereinafter, effects attained by the brake apparatus 1 according to the first embodiment are recited.

(1) There are provided a master cylinder 5 arranged to generate a hydraulic pressure in accordance with the brake operation of the driver, and a boost device (the second brake hydraulic pressure generating device) arranged to decrease the brake operation force of the driver by the energy source (the hydraulic pressure unit 6). The operation of the boost device is suppressed in the predetermined brake operation region.

Accordingly, it is possible to improve the energy efficiency while attaining the boost function.

(2) The boost device (the second brake hydraulic pressure generating device) does not includes the engine negative pressure booster. The boost device decreases the brake operation force by another energy source (the hydraulic pressure unit 6) which is different from the engine negative pressure.

Therefore, it is easy to apply to the electric vehicle. Moreover, in a case where it is applied to the vehicle provided with the engine, it is possible to improve the fuel economy.

(3) The above-described energy source is the hydraulic pressure unit 6.

Accordingly, it is possible to decrease the number of the components, and thereby to decrease the cost. Moreover, it is possible to simplify the configuration of the apparatus, and thereby to improve the mountability to the vehicle.

(4) The hydraulic pressure unit 6 includes the pump 7 arranged to discharge the brake fluid toward the wheel cylinders 8 provided to the wheels.

Accordingly, it is possible to suppress the frequency of the operation of the pump 7, and thereby to improve the durability of the pump 7, and the silence of the apparatus 1.

In particular, there are provided the master cylinder 5 arranged to generate the hydraulic pressure in accordance with the brake operation by the driver; the brake operation amount sensing section 101 arranged to sense the brake operation amount (the pedal stroke S); the reservoir 4 arranged to supply the brake fluid to the master cylinder 5; the pump 7 arranged to suck the brake fluid within the master cylinder 5 or the reservoir 4, and to discharge it toward the wheel cylinders 8 of the wheels; and the hydraulic pressure control section (the hydraulic pressure unit 6 and the ECU 10) configured to operate the pump 7 and the solenoid valve (the shutoff valve 21 and so no) in accordance with the brake operation amount sensed by the brake operation amount sensing section 101, and thereby to control the hydraulic pressure of the wheel cylinders 8. The wheel cylinder hydraulic pressures is generated in the predetermined brake operation region by the hydraulic pressure generated by the master cylinder 5.

Accordingly, it is possible to attain the effects identical to those of the above-described (4).

(6) The above-described brake operation region is a predetermined brake operation region after the start of the operation of the brake.

In this way, the constant use of the energy source is suppressed in the brake operation region which is relatively frequently used. Accordingly, it is possible to effectively improve the energy efficiency. Moreover, the constant operation of the pump 7 is suppressed in the brake operation region which is relatively frequently used. Accordingly, it is possible to effectively improve the durability of the pump 7, and the silence of the apparatus 1.

(7) When the brake operation amount sensing section 101 senses the start of the brake operation of the driver, the master cylinder 5 generates the wheel cylinder hydraulic pressure.

In this way, the master cylinder 5 increases the pressure (pressurizes) in the low pressure region of the initial stage of the braking, from the timing immediately after the start of the brake operation. With this, it is possible to largely decrease the frequency of the operation of the pump 7, and to suppress the decrease of the durability. Moreover, it is possible to suppress the deterioration of the sound and vibration performance.

(8) There is provided the target wheel cylinder hydraulic pressure calculating section 102 configured to calculate the target wheel cylinder pressure based on the brake operation amount (the pedal stroke S) which is sensed by the brake operation amount sensing section 101. When the calculated target wheel cylinder hydraulic pressure is greater than the predetermined hydraulic pressure P1, the wheel cylinder hydraulic pressure is generated by the pump 7 and the hydraulic pressure control section.

In this way, the pump is driven only when the target hydraulic pressure is high. Accordingly, it is possible to improve the durability of the pump 7.

(9) There are provided the operation force varying mechanism (the link mechanism 3 or the first fill mechanism 5*a*) arranged to vary the variation rate (the lever ratio k) of the thrust force (the piston thrust Fp) of the piston 54*p* of the master cylinder 5 to the brake operation force (the depression force F), or the variation rate of the brake operation force (the depression force F) to the displacement amount (the pedal stroke S) of the brake operation member, in accordance with the brake operation amount of the driver (the pedal stroke S, the depression force F, or the relief pressure).

Accordingly, it is possible to generate the brake hydraulic pressure for attaining the minimum required deceleration of the vehicle, by the brake operation amount of the driver. Consequently, it is possible to improve the reliability of the apparatus 1. Moreover, it is possible to adjust the characteristics of the depression force brake, in the above-described predetermined brake operation region, and to suppress the unnatural feeling of the brake operation feeling.

(10) There is provided the fluid amount varying mechanism (the first fill mechanism 5a) arranged to vary the variation rate of the brake fluid amount Q supplied from the master cylinder 5 toward the wheel cylinders 8, to the displacement amount (the pedal stroke S) of the brake operation member, in accordance with the brake operation amount (the pedal stroke S or the relief pressure) of the driver.

Accordingly, it is possible to adjust the characteristics of the depression brake in the above-described predetermined brake operation region, and to suppress the unnatural feeling of the brake operation feeling.

(11) There is provided the hydraulic pressure varying mechanism (the link mechanism 3) arranged to vary the variation rate of the brake hydraulic pressure P supplied from the master cylinder 5 toward the wheel cylinders 5, to the brake operation force (the depression force F), in accordance with the brake operation amount (the pedal stroke S or the depression force F) of the driver.

Accordingly, it is possible to adjust the characteristics of the depression brake in the above-described predetermined bake operation region, and to suppress the unnatural feeling of the brake operation feeling.

Second Embodiment

Figure 21:
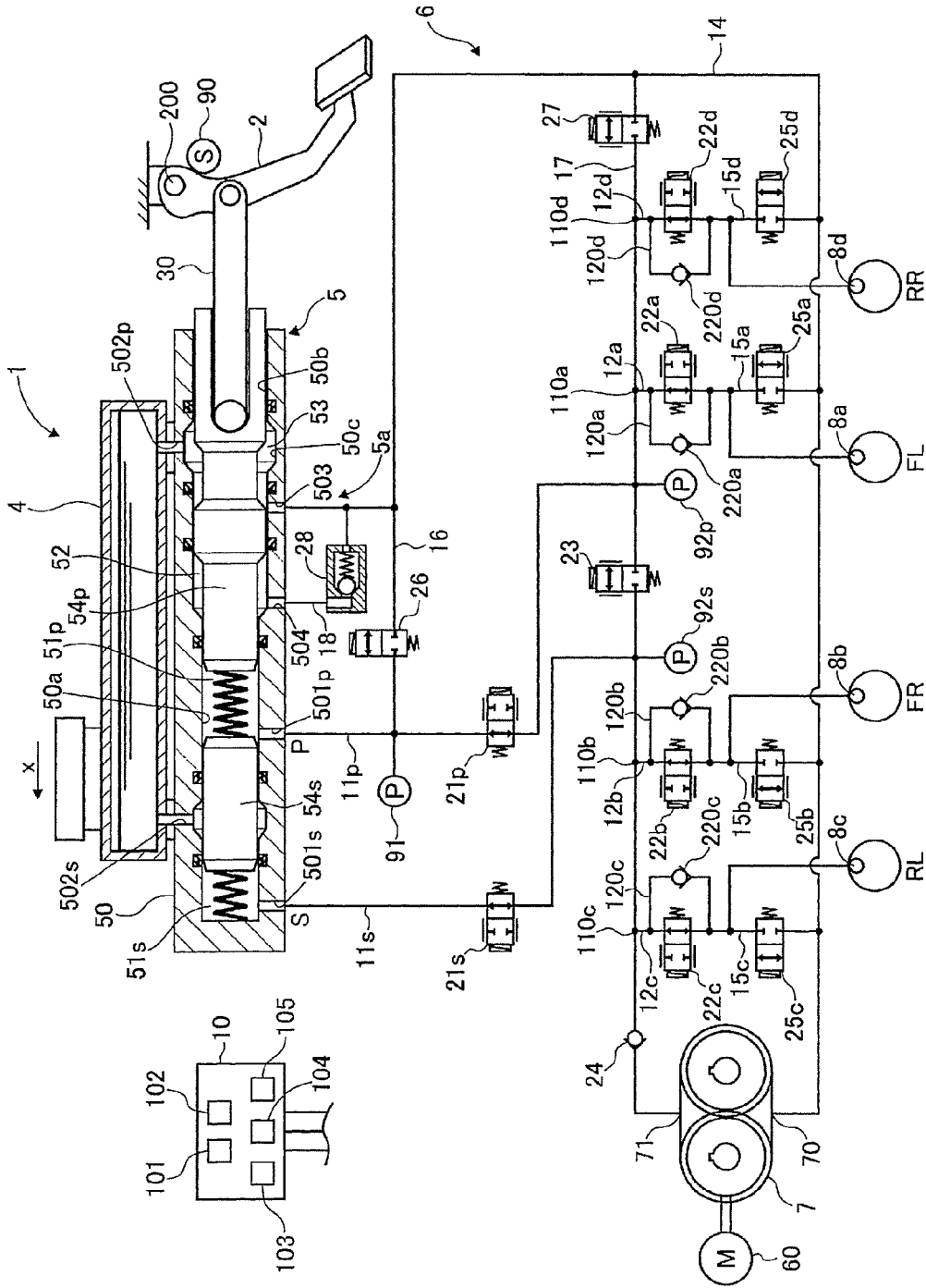
FIG. 21 is a view showing a schematic configuration of a brake device according to a second embodiment with a hydraulic pressure circuit of a hydraulic pressure unit.

In a second embodiment, the apparatus 1 does not include the link mechanism 3, unlike the first embodiment. FIG. 21 is a view showing a schematic configuration of the apparatus 1 according to the second embodiment. Unlike the first embodiment, the x-axis negative direction end portion of the push rod 30 is connected to a base end portion of the brake pedal 2. The lever ratio is fixed. The other structures are identical to those of the first embodiment. Accordingly, the explanations are omitted. The apparatus 1 includes the first fill mechanism 5a identical to that of the first embodiment. The first fill mechanism 5a varies the variation rate of the fluid amount Q to the brake operation amount (the pedal stroke S) of the driver, or the variation rate of the brake operation force (the depression force F) to the pedal stroke S. Accordingly, it is possible to improve the energy efficiency, the durability of the pump 7, and so on by suppressing the pump up by the operation identical to those of the first embodiment. Moreover, it is possible to decrease the unnatural feeling of the brake operation feeling at the depression force brake while attaining the fail-safe by attaining the ideal deceleration Gf* at the failure. For example, in a case where the apparatus 1 is mounted on the vehicle (the light vehicle and so on) which has a relatively light vehicle weight, even when the link mechanism 3 is not provided, it is possible to readily attain the failure ideal deceleration Gf* by the first fill mechanism 5a.

Third Embodiment

Figure 22:
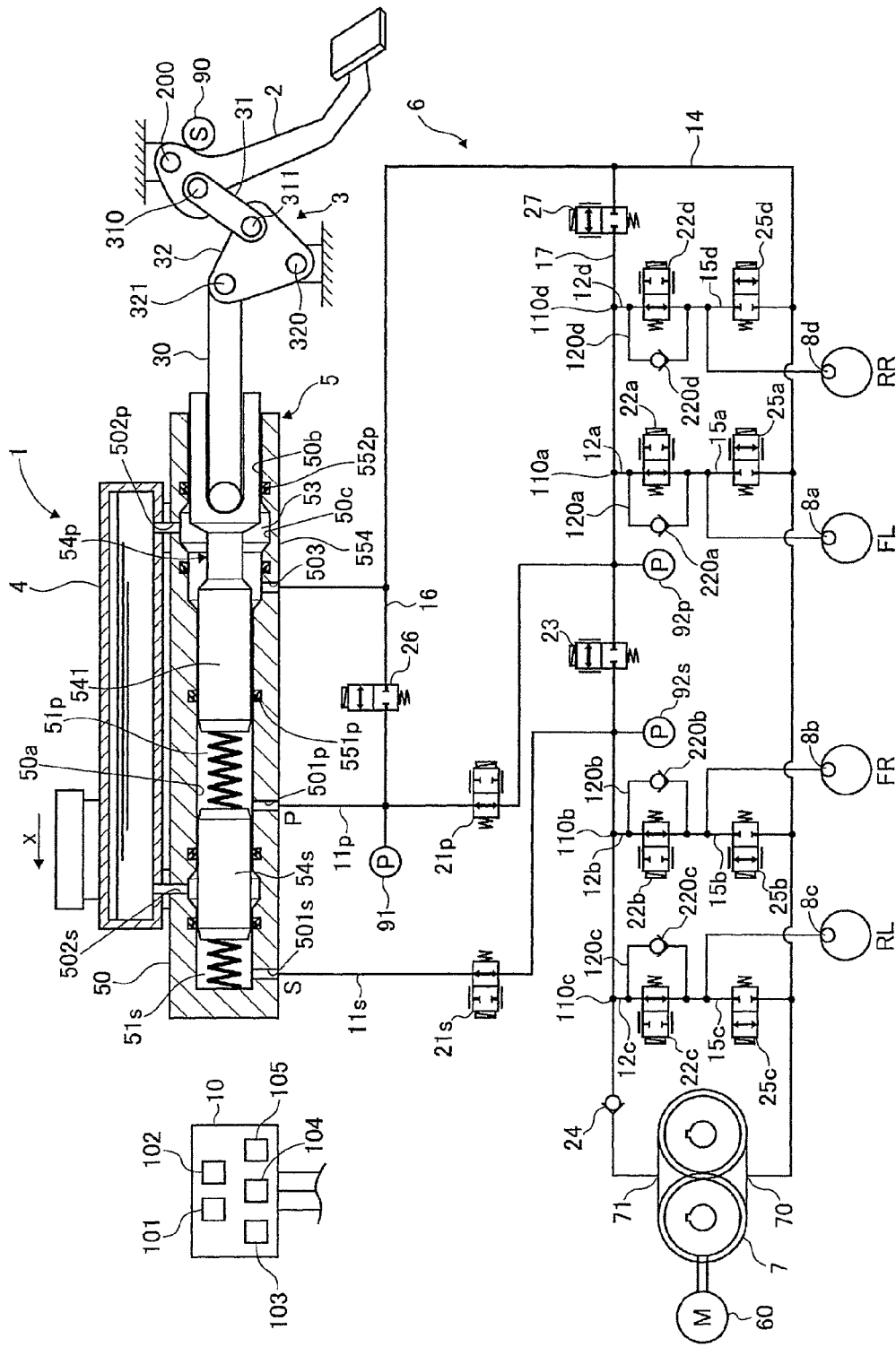
FIG. 22 is a view showing a schematic configuration of a brake device according to a third embodiment with a hydraulic pressure circuit of a hydraulic pressure unit.

In a third embodiment, the apparatus 1 does not include the first fill mechanism 5a, unlike the first embodiment. FIG. 22 is a view showing a schematic configuration of the apparatus 1 according to the third embodiment. Unlike the first embodiment, the piston 54p of the master cylinder 54 does not include the first large diameter portion 542. Moreover, the cylinder 50 does not include the third piston seal 553, so that the second fluid chamber 52 is not defined. Furthermore, there are not provided the relief hydraulic passage 18 and the relief valve 28. The other structures are identical to those of the first embodiment. Accordingly, the explanation is omitted. The apparatus 1 includes the link mechanism 3 identical to that of the first embodiment. The link mechanism 3 is arranged to vary the variation rate of the piston thrust Fp to the brake operation force (the depression force F) of the driver, or the variation rate of the hydraulic pressure P to the depression force F. Accordingly, it is possible to improve the energy efficiency, the durability of the pump 7 and so on by suppressing the pump up by the operation identical to that of the first embodiment. Moreover, it is possible to decrease the unnatural feeling of the brake operation feeling at the depression brake while attaining the fail-safe by attaining the ideal deceleration Gf* at the failure.

Besides, in the above-described effects, the fail-safe may be attained without suppressing the pump up, in accordance with the model of the vehicle mounting the apparatus 1. For example, in a case where the apparatus 1 is mounted to a vehicle having a relatively heavy vehicle weight, the lever ratio k of the link mechanism 3 is set to a relatively small value in a first half of the brake depression, and set to a relatively large value in a second half of the brake depression. In this case, for the relatively heavy vehicle weight, it is possible to decrease the load of the brake operation of the driver by the pump up in the first half of the brake depression. Moreover, it is possible to appropriately adjust the brake operation feeling by controlling the hydraulic pressure unit 6. On the other hand, in the second half of the brake depression, even when the hydraulic pressure control section (the power supply system and the hydraulic pressure unit 6) becomes the failure state, it is possible to attain the fail-safe by attaining the ideal deceleration Gf* by the increase of the lever ratio. For example, the above-described comparative examples 2 and 3 do not include the fail-safe mechanism arranged to generate the minimum required vehicle deceleration at the failure of the energy source arranged to compensate for the deficiency of the brake operation force. Accordingly, the countermeasure for the failure is insufficient. On the other hand, the apparatus 1 according to the second embodiment can generate the minimum required deceleration Gf* of the vehicle even at the failure of the energy source (the hydraulic pressure unit 6), as described above.

Other Embodiments

Hereinabove, the configurations for attaining the present invention are explained based on the embodiments. However, the concrete structure of the present invention is not limited to these embodiments. The variation of the design and so on are included in the present invention as long as it is not deviated from the gist of the invention.

For example, in a case where the apparatus 1 is applied to the vehicle provided with the engine, the apparatus 1 may include the engine negative pressure booster. In this case, (in addition to the hydraulic pressure control section), it is possible to attain the failure ideal deceleration Gf* by the structure and the operation which are identical to those of the embodiments when the engine negative pressure booster is brought to the failure state. Moreover, in a case where the small engine negative pressure booster is provided, it is possible to attain the brake operation feeling identical to that of the comparative example 1 (which includes the normal size engine negative pressure booster) by the structure and the operation which are identical to those of the embodiments.

The configuration of the hydraulic pressure unit 6 is not limited to those of the embodiments. For example, one pump is not shared in the both systems. The pumps may be provided to the respective systems. Moreover, the pump 7 is not limited to the external gear type. For example, the pump 7 may be the internal gear type. Furthermore, the pump 7 is not limited to the gear pump. For example, the pump 7 may be a plunger pump.

The configuration of the master cylinder 5 is not limited to those of the embodiments. For example, in the first embodiment, the first fill mechanism 5a and the third fluid chamber 53 (the suction port 503) are provided on the primary side. However, the first fill mechanism 5a and the third hydraulic chamber 53 (the suction port 503) may be provided on the secondary side, in addition to the primary side, or in place of the primary side.

The relief valve 28 of the first fill mechanism 5a may be not disposed on the master cylinder 5's side. The relief valve 28 of the first fill mechanism 5a may be disposed on the hydraulic pressure unit 6's side, not on the master cylinder 5's side.

Hereinafter, the inventions which are grasped from the embodiments, and which are other than the claims are recited.

(A4) The brake apparatus includes the hydraulic pressure control section including the pump, the first hydraulic passage connecting the discharge portion of the pump and the discharge port of the master cylinder, the shutoff valve provided in the first hydraulic passage, the second hydraulic passage which is bifurcated from a portion of the first hydraulic passage between the discharge portion of the pump and the shutoff valve, and which is connected to the wheel cylinder, the pressure increase valve provided in the second hydraulic passage, the suction hydraulic passage connecting the master cylinder or the suction port of the reservoir, and the suction portion of the pump, the first pressure decreasing hydraulic passage connecting the second hydraulic passage and the suction hydraulic passage, the first pressure decreasing valve provided in the first pressure decreasing hydraulic passage, the second pressure decreasing hydraulic passage which is bifurcated from a portion of the first hydraulic passage between the discharge port of the master cylinder and the shutoff valve, and which is connected to the suction hydraulic passage, the second pressure decreasing valve provided in the second pressure decreasing hydraulic passage, the third pressure decreasing hydraulic passage which is bifurcated from a portion of the first hydraulic passage between the discharge portion of the pump and the shutoff valve, and which is connected to the suction hydraulic passage, and the third pressure decreasing valve provided in the third pressure decreasing hydraulic passage.

Accordingly, it is possible to constitute the hydraulic pressure control section by a small variation from an existing system.

(A5) The hydraulic pressure control section includes a suction hydraulic passage which directly connects the master cylinder or the suction port of the reservoir, and the suction portion of the pump.

Accordingly, it is possible to suppress the increase of the size of the hydraulic pressure control section by the direct connection without passing through the internal reservoir, and to decrease a suction resistance of the pump.

(A6) In the brake apparatus described in the above-described (A5), the hydraulic pressure control section includes
the pump,
the shutoff valve provided in the first hydraulic passage connecting the discharge portion of the pump and the discharge port of the master cylinder,
the second hydraulic passage which is bifurcated from a portion of the first hydraulic passage between the discharge portion of the pump and the shutoff valve, and which is connected to the wheel cylinder,
the pressure increasing valve provided in the second hydraulic passage,
the first pressure decreasing hydraulic passage connecting the second hydraulic passage and the suction hydraulic passage, and
the first pressure decreasing valve provided in the first pressure decreasing hydraulic passage.

Accordingly, it is possible to constitute the hydraulic pressure control section by the small variation from the existing system.

(A7) In the brake apparatus described in the above-described (A6), the hydraulic pressure control section includes
the second pressure decreasing hydraulic passage which is bifurcated from a portion of the first hydraulic passage between the discharge port of the master cylinder and the shutoff valve, and which is connected to the suction hydraulic passage,
the second pressure decreasing valve provided in the pressure decreasing hydraulic passage 2,
the hydraulic pressure generated by the master cylinder, and the hydraulic pressure generated by the hydraulic pressure control section are separated by controlling the shutoff valve in the valve closing direction, and controlling the second pressure decreasing valve in the valve opening direction.

Accordingly, it is possible to prevent the interference between the master cylinder and the hydraulic pressure control section even when the master cylinder and the hydraulic pressure control section are concurrently operated. Moreover, the driver can operate the brake pedal without the unnatural feeling.

(A8) In the brake apparatus described in the above-described (A6), the brake apparatus further includes a third pressure decreasing hydraulic passage which is bifurcated from a portion of the first hydraulic passage between the discharge portion of the pump and the shutoff valve, and which is connected to the suction hydraulic passage; and the proportional control valve is provided in the third pressure decreasing hydraulic passage.

Accordingly, it is possible to enlarge (increase) the control region by using the proportional control valve.

(A9) In the brake apparatus described in the above-described (A6), the hydraulic pressure control section performs the pressure increasing control to control the shutoff valve in the valve closing direction, to control the pressure increasing valve in the valve opening direction, to control the first pressure decreasing valve in the valve closing direction, and to drive the pump.

Accordingly, it is possible to perform the pressure increase control by the easy control.

(A10) In the brake apparatus described in the above-described (A8), the hydraulic pressure control section performs the pressure decreasing control to control the shutoff valve in the valve closing direction, to control the pressures increasing valve in the valve opening direction, to control the third pressure decreasing valve in the valve opening direction, and to stop the pump.

Accordingly, it is possible to perform the pressure decreasing control by the easy control.

(B1) The brake apparatus used for a vehicle provided with the regenerative braking device includes
the master cylinder arranged to generate the brake hydraulic pressure in accordance with the operation of the brake pedal by the driver,
the brake pedal operation amount sensing section configured to sense the operation amount of the brake pedal, the reservoir arranged to supply the brake fluid to the master cylinder, the pump arranged to suck the brake fluid within the master cylinder or the reservoir, and to discharge (the brake fluid) to the wheel cylinder provided to the wheel, and the hydraulic pressure control section arranged to operate the pump and the solenoid valve in accordance with the operation amount of the brake pedal which is sensed by the brake pedal operation amount sensing section, and thereby to control the hydraulic pressure of the wheel cylinder, and the hydraulic pressure of the wheel cylinder being generated by the hydraulic pressure generated by the master cylinder in the predetermined brake pedal operation region after the start of the brake pedal operation by the driver, and the hydraulic pressure of the wheel cylinder being generated by the hydraulic pressure control section when the regenerative braking device is operated.

In this way, the master cylinder and the hydraulic pressure control section are separated. With this, it is possible to improve the controllability and the pedal feeling.

(B2) In the brake apparatus described in the above-described (B1), the hydraulic pressure control section includes
the pump,
the first hydraulic passage connecting the discharge portion of the pump and the discharge port of the master cylinder,
the shutoff valve provided in the first hydraulic passage,
the second hydraulic passage which is bifurcated from a portion of the first hydraulic passage between the discharge portion of the pump and the shutoff valve, and which is connected to the wheel cylinder,
the pressure increasing valve provided in the second hydraulic passage,
the suction hydraulic passage connecting the master cylinder or the suction port of the reservoir, and the suction port of the pump,
the first pressure decreasing hydraulic passage connecting the second hydraulic passage and the suction hydraulic passage,
the first pressure decreasing valve provided in the first pressure decreasing hydraulic passage,
the second pressure decreasing hydraulic passage which is bifurcated from a portion of the first hydraulic passage between the discharge port of the master cylinder and the shutoff valve, and which is connected to the suction hydraulic passage,
the second pressure decreasing valve provided in the second pressure decreasing hydraulic passage,
the third pressure decreasing hydraulic passage which is bifurcated from a portion of the first hydraulic passage between the discharge portion of the pump, and the shutoff valve, and which is connected to the suction hydraulic passage, and
the third pressure decreasing valve provided in the third pressure decreasing hydraulic passage.

Accordingly, it is possible to constitute the hydraulic pressure control section by the small variation from the existing system.

(B3) In the brake apparatus described in the above-described (B2), the hydraulic pressure control section has the regenerative cooperative function to decrease the wheel cylinder hydraulic pressure in accordance with the increase of the brake force by the regenerative braking device when the master cylinder or the hydraulic pressure control section generates the wheel cylinder hydraulic pressure.

The regenerative cooperative function controls the shutoff valve in the valve closing direction, controls the pressure increasing valve in the valve opening direction, and controls the third pressure decreasing valve in the valve opening direction.

By separating the master cylinder and the hydraulic pressure control section in this way, it is possible to improve the controllability and the pedal feeling.

(B4) In the brake apparatus described in the above-described (B2), the hydraulic pressure generated by the master cylinder, and the hydraulic pressure generated by the hydraulic pressure control section are separated by controlling the shutoff valve in the valve closing direction, and controlling the second pressure decreasing valve in the valve opening direction.

Accordingly, it is possible to prevent the interference between the master cylinder and the hydraulic pressure even when the master cylinder and the hydraulic pressure control section are concurrently operated respectively. Moreover, the driver can operate the brake pedal without the unnatural feeling. It is possible to control the wheel cylinder hydraulic pressure on the downstream side during the regenerative cooperation, irrespective of the brake operation of the driver.

(C1) The brake apparatus includes
the master cylinder arranged to generate the brake hydraulic pressure by the displacement of the piston according to the brake pedal operation of the driver,
the operation force varying mechanism which is integrally connected to the master cylinder, and which is arranged to vary a variation rate of a thrust force of the piston to the brake pedal operation force of the driver, or the variation rate of the brake pedal operation force to the displacement amount of the brake pedal, in accordance with the brake pedal operation amount of the driver, and
the pump which is provided between the master cylinder and the wheel cylinder provided to the wheel, and which is arranged to generate the brake hydraulic pressure in the hydraulic pressure between the master cylinder and the wheel cylinder, and thereby to generate the hydraulic pressure of the wheel cylinder.

Accordingly, it is possible to generate the high brake hydraulic pressure by the small brake pedal operation force. Consequently, it is possible to obtain the sufficient braking force without the operation of the pump. Moreover, it is possible to improve the reliability at the failure.

(C2) In the brake apparatus described in the above-described (C1), the brake apparatus includes the brake pedal operation amount sensing section configured to sense the amount of the operation of the brake pedal the master cylinder generates the wheel cylinder hydraulic pressure when the brake pedal operation amount sensing section senses the start of the brake operation of the driver.

Accordingly, it is possible to decrease the frequency of the operation of the pump by pressurizing by the master cylinder in the low pressure region at the initial stage of the braking. Consequently, it is possible to suppress the decrease of the durability, and to suppress the deterioration of the sound and vibration characteristics.

(C3) In the brake apparatus described in the above-described (C2), the brake apparatus includes the target wheel cylinder hydraulic pressure calculating section configured to calculate the target wheel cylinder hydraulic pressure based on the brake pedal operation amount which is sensed by the brake pedal operation amount sensing section, the pump and the hydraulic pressure control section generates the wheel cylinder hydraulic pressure when the calculated target wheel cylinder hydraulic pressure is higher than the predetermined hydraulic pressure.

Accordingly, the pump is driven only when the target hydraulic pressure is high. Consequently, it is possible to improve the durability.

(C4) The brake apparatus described in the above-described (C1) includes the first hydraulic passage connecting the discharge portion of the pump and the discharge port of the master cylinder, the shutoff valve provided in the first hydraulic passage, the second hydraulic passage which is bifurcated from a portion of the first hydraulic passage between the discharge portion of the pump and the shutoff valve, and which is connected to the wheel cylinder, the pressure increasing valve provided in the second hydraulic passage, the suction hydraulic passage connecting the master cylinder or the suction port of the reservoir, and the suction portion of the pump, the first pressure decreasing hydraulic passage connecting the second hydraulic passage and the suction hydraulic passage, the first pressure decreasing valve provided in the first pressure decreasing hydraulic passage, the second pressure decreasing hydraulic passage which is bifurcated from a portion of the first hydraulic passage between the discharge portion of the master cylinder and the shutoff valve, and which is connected to the suction hydraulic passage, the third pressure decreasing hydraulic passage which is bifurcated from the portion of the first hydraulic passage between the discharge portion of the pump and the shutoff valve, and which is connected to the suction hydraulic passage, and the third pressure decreasing valve provided in the third pressure decreasing hydraulic passage.

Accordingly, it is possible to constitute the hydraulic pressure control section by the small variation from the existing system.

(C5) In the brake apparatus described in the above-described (C4), the hydraulic pressure generated by the master cylinder, and the hydraulic pressure generated by the pump are separated by controlling the shutoff valve in the valve closing direction, and controlling the second pressure decreasing valve in the valve opening direction.

Accordingly, even when the master cylinder and the hydraulic pressure control section are concurrently operated, it is possible to prevent the interference between the master cylinder and the hydraulic pressure control section. Moreover, the driver can operate the brake pedal without the unnatural feeling. It is possible to control the wheel cylinder hydraulic pressure on the downstream side during the regenerative cooperation, irrespective of the brake pedal operation of the driver.

(C6) In the brake apparatus described in the above-described (C4), the brake apparatus includes the third pressure decreasing hydraulic passage which is bifurcated from a portion of the first hydraulic passage between the discharge portion of the pump and the shutoff valve, and the proportional control valve is provided in the third pressure decreasing hydraulic passage.

Accordingly, it is possible to enlarge (increase) the control region by using the proportional control valve.

EXPLANATION OF SYMBOLS 2 brake pedal (brake operation member)
3 link mechanism (operation force varying mechanism, hydraulic pressure varying mechanism)
4 reservoir
5 master cylinder
54 piston
5a first fill mechanism (operation force varying mechanism, fluid amount varying mechanism)
6 hydraulic pressure unit (energy source, hydraulic pressure control section)
7 pump
8 wheel cylinder
10 ECU (hydraulic pressure control section)
101 brake operation amount sensing section
102 target wheel cylinder hydraulic pressure calculating section

The invention claimed is:

1. A brake apparatus comprising:
a master cylinder arranged to generate a hydraulic pressure in accordance with a brake operation of a driver;
a brake operation sensing section configured to sense a brake operation amount of the driver;
a reservoir arranged to supply the brake fluid to the master cylinder;
a pump arranged to suck the brake fluid within the master cylinder or the reservoir, and to discharge the brake fluid to a wheel cylinder provided to a wheel; and
a hydraulic pressure control section configured to control a hydraulic pressure of the wheel cylinder by operating the pump and a solenoid valve in accordance with the brake operation amount sensed by the brake operation amount sensing section;
the hydraulic pressure of the wheel cylinder being generated by the hydraulic pressure generated by the master cylinder in a predetermined brake operation region after a start of the brake operation of the driver;
wherein the master cylinder generates the hydraulic pressure by moving a piston in accordance with a displacement of a brake operation member arranged to receive an input of the brake operation of the driver, and the master cylinder includes an operation force varying mechanism arranged to vary a variation rate of a thrust force of the piston to the brake operation force of the driver, or a variation rate of the brake operation force to a displacement amount of the brake operation member, in accordance with the brake operation amount of the driver.

2. The brake apparatus as claimed in claim 1, wherein the master cylinder generates the wheel cylinder hydraulic pressure when the brake operation amount sensing section senses a start of the brake operation of the driver.

3. The brake apparatus as claimed in claim 1, wherein the operation force varying member includes a fluid amount varying mechanism arranged to vary a variation rate of a fluid amount supplied from the master cylinder toward the wheel cylinder, to the displacement amount of the brake operation member, in accordance with the brake operation amount of the driver, or a hydraulic pressure varying mechanism arranged to vary a variation rate of the hydraulic pressure supplied from the master cylinder to the wheel cylinder, to the brake operation force of the driver, in accordance with the brake operation amount of the driver.

4. The brake apparatus as claimed in claim 1, wherein the brake apparatus further comprises a target wheel cylinder hydraulic pressure calculating section configured to calculate a target wheel cylinder hydraulic pressure based on the brake operation amount sensed by the brake operation amount sensing section; and the pump and the hydraulic pressure control section generate the wheel cylinder hydraulic pressure when the calculated target wheel cylinder hydraulic pressure is higher than a predetermined hydraulic pressure.

5. The brake apparatus as claimed in claim 4, wherein the hydraulic pressure control section includes:
the pump,
a first hydraulic passage connecting a discharge portion of the pump and a discharge port of the master cylinder,
a shutoff valve provided in the first hydraulic passage,
a second hydraulic passage which is bifurcated from a portion of the first hydraulic passage between the discharge portion of the pump and the shutoff valve, and which is connected to the wheel cylinder,
a pressure increasing valve provided in the second hydraulic passage;
a suction hydraulic passage connecting the suction portion of the pump, and the master cylinder or the suction port of the reservoir,
a first pressure decreasing hydraulic passage connecting the second hydraulic passage and the suction hydraulic passage,
a first pressure decreasing valve provided in the first pressure decreasing hydraulic passage,
a second pressure decreasing hydraulic passage which is bifurcated from a portion of the first hydraulic passage between the discharge port of the master cylinder, and the shutoff valve, and which is connected to the suction hydraulic passage,
a second pressure decreasing valve provided in the second pressure decreasing hydraulic passage,
a third pressure decreasing hydraulic passage which is bifurcated from a portion of the first hydraulic passage between the discharge portion of the pump and the shutoff valve, and which is connected to the suction hydraulic passage, and
a third pressure decreasing valve provided in the third pressure decreasing passage.

6. The brake apparatus as claimed in claim 1, wherein the hydraulic pressure control section includes a suction hydraulic passage directly connecting the suction portion of the pump, and the master cylinder or the suction port of the reservoir.

7. The brake apparatus as claimed in claim 6, wherein the hydraulic pressure control section includes
the pump,
a shutoff valve provided in a first hydraulic passage connecting the discharge portion of the pump, and the discharge port of the master cylinder,
a second hydraulic passage which is bifurcated from a portion of the first hydraulic passage between the discharge portion of the pump, and the shutoff valve, and which is connected to the wheel cylinder,
a pressure increase valve provided in the second hydraulic passage,
a first pressure decreasing hydraulic passage connecting the second hydraulic passage and the suction hydraulic passage, and
a first pressure decreasing valve provided in the first pressure decreasing hydraulic passage.

8. The brake apparatus as claimed in claim 1, wherein the hydraulic pressure control section includes a second pressure decreasing hydraulic passage which is bifurcated from a portion of the first hydraulic passage between the discharge port of the master cylinder and the shutoff valve, and which is connected to the suction hydraulic passage, and a second pressure decreasing valve provided in the pressure decreasing hydraulic passage, and the hydraulic pressure generated by the master cylinder and the hydraulic pressure generated by the hydraulic pressure control section are separated by controlling the shutoff valve in a valve closing direction, and by controlling the second pressure decreasing valve in a valve opening direction.

9. The brake apparatus as claimed in claim 7, wherein the brake apparatus further comprises a third pressure decreasing hydraulic passage which is bifurcated from a portion of the first hydraulic passage between the discharge portion of the pump and the shutoff valve; and a proportional control valve is provided in the third pressure decreasing hydraulic passage.

10. The brake apparatus as claimed in claim 7, wherein the hydraulic pressure control section is configured to perform a pressure increasing control, to control the shutoff valve in a valve closing direction, to control the pressure increasing valve in a valve opening direction, to control the first pressure decreasing valve in the valve closing direction, and to drive the pump.

11. The brake apparatus as claimed in claim 9, wherein the hydraulic pressure control section is configured to perform a pressure decreasing control to control the shutoff valve in the valve closing direction, to control the pressure increasing valve in the valve opening direction, to control the third pressure decreasing valve in the valve opening direction, and to stop the pump.

12. A brake apparatus used for a vehicle provided with a regenerative braking device, the brake apparatus comprising:
a master cylinder arranged to generate a brake hydraulic pressure in accordance with an operation of a brake pedal by a driver;
a brake pedal operation amount sensing section configured to sense an operation amount of the brake pedal;
a reservoir arranged to supply a brake fluid to the master cylinder;
a pump arranged to suck the brake fluid within the master cylinder or the reservoir, and to discharge the brake fluid to the wheel cylinder;
a hydraulic pressure control section configured to operate the pump and the solenoid valve in accordance with the amount of the operation of the brake pedal which is sensed by the brake pedal operation amount sensing section;
the hydraulic pressure being generated by the hydraulic pressure generated by the master cylinder, in the predetermined brake pedal operation region after a start of the operation of the brake pedal by the driver,
the hydraulic pressure control section generating the wheel cylinder hydraulic pressure when the regenerative braking device is operated,
wherein the hydraulic pressure control section includes
the pump,
a first hydraulic passage connecting the discharge portion of the pump and a discharge port of the master cylinder,
a shutoff valve provided in the first hydraulic passage,
a second hydraulic passage which is bifurcated from a portion of the first hydraulic passage between the discharge portion of the pump and the shutoff valve, and which is connected to the wheel cylinder,
a pressure increasing valve provided in the second hydraulic passage, a suction hydraulic passage connecting the master cylinder or the suction port of the reservoir, and the suction portion of the pump, a first pressure decreasing hydraulic passage connecting the second hydraulic passage and the suction hydraulic passage;

a first pressure decreasing valve provided in the first pressure decreasing hydraulic passage, a second pressure decreasing hydraulic passage which is bifurcated from a portion of the first hydraulic passage between the discharge port of the master cylinder, and the shutoff valve, and which is connected to the suction hydraulic passage, a second pressure decreasing valve provided in the second pressure decreasing hydraulic passage, a third pressure decreasing hydraulic passage which is bifurcated from a portion of the first hydraulic passage between the discharge portion of the pump, and the shutoff valve, and which is connected to the suction hydraulic passage, and a third pressure decreasing valve provided in the third pressure decreasing hydraulic passage.

13. The brake apparatus as claimed in claim 12, wherein the hydraulic pressure control section has a regenerative cooperative function to decrease the wheel cylinder hydraulic pressure in accordance with the increase of the braking force by the regenerative braking device when the master cylinder or the hydraulic pressure control section generates the wheel cylinder hydraulic pressure; and the regenerative cooperative function controls the shutoff valve in the valve closing direction, controls the pressure increasing valve in the valve opening direction, and controls the third pressure decreasing valve in the valve opening direction.

14. The brake apparatus as claimed in claim 12, wherein the hydraulic pressure generated by the master cylinder, and the hydraulic pressure generated by the hydraulic pressure control section are separated by controlling the shutoff valve in the valve closing direction, and controlling the second pressure decreasing valve in the valve opening direction.

15. A brake apparatus comprising:
a master cylinder arranged to generate a brake hydraulic pressure by a displacement of a piston according to an operation of a brake pedal of a driver;
an operation force varying mechanism which is integrally connected with the master cylinder, and which is configured to vary a variation rate of a thrust force of a piston with respect to the operation force of the brake pedal of the driver in accordance with an amount of the operation of the brake pedal of the driver, or a variation rate of the operation force of the brake pedal with respect to a displacement amount of the brake pedal; and
a pump which is provided between the master cylinder and a wheel cylinder provided to a wheel, and which is arranged to generate a brake hydraulic pressure in a hydraulic passage between the master cylinder and the wheel cylinder, and thereby to generate the hydraulic pressure of the wheel cylinder,
wherein the brake apparatus further comprises a first hydraulic passage connecting the discharge portion of the pump and the discharge port of the master cylinder,
a shutoff valve provided in the first hydraulic passage,
a second hydraulic passage which is bifurcated from a portion of the first hydraulic passage between the discharge portion of the pump and the shutoff valve,
a pressure increasing valve provided in the second hydraulic passage;
a suction hydraulic passage connecting the master cylinder or the suction port of the reservoir, and the suction port of the pump,
a first pressure decreasing hydraulic passage connecting the second hydraulic passage and the suction hydraulic passage,
a first pressure decreasing valve provided in the first pressure decreasing hydraulic passage,
a second pressure decreasing hydraulic passage which is bifurcated from a portion of the first hydraulic passage between the discharge port of the master cylinder and the shutoff valve, and which is connected to the suction hydraulic passage,
a second pressure decreasing valve provided in the second pressure decreasing hydraulic passage,
a third pressure decreasing hydraulic passage which is bifurcated from a portion of the first hydraulic passage between the discharge portion of the pump and the shutoff valve, and which is connected to the suction hydraulic passage, and
a third pressure decreasing valve provided in the third pressure decreasing hydraulic passage.

16. The brake apparatus as claimed in claim 15, wherein the brake apparatus further comprises a brake pedal operation amount sensing section arranged to sense an amount of an operation of the brake pedal; and the master cylinder generates the hydraulic pressure of the wheel cylinder when the brake pedal operation amount sensing section senses a start of the brake operation.

17. The brake apparatus as claimed in claim 15, wherein the brake apparatus further comprises a target wheel cylinder hydraulic pressure calculating section configured to calculate a target wheel cylinder hydraulic pressure based on the amount of the operation of the brake pedal which is sensed by the brake pedal operation amount sensing section; and the pump and the hydraulic pressure control section generates the hydraulic pressure of the wheel cylinder when the calculated target wheel cylinder hydraulic pressure is greater than a predetermined hydraulic pressure.

18. The brake apparatus as claimed in claim 15, wherein the hydraulic pressure generated by the master cylinder, and the hydraulic pressure generated by the pump are separated by controlling the shutoff valve in the valve closing direction, and controlling the second pressure decreasing valve in the valve opening direction.

19. The brake apparatus as claimed in claim 18, wherein the brake apparatus further comprises a third pressure decreasing hydraulic passage which is bifurcated from a portion of the first hydraulic passage between the discharge portion of the pump and the shutoff valve; and a proportional control valve is provided in the third pressure decreasing hydraulic passage.

* * * * *